(12) United States Patent
Stipe et al.

(10) Patent No.: US 11,517,146 B2
(45) Date of Patent: Dec. 6, 2022

(54) COOKING ASSISTANCE APPLIANCE

(71) Applicant: WHIRLPOOL CORPORATION, Benton Harbor, MI (US)

(72) Inventors: Collin A. Stipe, West Unity, OH (US); Cristiano Vito Pastore, Comerio (IT); Christopher D. Cullen, Stevensville, MI (US); Andrea Gallivanoni, Casorate Sempione (IT); Gregory Bauman, St. Joseph, MI (US); Aaron Edward Showers, St. Joseph, MI (US); Rahul S. Dudhe, Pune (IN); Natalie Hillmann, St. Joseph, MI (US); Tushar Ashok Kalbande, Pune (IN); Ajit Janardan Manohar, Nagpur (IN); Rahul R. Pandey, Pune (IN); Neomar Giacomini, St. Joseph, MI (US); Kevin Chase, Columbus, OH (US); Josh Abdoo, Stevensville, MI (US); Larissa Ducci De Araujo, St. Joseph, MI (US); Sugosh Venkataraman, Stevensville, MI (US); Andrea Ferrise, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 293 days.

(21) Appl. No.: 16/418,607

(22) Filed: May 21, 2019

(65) Prior Publication Data
US 2020/0367692 A1 Nov. 26, 2020

(51) Int. Cl.
G08B 21/00 (2006.01)
A47J 36/32 (2006.01)
(Continued)

(52) U.S. Cl.
CPC .............. *A47J 36/32* (2013.01); *G06V 20/52* (2022.01); *G08B 5/36* (2013.01); *G08B 21/18* (2013.01); *H04N 7/181* (2013.01)

(58) Field of Classification Search
CPC ....... A47J 36/32; G06K 9/00771; G08B 5/36; G08B 21/18; H04N 7/181
(Continued)

(56) References Cited

U.S. PATENT DOCUMENTS 5,440,292 A * 8/1995 Bedrosian ............ G08B 25/008
340/567
5,530,229 A 6/1996 Gong et al.
(Continued)

FOREIGN PATENT DOCUMENTS

CN 107152705 A 9/2017
DE 3909125 A1 9/1990
(Continued)

OTHER PUBLICATIONS

M. Hirota, Y. Nakajima, M. Saito, M. Uchiyama, 120 X 90 Element Thermoelectric Infrared Focal Plane Array With Precisely Patterned Au-Black Absorber, Science Direct, Sensors and Actuators A 135 (2007) 146-151, Technology Research Laboratory No. 1, Nissan Research Denter, Nissan Motor Co., Ltd., 1 Natsushima-Cho, Yokosuka 237-8523, Japan, Available Online At www.sciencedirect. com On Aug. 22, 2006, 6 Pages.
(Continued)

*Primary Examiner* — Mark S Rushing
(74) *Attorney, Agent, or Firm* — McGarry Bair PC

(57) ABSTRACT

A cooking assistance appliance can include a body, at least one camera, at least one sensor, and an imaging device for capturing an image of a cooking appliance. The cooking appliance can provide for monitoring use of the cooking appliance, as well as assisting the user in operating the
(Continued)

cooking appliance. Additionally, the cooking assistance appliance can be integrated into a hood or a microwave oven and vent combination above a stovetop.

22 Claims, 40 Drawing Sheets

(51) Int. Cl.
  *G08B 5/36* (2006.01)
  *G08B 21/18* (2006.01)
  *H04N 7/18* (2006.01)
  *G06V 20/52* (2022.01)
(58) Field of Classification Search
  USPC .................................................. 340/584
  See application file for complete search history.

(56) References Cited

U.S. PATENT DOCUMENTS

| | | |
|---|---|---|
| 5,982,352 A | 11/1999 | Pryor |
| 6,008,800 A | 12/1999 | Pryor |
| 6,720,949 B1 | 4/2004 | Pryor et al. |
| 6,750,848 B1 | 6/2004 | Pryor |
| 6,766,036 B1 | 7/2004 | Pryor |
| 6,781,128 B2 | 8/2004 | Hirota et al. |
| 7,042,440 B2 | 5/2006 | Pryor et al. |
| 7,079,114 B1 | 7/2006 | Smith et al. |
| 7,084,859 B1 | 8/2006 | Pryor |
| 7,098,891 B1 | 8/2006 | Pryor |
| 7,328,119 B1 | 2/2008 | Pryor et al. |
| 7,401,783 B2 | 7/2008 | Pryor |
| 7,466,843 B2 | 12/2008 | Pryor |
| 7,489,303 B1 | 2/2009 | Pryor |
| 7,671,851 B1 | 3/2010 | Pryor |
| 7,675,504 B1 | 3/2010 | Smith et al. |
| 7,693,584 B2 | 4/2010 | Pryor et al. |
| 7,714,849 B2 | 5/2010 | Pryor |
| 7,756,297 B2 | 7/2010 | Pryor |
| 7,843,429 B2 | 11/2010 | Pryor |
| 7,933,431 B2 | 4/2011 | Pryor |
| 7,973,773 B2 | 7/2011 | Pryor |
| 8,013,843 B2 | 9/2011 | Pryor |
| 3,040,328 A1 | 10/2011 | Smith et al. |
| 8,044,941 B2 | 10/2011 | Pryor |
| 8,068,095 B2 | 11/2011 | Pryor |
| 8,068,100 B2 | 11/2011 | Pryor |
| 8,072,440 B2 | 12/2011 | Pryor |
| 8,083,588 B2 | 12/2011 | Pryor |
| 8,111,239 B2 | 2/2012 | Pryor et al. |
| 8,194,924 B2 | 6/2012 | Pryor |
| 8,228,305 B2 | 7/2012 | Pryor |
| 8,287,374 B2 | 10/2012 | Pryor |
| 8,306,635 B2 | 11/2012 | Pryor |
| 8,405,604 B2 | 3/2013 | Pryor et al. |
| 8,419,432 B2 | 4/2013 | Duke |
| 8,419,433 B2 | 4/2013 | Do et al. |
| 8,427,449 B2 | 4/2013 | Pryor |
| 8,482,534 B2 | 7/2013 | Pryor |
| 8,482,535 B2 | 7/2013 | Pryor |
| 8,530,842 B2 | 9/2013 | Has et al. |
| 8,533,079 B2 | 9/2013 | Sharma |
| 8,538,562 B2 | 9/2013 | Pryor et al. |
| 8,553,079 B2 | 10/2013 | Pryor |
| 8,576,199 B1 | 11/2013 | Pryor |
| 8,610,674 B2 | 12/2013 | Pryor |
| 8,614,668 B2 | 12/2013 | Pryor |
| 8,665,245 B2 | 3/2014 | Pryor |
| 8,736,548 B2 | 5/2014 | Pryor |
| 8,760,398 B2 | 6/2014 | Pryor |
| 8,847,887 B2 | 9/2014 | Pryor |
| 8,892,219 B2 | 11/2014 | Pryor |
| 9,330,469 B2 | 5/2016 | Guan |
| 9,374,672 B1 | 6/2016 | Chao et al. |
| 9,513,744 B2 | 12/2016 | Pryor |
| 9,723,693 B1* | 8/2017 | Megginson ........ G06K 9/00771 |
| 9,758,042 B2 | 9/2017 | Pryor |
| 2002/0036617 A1 | 3/2002 | Pryor |
| 2003/0163326 A1 | 8/2003 | Maase |
| 2005/0012720 A1 | 1/2005 | Pryor |
| 2005/0265423 A1 | 12/2005 | Mahowald et al. |
| 2008/0024463 A1 | 1/2008 | Pryor |
| 2008/0088587 A1 | 4/2008 | Pryor |
| 2008/0122799 A1 | 5/2008 | Pryor |
| 2008/0129707 A1 | 6/2008 | Pryor |
| 2009/0273574 A1 | 11/2009 | Pryor |
| 2009/0322499 A1 | 12/2009 | Pryor |
| 2010/0134612 A1 | 6/2010 | Pryor et al. |
| 2010/0182136 A1 | 7/2010 | Pryor |
| 2010/0182137 A1 | 7/2010 | Pryor |
| 2010/0182236 A1 | 7/2010 | Pryor |
| 2010/0194976 A1 | 8/2010 | Smith et al. |
| 2010/0231506 A1 | 9/2010 | Pryor |
| 2010/0231547 A1 | 9/2010 | Pryor |
| 2011/0018831 A1 | 1/2011 | Pryor |
| 2011/0032203 A1 | 2/2011 | Pryor |
| 2011/0037725 A1 | 2/2011 | Pryor |
| 2012/0218181 A1 | 8/2012 | Pryor |
| 2012/0277594 A1 | 11/2012 | Pryor |
| 2013/0057594 A1 | 3/2013 | Pryor |
| 2013/0175254 A1 | 7/2013 | Bach et al. |
| 2013/0176206 A1 | 7/2013 | Pryor |
| 2013/0215014 A1 | 8/2013 | Pryor |
| 2013/0215322 A1* | 8/2013 | Haler ................ H04N 1/19594 348/373 |
| 2013/0241823 A1 | 9/2013 | Pryor |
| 2013/0267318 A1 | 10/2013 | Pryor et al. |
| 2014/0313125 A1 | 10/2014 | Pryor |
| 2015/0070319 A1 | 3/2015 | Pryor |
| 2016/0219655 A1* | 7/2016 | Hirukawa ............ H05B 1/0261 |
| 2017/0115826 A1 | 4/2017 | Pryor |
| 2017/0201672 A1* | 7/2017 | Hayashi ............. H04N 5/23203 |
| 2017/0367151 A1 | 12/2017 | Rafii et al. |
| 2018/0130466 A1 | 5/2018 | Beifuss et al. |
| 2018/0253953 A1 | 9/2018 | Bucsa et al. |
| 2018/0345485 A1* | 12/2018 | Sinnet ................ G06T 7/73 |
| 2018/0372555 A1* | 12/2018 | Allen, Sr. ............. G01K 1/143 |
| 2020/0121125 A1* | 4/2020 | Zito ........................ A47J 36/32 |

FOREIGN PATENT DOCUMENTS

| | | |
|---|---|---|
| DE | 20005051 U1 | 6/2000 |
| DE | 10337538 A1 | 2/2005 |
| DE | 102006050041 A1 | 4/2008 |
| DE | 102008041390 A1 | 2/2010 |
| DE | 102011081303 A1 | 2/2013 |
| DE | 102013206340 A1 | 10/2014 |
| DE | 102014201636 A1 | 7/2015 |
| DE | 102016104696 A1 | 9/2017 |
| EP | 0563698 A2 | 10/1993 |
| EP | 1485652 B1 | 5/2006 |
| EP | 2634495 A2 | 9/2013 |
| EP | 3063474 A1 | 9/2016 |
| EP | 2581248 B1 | 11/2016 |
| EP | 2562480 B1 | 3/2018 |
| EP | 2615376 B1 | 4/2018 |
| EP | 2748534 B1 | 12/2018 |
| EP | 2326882 B1 | 2/2019 |
| EP | 2505923 B1 | 9/2019 |
| EP | 3258175 B1 | 9/2019 |
| GB | 2564657 A | 1/2019 |
| JP | 2001201057 A | 7/2001 |
| JP | 2003083545 A | 3/2003 |
| JP | 2017133722 A | 8/2017 |
| WO | 2003074940 A1 | 9/2003 |
| WO | 2004091956 A2 | 10/2004 |
| WO | 2010135478 A2 | 11/2010 |
| WO | 2013026766 A1 | 2/2013 |
| WO | 2015062666 A1 | 5/2015 |

(56) References Cited

FOREIGN PATENT DOCUMENTS

| WO | 2017026962 A1 | 2/2017 |
| WO | 20017115334 A1 | 7/2017 |

OTHER PUBLICATIONS

Xenics Infrared Solutions, History of Infrared Detectors, Available at xenics.com/HistoryOf-Infrared-Detectors/, Accessed Jun. 15, 2022.

* cited by examiner

COOKING ASSISTANCE APPLIANCE

BACKGROUND

Cooking appliances, such as cooktops, ranges, etc., have hobs or burners that emit heat to heat or cook edible items, and are often housed in a kitchen within a home or business. A cooking vessel of some type, like a skillet, pot, or pan, is placed on the burner where heat from the burner is transferred to the cooking vessel. The heat from the burner requires attention and monitoring by the user. For example, the heat applied to liquid food items can cause boiling and bubbling leading to splatter and splashing, which can make a mess or even burn a user. Furthermore, food items can burn, causing smoke or even fire. Additionally, cooking can be a challenge to a user who is inexperienced or attempting to juggle cooking multiple recipes or food items simultaneously.

SUMMARY

In one aspect, the disclosure relates to a mess detector for a cooking appliance having a cook surface with one or more heating zones, the mess detector comprising: a housing having a mount for securing to the cooking appliance or nearby structure within a line of sight of the cook surface; at least one sensor configured to sense a mess on the cook surface, the at least one sensor comprising a visual light imaging device and outputting image data; and a projector emitting a projected image indicative of a sensed mess onto the cook surface; and a controller comprising a processor receiving the image data and programmed with one or more algorithms to process the image data to determine when a mess has occurred on the cook surface and indicating that a mess is detected.

In another aspect, the disclosure relates to a for method determining a liquid level within a cooking vessel with an open top positioned on a heater of a cooking surface, the method comprising: taking an image with a camera of the cooking surface from a vantage point at an acute angle relative to the cooking surface, with the image including the cooking vessel and at least a portion of the cooking surface; processing the image to determine a volume of the cooking vessel without liquid to define an empty volume value; determining a total volume for the cooking vessel; and determining a volume of the liquid by subtracting the empty volume from the total volume.

In yet another aspect, the disclosure relates to a method of determining a liquid amount of a liquid in a cooking vessel on a cook surface of a cooking appliance, the method comprising: in real-time, sensing the amount of liquid in the cooking vessel with a sensor having a sensing field encompassing the cooking vessel; and in real-time, projecting an image indicative of the sensed amount of liquid onto the cook surface in a human readable form.

In one aspect, the disclosure relates to a method of sensing a mess condition associated with a cooking vessel within a heating zone of a cook surface of a cooking appliance, the method comprising: generating a first set of 2D image data from a first 2D image sensor having a first field of view encompassing at least the one heating zone of the cook surface; generating a second set of 2D image data from a second 2D image sensor having a second field of view encompassing at least the one heating zone of the cook surface, with the second field of view having an origin different than the first field of view; processing with a processor programmed with a 3D algorithm a 3D image of the at least one heating zone from the first and second 2D image data; processing the 3D image with a processor programmed with a mess detection algorithm; and issuing a notification when a mess condition is detected.

In one aspect, the disclosure relates to a method of estimating a boiling time for a liquid within a cooking vessel sitting in a heating zone of a cook surface for a cooking appliance, the method comprising: taking a visible light image of the cooking vessel with an imaging sensor having a field of view encompassing the cooking vessel; processing the visible light image to determine a volume of liquid within the cooking vessel; estimating a boiling time of the volume of liquid; and displaying the estimated boiling time on the cooking surface.

In one aspect, the disclosure relates to a method of implementing a mess detection algorithm for a cooking appliance having a cook surface with at least one heating zone with a heater and a cooking vessel containing a food item located in the heating zone, the method comprising: inputting to the cooking appliance the food item within the cooking vessel; selecting a mess detection algorithm for the input food item from a dataset of mess detection algorithms and corresponding food classifications; implementing the selected mess detection algorithm by taking a visual light image with an image sensor having a field of view of the heating zone to generate image data and processing the image data according to the selected mess detection algorithm to determine the occurrence of a mess; and issuing a notification when a mess is determined.

In one aspect, the disclosure relates to a method of implementing a mess detection algorithm for a cooking appliance having a cook surface with at least one heating zone with a heater and a cooking vessel containing a food item located in the heating zone, the method comprising: taking a visible light image of the cooking vessel with an imaging sensor having a field of view encompassing the cooking vessel to generate image data; sending the image data to a cloud-based processor remotely located from the cooking appliance and the imaging sensor; processing the image data with a mess detection algorithm programmed in the processor to determine the presence of a mess; and issuing a notice notification when a mess is determined.

In one aspect, the disclosure relates to a cooking assistance appliance for use with a cooking appliance, the cooking assistance appliance comprising: a visual light image sensor for generating image data of the cooking appliance; an infrared sensor for generating thermal data of the cooking appliance; a controller including a processor configured to process the image data and the thermal data to determine a condition of a food item in a cooking vessel on the cooking appliance; and a communication interface communicating the determined condition in human understandable form.

DESCRIPTION OF EMBODIMENTS OF THE INVENTION

The disclosure relates to household appliances and more particularly, a cooking assistance appliance for facilitating use and monitoring of cooking appliances such as stovetops or ranges. The cooking assistance appliance can provide for assisting the user in using the cooking appliance, such as facilitating cooking and operating the cooking appliance. Additionally, the cooking assistance appliance can provide for monitoring the cooking appliance during use, which can provide for reducing messes and improving overall user experience.

Figure 1:
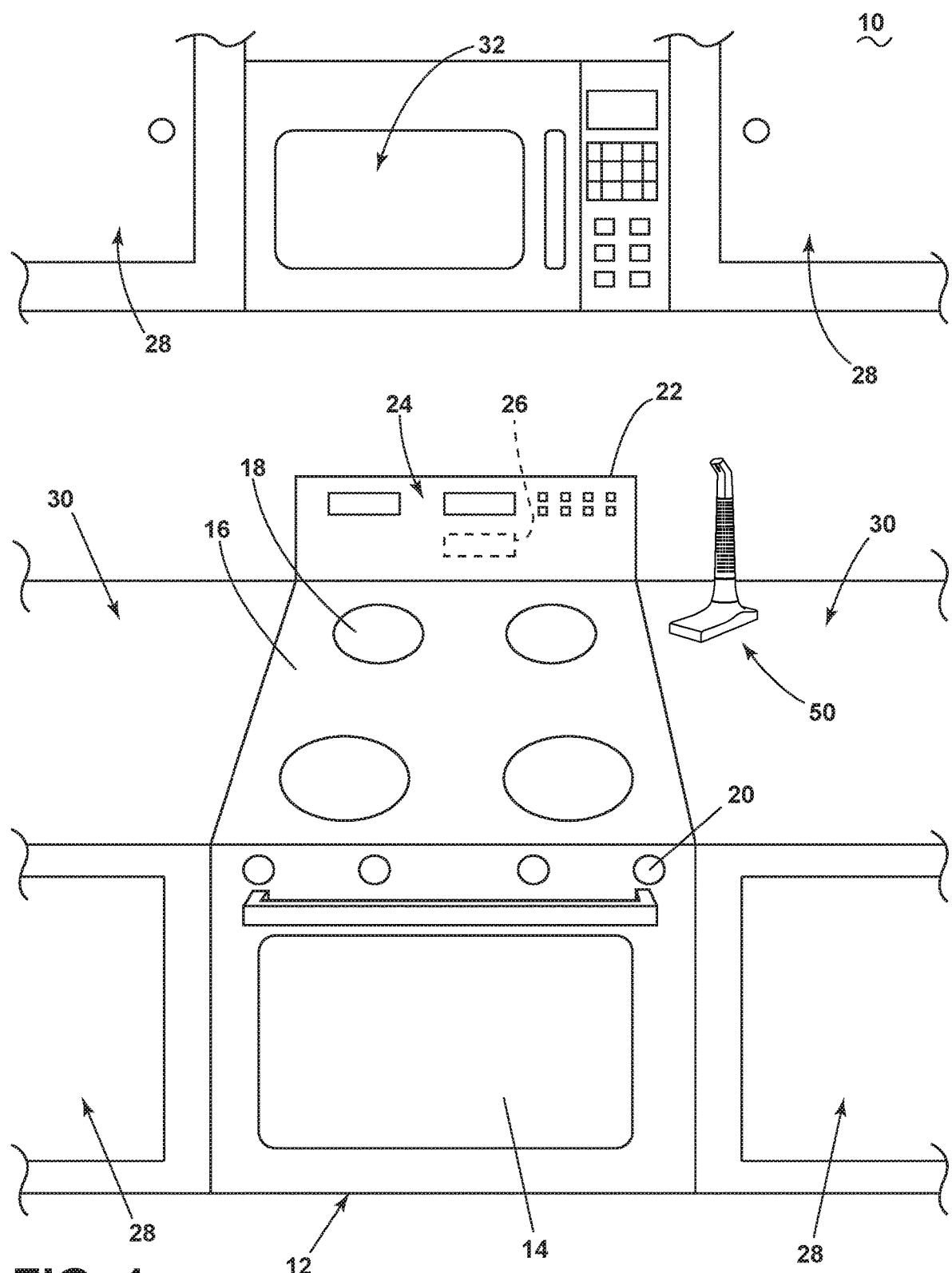
FIG. 1 is a perspective view of a cooking appliance having a cooking area in combination with a cooking assistance appliance positioned near the cooking appliance.

Referring to FIG. 1, a cooking area 10 can be defined as and including one or more cooking appliances or cooking surfaces, often referred to as a kitchen, while it is contemplated that the cooking area 10 need not be defined in a conventional type kitchen, and can include any area where cooking or preparation of food is to occur, such as an outdoor cooking area, commercial kitchen, restaurant or business, grilling area, or common or public cooking area. The cooking area 10 includes a cooking appliance 12 including an oven 14 and a stovetop 16, also referred to as a cooktop or range. Alternatively, the cooking appliance 12 can only include the stovetop 16, and need not be a full oven and stove combination. The stovetop 16 can include a set of burners or heaters 18, which can define a heating zone for heating a cooking utensil, such as a pot or pan. The heaters 18 can be controlled with a set of knobs 20 provided on the cooking appliance 12. The heaters 18 can be gas or electric, for example, while alternative heating methods are contemplated such as convection, conduction, or induction.

The cooking appliance 12 can further include a rear panel 22 with a user interface 24. The user interface 24 can be used to control operation of the cooking appliance 12, such as setting a temperature for the oven 14 or a timer. In one alternative example, the user interface 24 can be used to control the heaters 18 in lieu of the knobs 20. A controller 26 or cooking controller is provided in the cooking appliance 12 for operating the cooking appliance 12, and can be included in the rear panel 22 near the user interface 24, for example. The controller 26 can include a processor and memory, as well as any other suitable component, for controlling and operating the cooking appliance 12. More specifically, the controller 26 can operate the cooking appliance 12 via input from a user received at the user interface 24, while it is contemplated that software can partially or fully automate operation of the cooking appliance 12 without direct control from the user. The controller 26, as well as the cooking appliance 12, can further be wirelessly enabled including a wireless communication module, such as being Wi-Fi enabled, permitting communication with a local or external network, as well as other devices or systems communicable with the cooking appliance 12 via the controller 26.

The cooking appliance 12 is provided between cabinets 28 on either side of the cooking appliance 12, while it is contemplated that the cooking appliance 12 can be stand-alone, or provided in any suitable position. Each cabinet 28 can include a countertop surface 30. A microwave-cooking appliance 32 can be mounted above the cooking appliance 12 and can be positioned above and can overhang the stovetop 16. Additional cabinets 28 are also provided on either side of the microwave-cooking appliance 32, overhanging the cabinets 28 below.

A cooking assistance appliance 50, or mess detector, is provided on one countertop surface 30 adjacent to the stovetop 16. The position of the cooking assistance appliance 50 is exemplary, and can be positioned anywhere adjacent to the stovetop 16 as well as the area immediately adjacent to the cooking appliance 12. The cooking assistance appliance 50 can sense or measure the stovetop 16 and local area to determine and define the stovetop 16 as a virtual cook surface to be utilized by the cooking assistance appliance 50.

Figure 2:
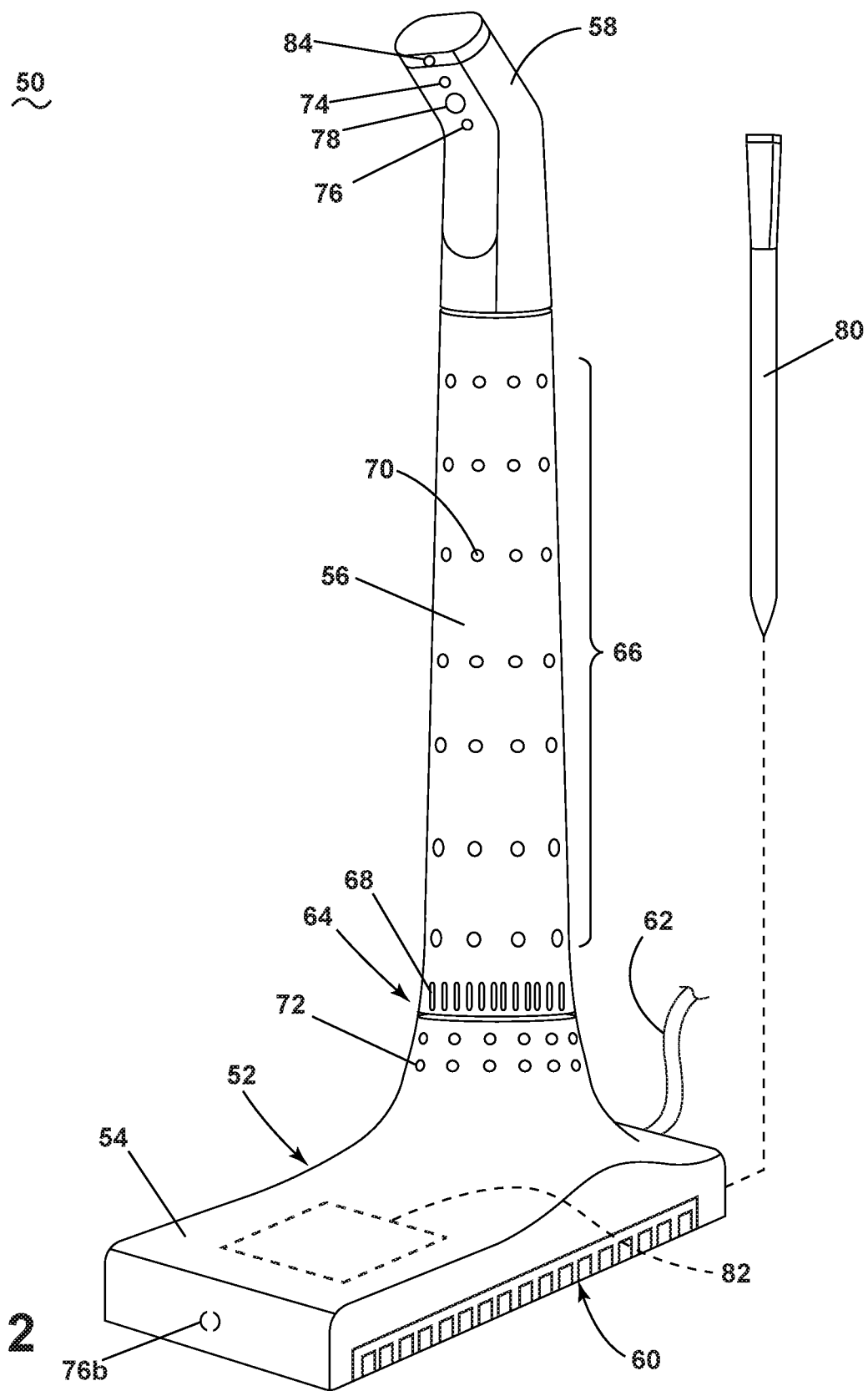
FIG. 2 is a perspective view of the cooking assistance appliance of FIG. 1 and including a cooking probe.

Referring to FIG. 2, the cooking assistance appliance 50 includes an elongated body as a housing 52, which can be positioned to have a line of sight with the stovetop 16, and defining a tower configuration having a base 54 with a neck 56 extending from the base 54 and terminating at a head 58 angled from the neck 56. The cooking assistance appliance 50 can further include an optional mount for securing the cooking assistance appliance 50 to the cooking appliance 12 or other nearby structure, such that the cooking assistance appliance 50 includes a line of sight of the stovetop 16 via one or more sensors described herein. The base 54 includes a generally rectangular, cubic shape, with a curved portion transitioning to the neck 56, while any shape is contemplated. The base 54 is preferably weighted, to provide for a low center of gravity to minimize falling or toppling of the cooking assistance appliance 50. A set of vent openings 60 can be provided in the housing 52 for venting air to or from the interior electrical components, such as for cooling the interior electrical components, while it is contemplated that an interior sensor can be used to test air drawn into the housing 52, such as for smoke detection. An electrical connection 62 can be provided at the rear of the housing 52, with an electrical cord that can plug into the housing 52 to power the cooking assistance appliance 50.

The neck 56 can be a substantially cylindrical shape, and can have a decreasing cross-sectional area extending toward the head 58, thinning as it extends from the base 54. The neck 56 can include a rotation portion 64 and a light portion 66. The rotation portion 64 can provide for rotating the light portion 66 and the head 58 relative to the base 54, and can include a set of ridges 68 to facilitate handling and rotating by a user. Rotation of the rotation portion 64 provides for orienting the head 58 to face towards the stovetop 16, and can provide for tailoring the head 58 to have an optimal view of both the cooking appliance 12 and surrounding area at various positions in the cooking area 10. The light portion 66 can include a light array as a set of light emitting diodes (LEDs) 70, for example, for visually communicating with a user, described in further detail later on. A set of audio openings 72 can be provided on the neck 56 below the rotation portion 64, which can provide for audio communication with a user, such as including a speaker and microphone.

The head 58 can include one or more sensors, shown as three exemplary sensors as a light sensor, visual light sensor, or camera 74, a proximity sensor 76, and an infrared camera or infrared sensor 78 or other thermal sensor. The camera 74 can provide for imaging the cooking appliance 12, such as the stovetop 16. In one example, the camera 74 can be a visible light image sensor, configured to capture light in the visible range wavelength spectrum. In another example, the camera can be a two-dimensional (2D) camera sensor configured to capture frames at a predetermined interval. In another example, the camera 74 can be a three-dimensional (3D) camera capable of stereoscopic reconstruction. In yet another example, there can be more than one camera sensor, such as two 2D cameras where an image processor or software can compute a depth based upon a comparison of the images from the separate 2D cameras. Regardless, the camera 74 can be capable of either or both image capture as well as video capture.

The proximity sensor 76 can be used to determine the position of a user relative to the cooking assistance appliance 50. Additionally, the proximity sensor 76 can be a depth sensor, such as a dedicated time of flight camera or a combination of two image sensors and an image-processing device implementing a stereoscopic camera. In an alternate position, a proximity sensor 76b can be integrated into the load-bearing base 54, configured such that the sensor faces outwardly toward a user, pet, or other entity or item existing at the cooking appliance 12 or the local vicinity. Additionally, the rotation portion 64 can provide for adjusting the base 54 to have an optimal view of the local kitchen area or the room containing the cooking assistance appliance 50, while the head 58 maintains a proper line of sight of the stovetop 16. Alternatively, the proximity sensor 76b can including a lens on the front of the base 54, while the sensor itself is mounted inside the base 54, such as along the top inside wall of the base 54. The proximity sensor 76 can also be a RADAR detector or, more specifically, an ultra-wide band (UWB) radar, as well as a wide-angle lens, thermal, dynamic, or other suitable sensor for use as a proximity sensor.

The infrared sensor 78 can be a 2D optical infrared sensor, and can be used to determine local temperatures on the cooking appliance 12 as thermal maps at predetermined intervals. The infrared sensor 78 can also determine external temperatures of a food item or external temperature data, such as in order to determine a doneness of the food item. Additionally, the infrared sensor 78 in combination with the camera 74 can determine a condition of a food item relating to a status of the food item. Alternatively, the infrared sensor can be arranged as a matrix or grouping of infrared sensors, such as non-optical infrared sensors like a thermopile that uses multiple thermocouples that can generate electrical signals indicative of the local temperatures. Additionally, it is contemplated that the 2D infrared sensor is combined with a 2D camera sensor 74 to develop 3D thermal maps of the cooking appliance 12. Furthermore, it should be appreciated that the infrared sensor 78 can be optional, and that the cooking assistance appliance 50 can include only the camera 74, only the proximity sensor 78, only the infrared sensor 76, or a combination of any two or three thereof.

It is further contemplated that the cooking assistance appliance 50 can include an optional projector 84, or other light emitting device such as a digital light processing (DLP) projector such as a digital micromirror device, capable of projecting an image onto a countertop, the stovetop 16 or other portions of the cooking appliance 12, or other local areas in order to visually communicate with the user. For example, a recipe can be selected on the cooking assistance appliance 50 or provided by the user to the cooking assistance appliance 50, which can display the recipe via the light emitting device. The projected image can be in human readable format or contain human readable information, such as text, images, or indicia, which are readily readable or recognizable by a human user, without any intervening processing by a non-human device. QR codes and bar codes are not human readable as they require intervening processing. Additional display items can include, but are not limited to, warnings, timers, volume information, cooking temperature, doneness, or discrete cooking instructions.

Additionally, a probe 80 can be included with the cooking assistance appliance 50. The probe 80 can wirelessly communicate with the cooking assistance appliance 50, such as providing interior temperatures, temperature date, or internal temperature data for food items being cooked within the oven 14 or stovetop 16 of FIG. 1 via wireless signal, such as Bluetooth in one non-limiting example. Alternatively, it is contemplated that the probe 80 is wired or connectable to the cooking assistance appliance 50. In one example, the probe 80 can be battery powered, and can be charged and stored within a port within the base 54 of the cooking assistance appliance 50.

A controller 82 can be provided in the housing 52, and is shown as positioned within the base 54, while any position is contemplated. The controller 82 can provide for controlling and operating the cooking assistance appliance 50, as well as communicating with exterior networks or other appliances. For example, the LEDs 70, the speaker and microphone, the camera 74, the proximity sensor 76, infrared sensor 78, and the probe 80 can be operably and communicatively coupled to the controller 82.

Figure 3:
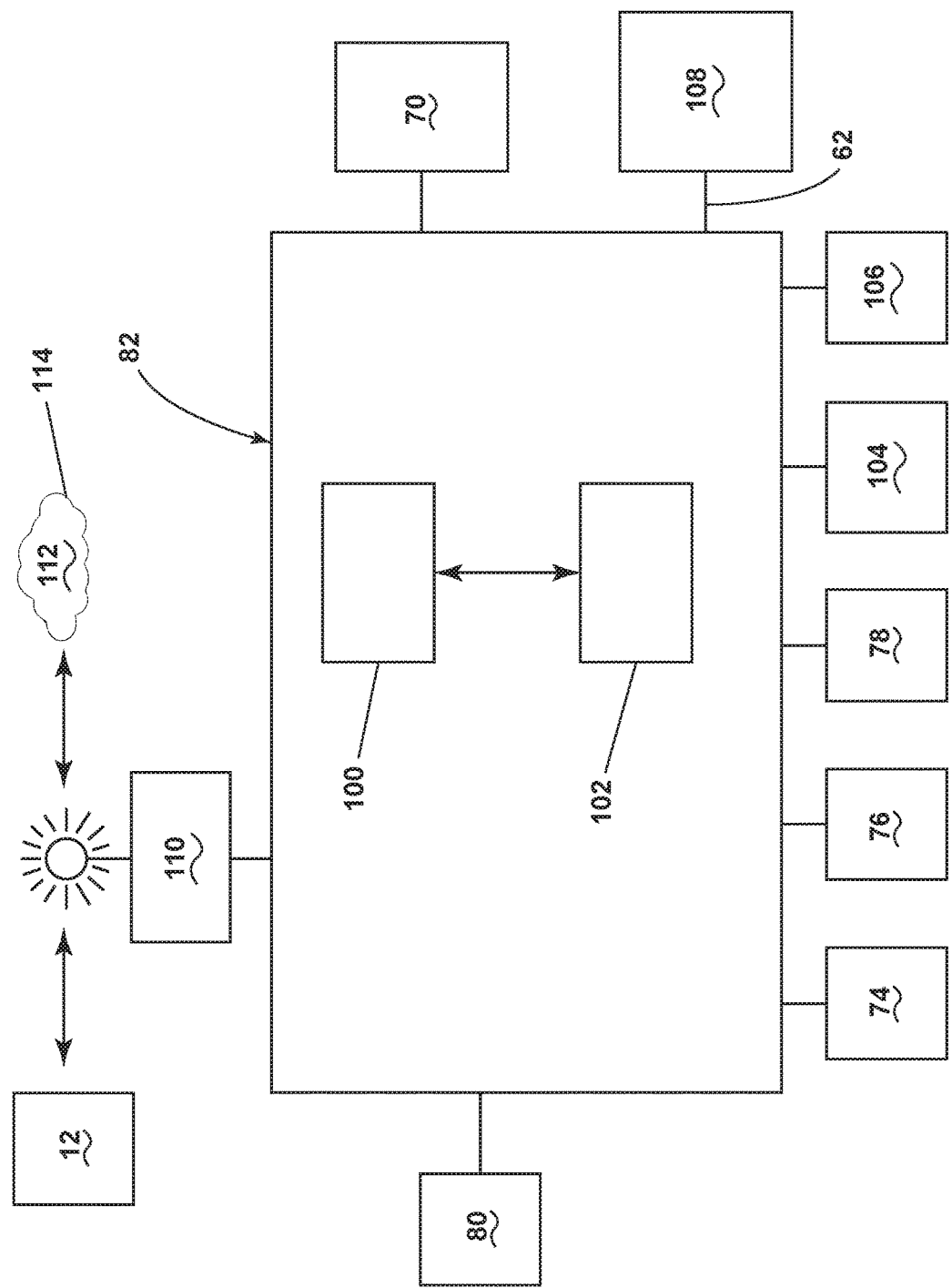
FIG. 3 is a schematic view of a controller and control system provided within the cooking assistance appliance of FIG. 2.

Referring to FIG. 3, the controller 82 can include a central processing unit (CPU) 100 and a memory 102. The memory 102 can be used for storing the control software that is executed by the CPU 100 as well as any additional software. The CPU 100 can also include an image processor configured to compute a depth map based upon the 2D images captured by the 2D camera(s) 74, as well as buffering the images for video recording or sharing. As the images from the camera 74 or the infrared sensor 78 are recorded at regular intervals, the CPU 100 can process the images to identify portions of the cooking appliance 12 or cookware and food items contained thereon. Additionally, the CPU 100 can utilize the recorded images using a learning algorithm to determine patterns or commonalities to improve total knowledge of aspects such as food recognition, user gestures, alert conditions, or mess conditions, described in detail herein. Such knowledge can be stored and accessed from the memory 102. In this way, the CPU 100 can implement a continuous learning process, sometimes referred to as transfer learning, to operate a learning scheme to update system parameters based upon user preferences and suggestions. Such information can be used to generate case analyses for operating the cooking assistance appliance 50. This process can be referred to as the deep learning approach for the cooking assistance appliances discussed herein.

The deep learning approach can further include a fixed operating structure, including a number of layers or a typology of layers as well as an input/output data format. Furthermore, the deep learning approach can include a variable or a trainable weight lists, based upon user preferences, which can be used to vary or tailor the importance of operating structures based upon user preferences. More specifically, the weights lists can be tailored over time based upon user interaction with the cooking assistance appliance 50 and what the user most frequently utilizes. For example, where a user most often utilizes a mess detection or monitor feature, the topology of input/output data can be weighted to monitor mess detection or other monitoring features above other capabilities. The weight lists can further be developed via a network to identify use cases such as recipes or mess conditions. The CPU 100 can output a list of features tailored to the user cases, which can be implemented by the cooking assistance appliance 50. Further still, the CPU 100 can include algorithms or perform mathematical operations on recorded images from the camera 74. The algorithms can represent an input layer, which can define a unique ID for the use case related to the current operation of the cooking appliance 12. The images can be sent to the cloud 114 or a network 112 for augmenting knowledge for a global classifier, available to all cooking assistance appliances, which can be used to identify user habits, or facilitate training or mentoring of the user. Such trained weightings or use cases can also be downloaded to update operation of the cooking assistance appliance 50.

The memory 102 can also be used to store information, such as a database or table, and to store data received from one or more components of the cooking assistance appliance 50 that may be communicably coupled with the controller 82. The database or table can be used to store the various operating parameters for the cooking assistance appliance, including factory default values for operating parameters and any adjustments to them by the control system or by user input. Additionally, it is contemplated that the memory 102 can store common settings, recipes, or other preferences common to the user, or any information determined using the deep learning approach. The memory 102 can also store static color information, static shape information, or static temperature information, which can be used by the CPU to determine use cases or update processes via deep learning.

The controller 82 can be communicatively and operably coupled to the other components of the cooking assistance appliance 50, including the camera 74, the proximity sensor 76, the infrared sensor 78, a speaker 104 or other sound emitter, and a microphone 106 or other sound receiver. The speaker 104 and microphone 106 can provide for open loop communication with a user. For example, the cooking assistance appliance 50 can communicate with and alert a user regarding messes, mistake avoidance, or additional monitoring of the cooking appliance 12.

The controller 82 can be coupled to the probe 80. In one example, the probe 80 can be physically connected to the cooking assistance appliance 50, such as for charging the probe 80, while it is contemplated that the probe 80 can be wirelessly, communicatively coupled to the cooking assistance appliance 50, such as via radio frequency for measuring a temperature of a food item separate from the cooking assistance appliance 50, such as in the oven 14. Furthermore, the controller 82 can be connected to a power source 108, such as via the electrical connection 62. The controller 82 can be operably coupled to the light array of LEDs 70, such as for controlling operation, color, or patterning of the light array.

Additionally, the controller 82 can be programmed with a setup algorithm. The setup algorithm can include a process or series of actions, such computational or physical steps, or a combination thereof, to determine information related to the cooking appliance 12, the stovetop 16, and other information related to the cooking assistance appliance 50 and the area proximate the cooking appliance 12. The setup algorithm can utilize the sensors, such as the camera 74, the proximity sensor 76, or the infrared sensor 78, for example, to digitally or virtually map the stovetop 16, utilizing one or more sensors, such as the camera 74 to provide image data, with the setup algorithm using the images to develop a virtual cook surface representative of the stovetop 16, the boundaries thereof, and the heaters 18 as the virtual cook surface. The virtual cook surface mapped by the setup algorithm can include information or data representative of the stovetop 16, such as the boundary, sizes and distances, depth, distance from the sensors or the cooking assistance appliance 50, the number and position of the heaters 18, temperatures, local temperatures, local temperature changes, cooking vessels or cookware items placed on or near the stovetop 16, food items on or near the stovetop 16 as well as a status thereof, a user's location, existence, or absence, or messes, in non-limiting examples. Additional information that can be mapped by the controller 82 can include local kitchen environment information, such as kitchen layout, the existence or position of other cooking appliances, kitchen appliances, or other appliances, the position or existence of a user, or any other features which can be beneficial or suitable for use by the cooking assistance appliance 50.

The cooking assistance appliance 50 can be coupled to a wireless communication module 110, such as a combination transmitter and receiver. The wireless communication module 110 can be used for communication with a network 112, for example, such as a database or the internet via WI-FI. Another exemplary network 112 can include what is commonly referred to as the 'Cloud' 114, as a remote storage location for providing information, storage, data, or computational assistance (commonly referred to as cloud-computing or cloud-processing) utilizing a cloud-based processor in communication with the cooking assistance appliance 50 via the network connection. Alternatively or additionally, the wireless communication module 110 could be used for local communication, such as with the user, a user's smartphone or other local device such as a laptop, or other local appliances. In this way, the wireless communication module 110 further provides for open loop communication with the user remote from the cooking appliance 12, where the speaker 104 and microphone 106 cannot reach the user. Additionally, the cooking assistance appliance 50 can be in communication with the oven 14 or stovetop 16 that the cooking assistance appliance 50 is monitoring. Such local communication can be via Bluetooth or near-field communication (NFC), in non-limiting examples, and can define a closed loop communication system between the cooking appliance 12 and the cooking assistance appliance 50. The closed loop communication system can provide for notifying a user of a condition of a food item as a status of the food item, as well as automatically adjusting settings on the stovetop 16, such as burner temperatures based upon certain conditions, such as a mess condition, cooking status of a food item, or appropriate doneness of a food item. The cooking status, for example, can be one of a liquid volume, liquid level measurement, food doneness, mess condition, food temperature, or cooking appliance temperature in non-limiting examples.

Furthermore, the wireless communication module 110 can provide for remote monitoring of the cooking process, such as by communicating with a user remote from the cooking appliance 12. Such communication can include status, time remaining, or alerts in non-limiting examples. In addition, images of the food or cooking videos can be shared through social media via the camera 74 and the wireless communication module 110, or can be uploaded to a database or other storage for analysis and use by the deep learning system or use cases.

Figure 4:
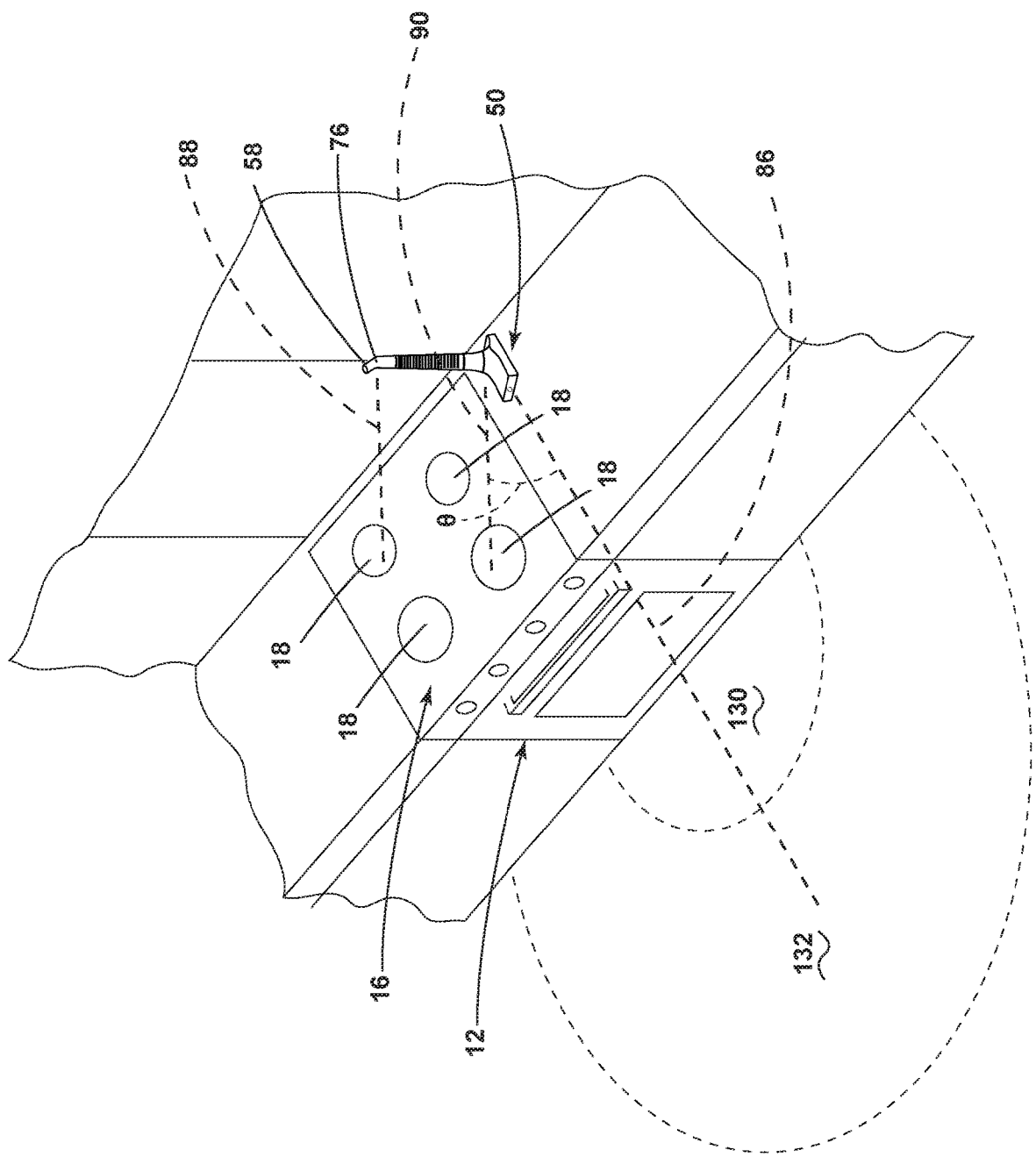
FIG. 4 is a perspective view of the cooking area of FIG. 1 including location zones monitored by the cooking assistance appliance of FIG. 2.

Referring to FIG. 4, the proximity sensor 76 on the cooking assistance appliance 50 can be used to monitor one or more zones, shown as a first zone 130 and a second zone 132, while more or less zones are contemplated. In one example, the first zone 130 can be one meter and the second zone can be two meters, while other distances are contemplated. Furthermore, the proximity sensor 76 can be modified by the user to determine the distance of the zones 130, 132 based upon the particular kitchen environment, as well as sensor sensitivity. Monitoring of the zones 130, 132 can be used to determine the position or presence of a user. For example, the proximity sensor 76 can be used to determine if the user is immediately in front of the cooking appliance 12, such as for preparing food and standing within the first zone 130. Additionally, the proximity sensor 76 can be used to determine if the user is in the second zone 132, near the cooking appliance 12, but having stepped away from immediately adjacent to the cooking appliance 12, such as to gather or prepare other cooking items. Additionally, the cooking assistance appliance 50 can determine if the user is in neither the first zone 130 nor the second zone 132.

Utilizing the proximity sensor 76, or alternatively the infrared sensor 78 or the camera 74, the cooking assistance appliance 50 can determine the location of the user can be utilized by the cooking assistance appliance 50 to determine how the cooking assistance appliance 50 operates. For example, when the user is in the first zone 130, the cooking appliance may initiate a cooking process, such as preparing or interacting with the food. When the user is in the second zone 132, the cooking assistance appliance 50 can use sounds or other audible descriptions to inform a user about a specific issue, such as an impending mess condition or an upcoming cooking step. Additionally, the cooking assistance appliance 50 may not attempt to communicate with a user locally when the user is not within either zone 130, 132, but can rather communicate with the user wirelessly, such as sending a notification to a mobile device to get the attention of the user and draw the user into one of the first or second zones 130, 132. In this way, it should be appreciated that the operation of the cooking assistance appliance 50 can be tailored based upon the existence of a user within a particular zone nearer to or further from a user, or the absence thereof. Additionally, it should be appreciated that the proximity sensor 76 is not required, but rather the camera or infrared sensor can serve the function of the proximity sensor 76, determining the position of the user in one of the zones 130, 132. Furthermore, the cooking assistance appliance 50 can acknowledge the presence of a user or use of the stovetop 16 when within the first zone 130. Further yet, the cooking assistance appliance 50 can turn on/off when the user enters or leaves the zones 130, 132. Further still, the cooking assistance appliance 50 can initial a question and answer mode with the user to determine the user's use intent, and if cooking assistance is required.

It should be further appreciated that the zones 130, 132 can be tailored or set by the user in order to be specific to the local set up of the kitchen or building, as well as user needs. More specifically, the base 54 and the head 58 can be rotated manually or automatically, relative to each other via the neck 56, best described in FIG. 2. The user can manually or automatically rotate the position of the head 58 to consistently face the stovetop 16, while the user can rotate the position of the base 54 to have the best or widest view of the zones 130, 132. For example, where a proximity sensor is integrated into the base 54, it may be best to orient the base perpendicular to the wall behind the stovetop 16, so the proximity sensor 78 faces directly outwardly, rather than toward the stovetop 16. Alternatively, the user may want to adjust the position of the base 54 based upon the particular layout of the kitchen, which may be non-traditional or unique. In this way, the cooking assistance appliance 50 can be rotated and adjusted to have the best view of both the stovetop 16 and the local area for defining and monitoring the zones 130, 132.

Further yet, the rotation portion 64 described in FIG. 2 can provide for adjusting the orientation of the cooking assistance appliance 50. A first base center axis 86 can extend forward from the cooking assistance appliance 50, such as perpendicular to the rear wall behind the cooking appliance 12. The head 58 can be rotated to have a line of sight 88 of the stovetop 16, such as at an angle θ relative to the first base center axis 86, relative to a projection of the line of sight 90 onto the stovetop 16. In one example, the angle can be 45-degrees. In this way, the cooking assistance appliance 50 can be moved or placed on either side of the cooking appliance 12, while maintaining a proper view of the first and second zones 130, 132. Preferably, the cooking assistance appliance can have 270-degrees of movement, while lesser amounts, such as 180-degrees, are contemplated.

Figure 5:
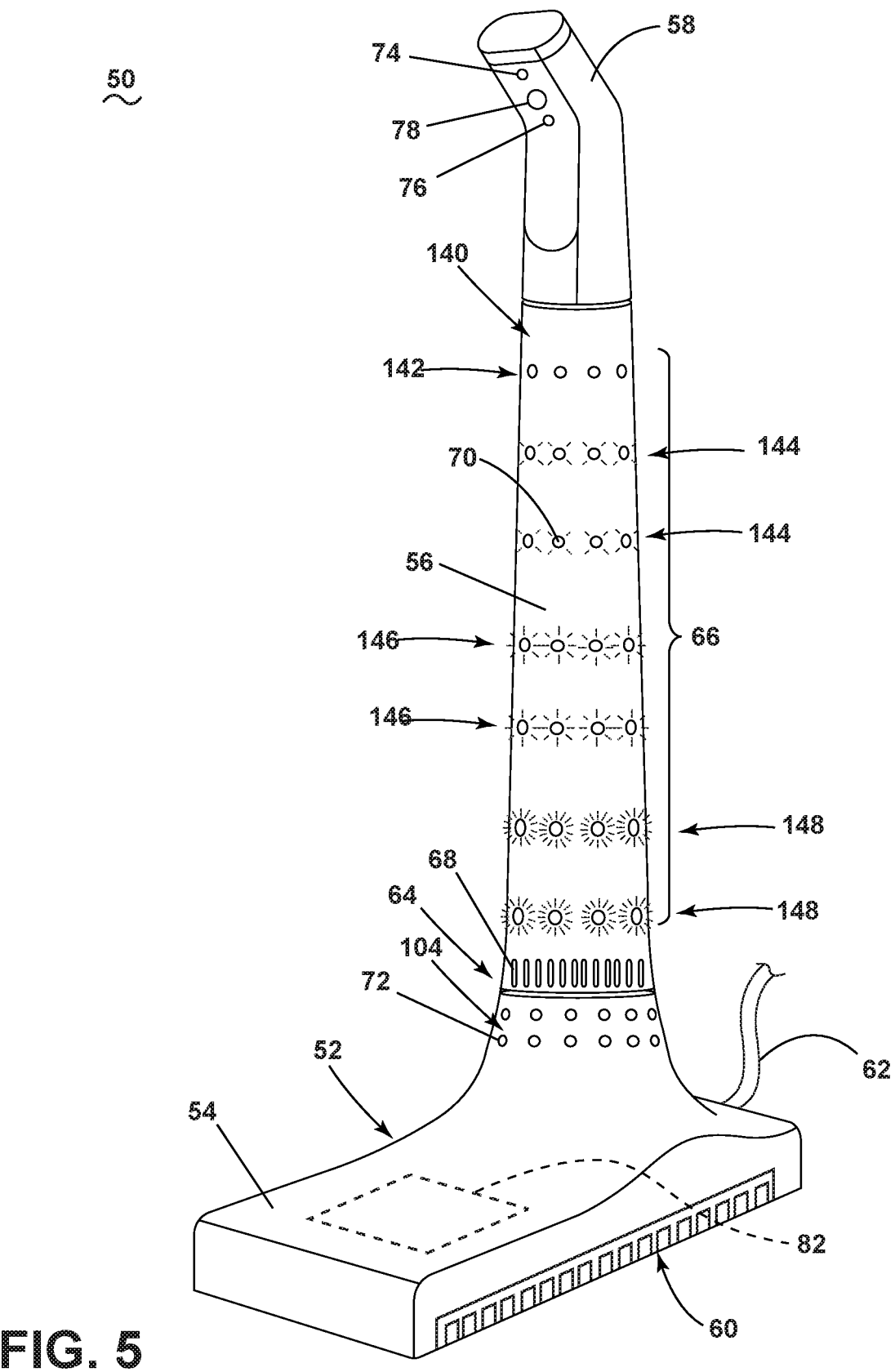
FIG. 5 is a perspective view of the cooking assistance appliance including an activated light array.

Referring to FIG. 5, the LEDs 70 on the cooking assistance appliance 50 forming a light array 140 on the light portion 66 can be selectively illuminated. Selectively illuminated can include a light pattern generated by timed operation of one or more lights to illustrate a light pattern. Additionally, selectively illuminated can include a particular color or light intensity. Turning particular LEDs 70 on or off, as well as varying color and intensity can provide for communicating a status to a user. For example, a timer can be indicated by the light array 140. As the timer counts down, the light array 140 can slowly turn the LEDs 70 off in a direction from the head 58 toward the base 54. For example, a top-most row 142 of LEDs 70 is off, the second two rows 144 are slightly illuminated, the next two rows 146 are moderately illuminated, and the bottom two rows 148 are fully illuminated. As time passes, the lower rows 144, 146, 148 will dim and eventually turn off, until the timer expires. Additionally, a change in color can occur with the light change. For example, the color can begin as green, and slowly fade to a red color as the timer counts down. In this way, it should be appreciated that the light array 140 can be used to communicate a status to the user. It should be further appreciated that additional information can be indicated to the user beyond only a timer, such as a food temperature, a stovetop temperature, a warning regarding a mess condition, or even identifying a particular user, recipe, cookware item, or food item in non-limiting examples. Furthermore, it is contemplated that the light array 140 can communicate with a user in complement with an audible communication from the speaker 104.

Figure 6:
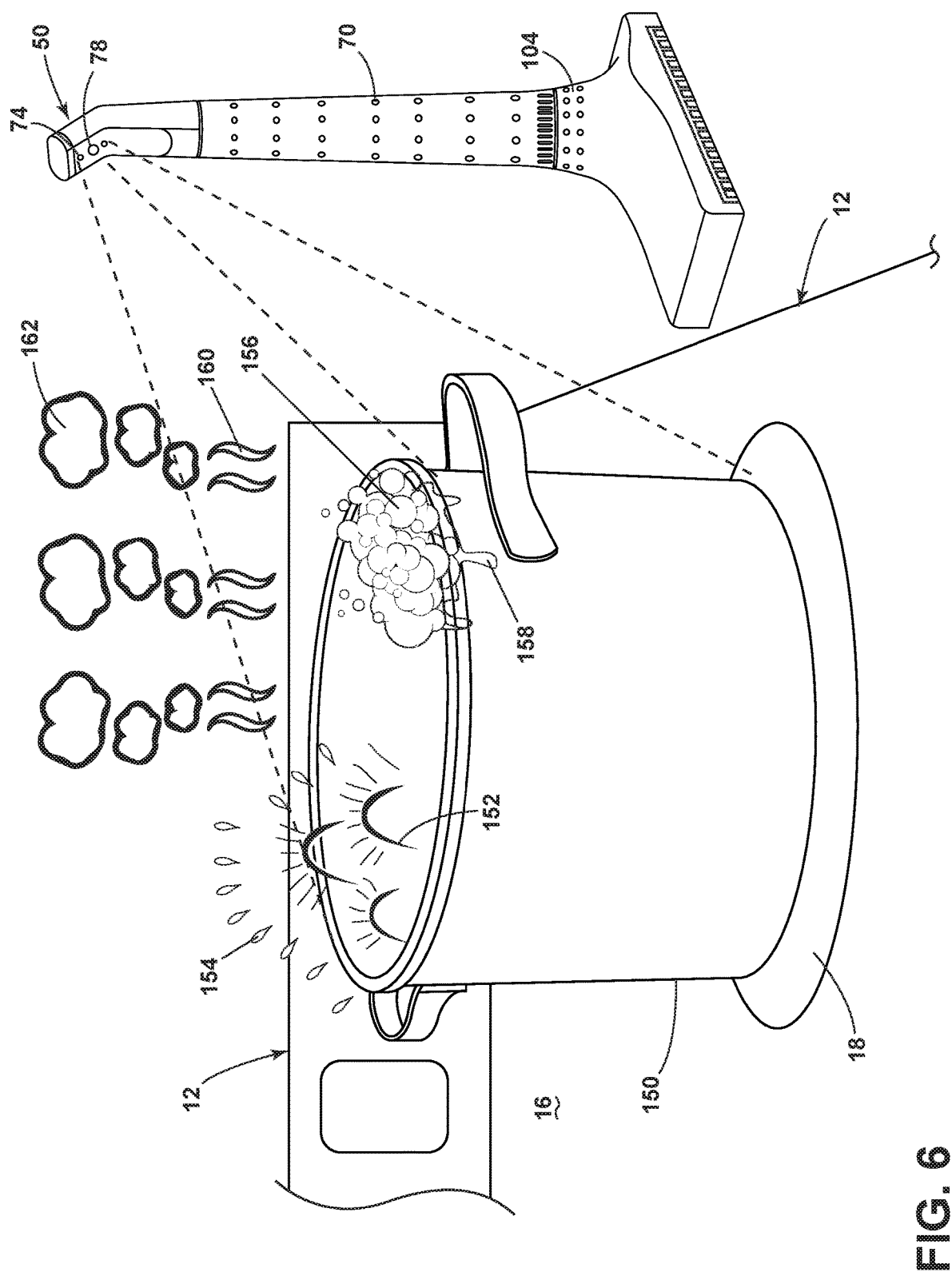
FIG. 6 is a view of the cooking assistance appliance of FIG. 2 monitoring for a mess from a cooking vessel on a burner of the cooking appliance of FIG. 1.

Referring to FIG. 6, a rear corner of the cooking appliance 12 is shown with a cooking utensil as a pot 150 provided on one heater 18 on the stovetop 16 and having the cooking assistance appliance 50 provided adjacent to the cooking appliance 12 to provide mess prevention for the pot 150 while cooking or heating. Mess prevention as used herein can include detecting, indicating, and/or mitigating messes occurring or potentially occurring on the stovetop 16. Detecting can include continuously or semi-continuously measuring, such as with the camera 74 or infrared sensor 78, the condition of a food item such as cooking status, cooking utensil, or other item on the stovetop 16 to determine if a mess is occurring or will occur. Indicating can include identifying a mess occurring or an imminent mess, and communicating such to a user. Such communication can be in the form of an audible alert, such as an alarm via the speakers 104, or can alternatively be any suitable notification to the user. Examples of such notifications can include an indication of the LEDs 70 on the cooking assistance appliance 50, such as a red color, or sending a wireless communication to a user, such as an alert or message provided on a mobile device via the network 112 of FIG. 3. Mitigating can further include taking some action to prevent a mess from occurring or minimizing a mess already occurring. For example, the cooking assistance appliance 50 can be in communication with the cooking appliance 12. When the cooking assistance appliance 50 determines that a mess is imminent or occurring, the cooking assistance appliance 50 can instruct the cooking appliance 12, via wireless communication, to reduce a temperature, for example, in attempt to mitigate the mess before it occurs, or to reduce a mess presently occurring.

Messes can include, but are not limited to, bubbling or boiling over 152 or overfill of liquid, forming a splatter 154 or splashing, foaming 156 or bubbling, dripping 158 exterior of the pot 150, burning 160, or smoking 162. Additional sensors to detect the messes are contemplated. For example, the microphone can be used to determine a hissing noise, indicative of a fluid bubbling over on the pot 150 and evaporating on a heater 18. In another example, the cooking assistance appliance 50 may be equipped with an olfactory sensor to detect the presence of smoke or an undesirable scent during the cooking process, such as burning. In yet another example, it is contemplated that the cooking assistance appliance 50 be in communication with a smart home or other smart environment, such as to determine or alert a smoke or fire condition, such as via the smoke detectors within the smart home, where such a condition is occurring at the cooking appliance 12 or within the cooking area 10. In yet another example, the cooking assistance appliance 50 can include a volatile organic compound (VOC) sensor to detect a Maillard reaction, a chemical reaction between amino acids and sugar, during cooking. The Maillard reaction produces chemicals that contribute to flavor and aroma, and a VOC sensor can provide for detecting or monitoring certain compounds released during the cooking process to determine cooking doneness, accuracy, or status in non-limiting examples.

Figure 7:
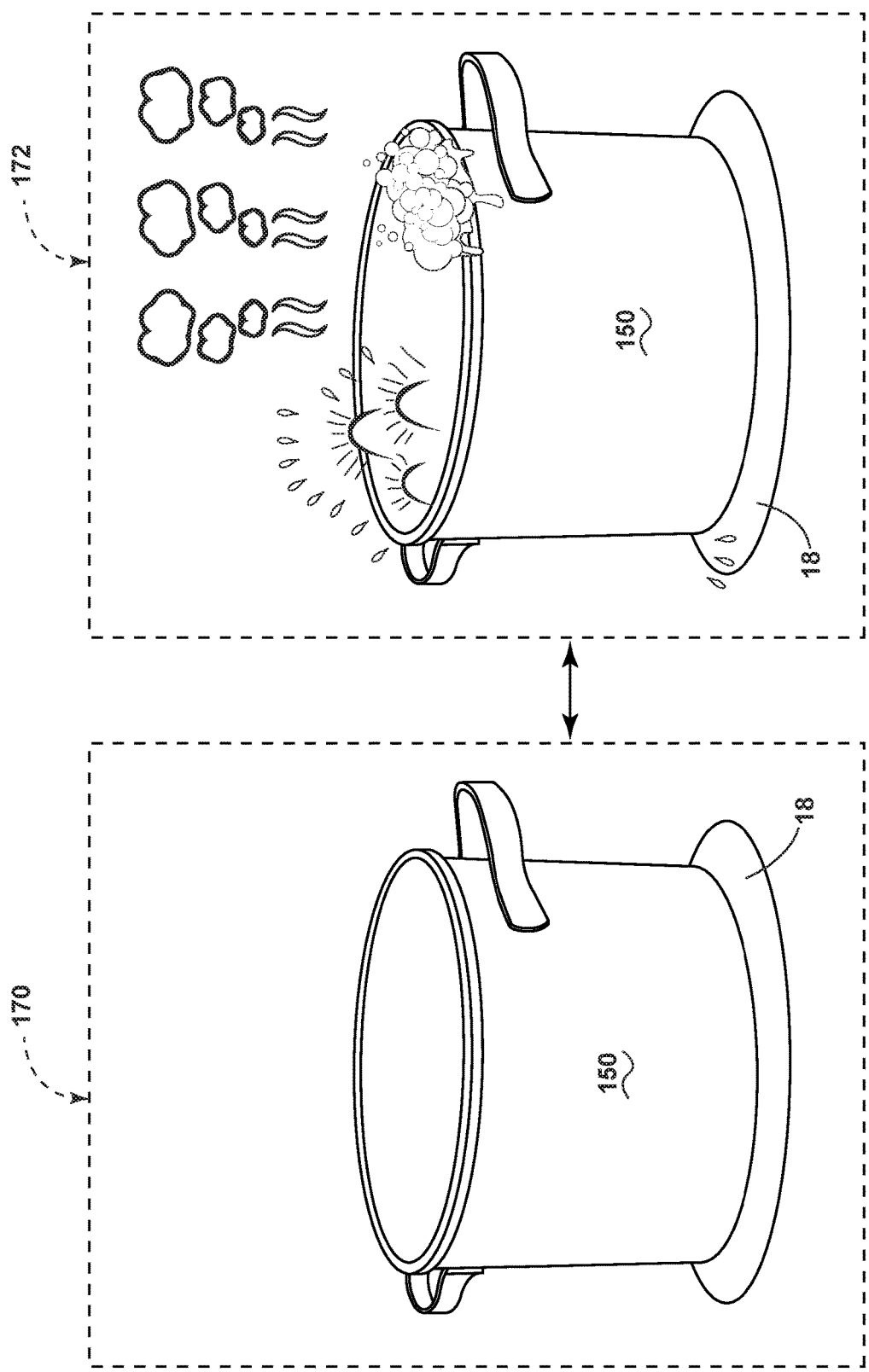
FIG. 7 is a schematic view of a comparison of images taken by the cooking assistance appliance of FIG. 2 to determine the mess of FIG. 6.

The cooking assistance appliance 50 can determine a mess condition by making a comparison to a recorded image at the start of the cooking process, or prior to a mess condition, and the current time in the cooking process. Referring to FIG. 7, an initial image 170 can be taken initially at the start of the cooking process or early in the cooking process. More specifically, the initial image 170 can be taken based upon an instruction by the user, for example, or can be taken automatically by the cooking assistance appliance 50 after determining that the pot 150 has been placed on the heater 18, the cooking appliance 12 has been turned on, or the user has been active within the first zone 130 of FIG. 4, in additional non-limiting examples. The second image 172 can be continuously monitored by taking another image at a regular interval, such as every half second or faster, for example, while slower or faster intervals are contemplated. In another example, the interval can be determined by the cooking type or recipe, where such a monitoring can be tailored to anticipated messes based upon cooking type or particular recipe. Such historic information can be saved or accessed by the cooking assistance appliance 50 during use. The controller 82 can then compare the initial image 170 with the second image 172 as each second image 172 is taken at the interval. Such a comparison can be a pixel-by-pixel comparison, for example, to identify any major or minor differences between the two images to determine that a mess condition or which mess condition is occurring. Alternatively, it is contemplated that the cooking assistance appliance 50 can utilize sophisticated software, capable of imaging and determining the particular mess without a specific pixel-by-pixel comparison.

Based upon any discrepancy between the two images 170, 172, the cooking assistance appliance 50 can then indicate or mitigate the mess once detected, such as indicating with the alarm or notification, or reducing a temperature by controlling the cooking appliance 12 if in communication with the cooking appliance 12. Additionally, it is contemplated that the cooking assistance appliance 50 can predict a future mess. Furthermore, it is contemplated that the infrared sensor 78 can be used to monitor local cooling temperatures for which messes are commonly associated. For example, the cooking assistance appliance 50 can store a series of images over time in addition to the initial and current images 170, 172, which can be used to determine if a liquid is coming to boil, for example, or record a rate of increase of temperature with the infrared sensor 78 to anticipate when boiling will occur. Water boils at 212° F. (100° C.). Detection of a pot 150 of boiling liquid approaching the boiling point of water can be used by the cooking assistance appliance 50 to determine that a boiling condition is imminent and that a reduction in temperature is warranted to avoid a mess. In another example, common cooking oils begin to smoke typically between temperatures of 350° F. and 450° F. As a user is heating a pan and the infrared sensor 78 determines that such a temperature is being approached, the cooking assistance appliance 50 can be used to indicate or mitigate excessive smoking or temperatures. Tailoring of the mess detection can further be facilitated by a user inputting a recipe or type of cooking, so that the cooking assistance appliance 50 can use historic data to predict what types of messes occur or at what temperatures, times, or combination thereof. Such input can be provided by voice, for example, while it is contemplated that a selected recipe, cookware identification, or food identification by the cooking assistance appliance 50 can be used.

Additionally, a mess can be detected using two 2D cameras or image sensors, where the cooking assistance appliance 50 can process the 2D images from both cameras with a 3D algorithm to develop a 3D image of the cooking area from the 2D image data from the two cameras. The 3D image can be generated by the processor compiling the first and second 2D images from the different fields of view in order to create a virtual 3D environment, such as with image point triangulation, autocalibration with Kruppa's equations or with Mendonça and Cipolla functions, or stratification, in non-limiting examples.

In one example, the two cameras can be the camera 74 and the infrared sensor 78, while alternative sensors or cameras can be used. The 3D image developed can be processed with a 3D algorithm to determine if a mess is detected or not, and issue a notification if a mess is detected, such as an audible or visual notification. Additionally, separate algorithms can be used to determine the type of mess, such as an overfill algorithm, a boil-over algorithm, a splatter algorithm, or a smoke algorithm, for example. More specifically, for the boil-over algorithm, the cooking assistance appliance 50 can determine a rate at which the height of liquid is increasing in a cooking vessel (best described in FIG. 10), and using the rate to predict a boil-over event. It is further contemplated that the image data can be remotely provided to a cloud-based processor, remote from the cooking assistance appliance 50 or the cooking appliance 12, which can process the image data with the mess detection algorithm to determine the presence or type of mess. It should be further appreciated that the mess can also be detected based upon its presence on the cook surface of the cooking appliance 12, such as splatter existing on the stovetop 16, as well as on the cookware or other surrounding environment which can be measured with the pixel-by-pixel comparison, where measuring can include processing the image or a series of images for differences to detect a mess has occurred. More specifically, the processor of the controller 82 can look for a change in a current image to a reference image, or even a local area within the image or a subset of the reference image, like a heating zone. The camera 74 or other sensor such as a visual light sensor, CCD, or CMOS can be used to determine a characteristic value, such as color, hue, or light intensity. From the characteristic value, a value can be assigned to the image, such as by summing the total of the value for all pixels in the image or within the local subset area. This can be done for a single current image or a series of images. If the value assigned meets a threshold or a threshold is met based upon a change over a series of images, a change can be assumed to have happened and a mess can be determined. From there, an alert, such as an alarm, can be signaled to the user that there is or will be a mess. Alternative methods are further contemplated, such as with the thermal sensor 78 to determine local temperature discrepancies representative of a mess.

Figure 8:
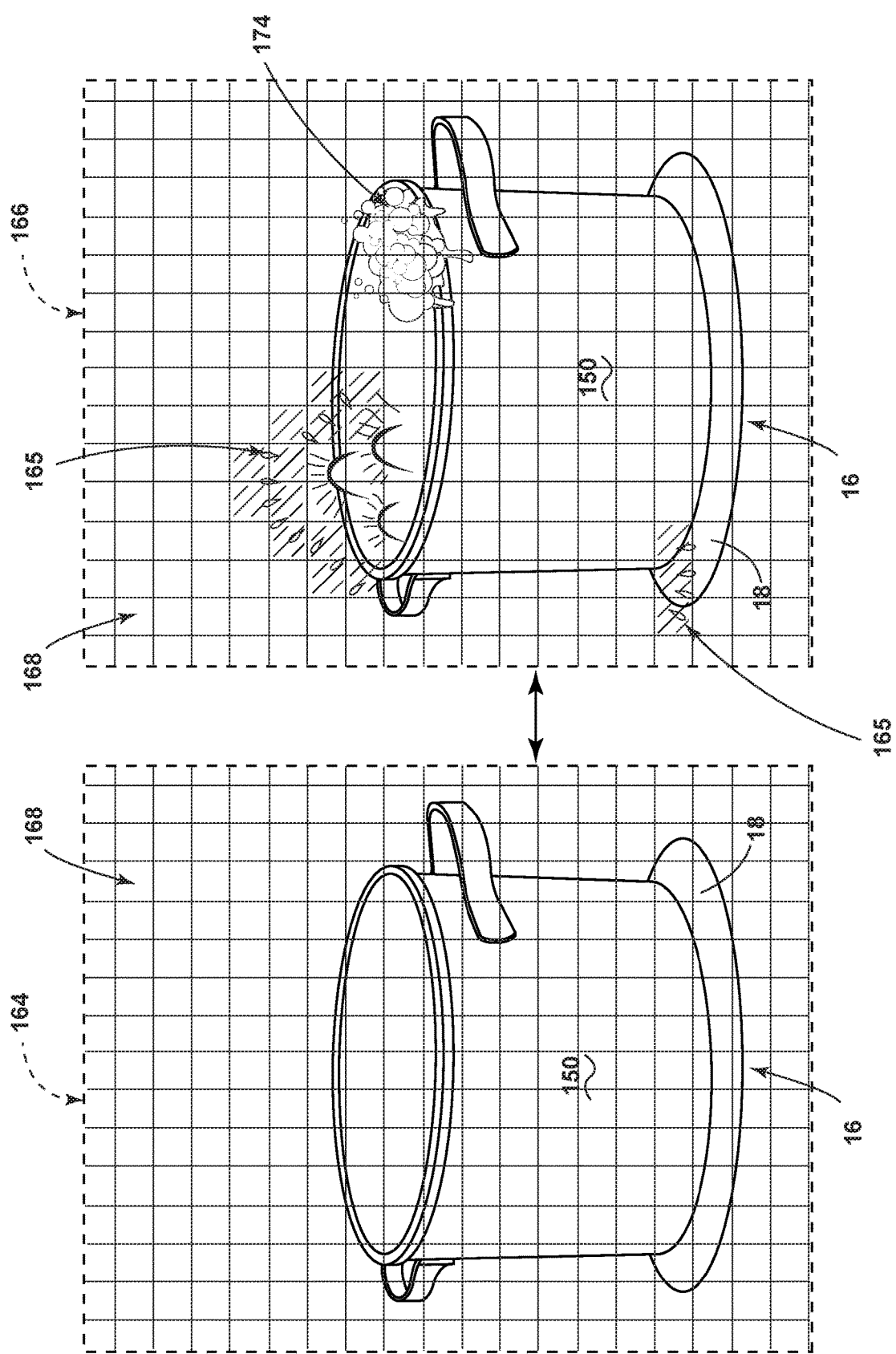
FIG. 8 is a side-by-side view of pixelated images utilized to determine a mess in the comparison of FIG. 7 for a splatter mess condition and a boil over mess condition.

An algorithm can be an algorithm as a process or a set of operations performed or utilized by the cooking assistance appliance 50 to determine when a mess condition is occurring or may be imminent. Two specific algorithms can be a splatter algorithm and smoke algorithm, for example. Referring now to FIG. 8 the camera 74, or optionally the infrared sensor 78 or any other image sensor can provide for recording an image of a cookware vessel or other cookware item provided on the cooking appliance 12. An initial image 164 can be taken prior to or early in a cooking process. Continuously, or at a selected interval, the cooking assistance appliance 50 can take additional second images 166 for comparison with the initial image 164 to determine a mess condition, such as a splatter condition or a smoke condition. The cooking assistance appliance 50, or the controller therein 82, can process the images into pixels 168. The determination of such mess conditions can be based on a splatter algorithm or a smoke algorithm, based upon the measurement of the compared pixels 168. Specifically, in FIG. 8, one mess condition is shown as a splatter mess condition, with a clean initial image 164 and a splattered second image 166 having splattered food matter 165 coming from the pot 150 and located on the stovetop 16 and the heater 18. The pixels 168 containing the splattered food matter 165 are slightly cross-hatched (three diagonal lines in the particular pixels 168), where the controller 82 can determine which or how many pixels contain the splattered food matter 165 and can be utilized by the controller 82 in determining a mess. As shown, the second image 166 in FIG. 8 includes sixteen such pixels 168 with the cross-hatching. The images 164, 166 can be represented by multiple pixels 168 forming the image, in which the images are color formatted when recorded by the camera 74. The pixels 168 as shown are somewhat large, and it should be appreciated that the actual pixels can be significantly smaller, and are just shown in a representative manner to facilitated understanding. Additionally, the pot 150 in the second image 166 includes some boil over material 174, resultant of a boil over mess. However, it should be understood that each mess condition can occur independent of one another.

The controller 82 in the cooking assistance appliance 50 can perform a comparison between the images 164, 166 and identify any differences in the images 164, 166. As is appreciable in FIG. 8, some pixels 168 in the second image 166 are different, and display some splatter material 165 and some boil over material 174. The processor can identify this material 165, 174 via the image comparison in a pixel-by-pixel manner, such as by comparing differences like color, brightness, contrast or other distinguishable measures to determine the differences among the pixels or groups of pixels. When the differences among the images in a particular pixel 168 or local group of pixels 168 meets a threshold, a mess condition, such as the boil over mess condition or the splatter mess condition can be determined, and a mess can be declared.

Once the mess condition has been determined, an action can be taken by the cooking assistance appliance 50 or the cooking appliance 12 itself. One action can include a warning or indicating action, such as an audible or visual indication provided to the user to indicate that a mess will occur, is occurring, or has occurred. For example, an audible alarm can state "Mess" to inform the user that a mess is occurring or needs attention. In another example, the cooking assistance appliance 50 can take action to prevent or mitigate the mess. Specifically, the cooking assistance appliance 50 can communicate with the cooking appliance 12 to reduce heat to prevent or mitigate a mess. In this way, it should be appreciated that the cooking assistance appliance 50 can be utilized to detect and inform or mitigate messes on the stovetop 16, improving user experience. Further yet, historical mess data can be stored to improve identification and anticipate messes before they occur.

Figure 9:
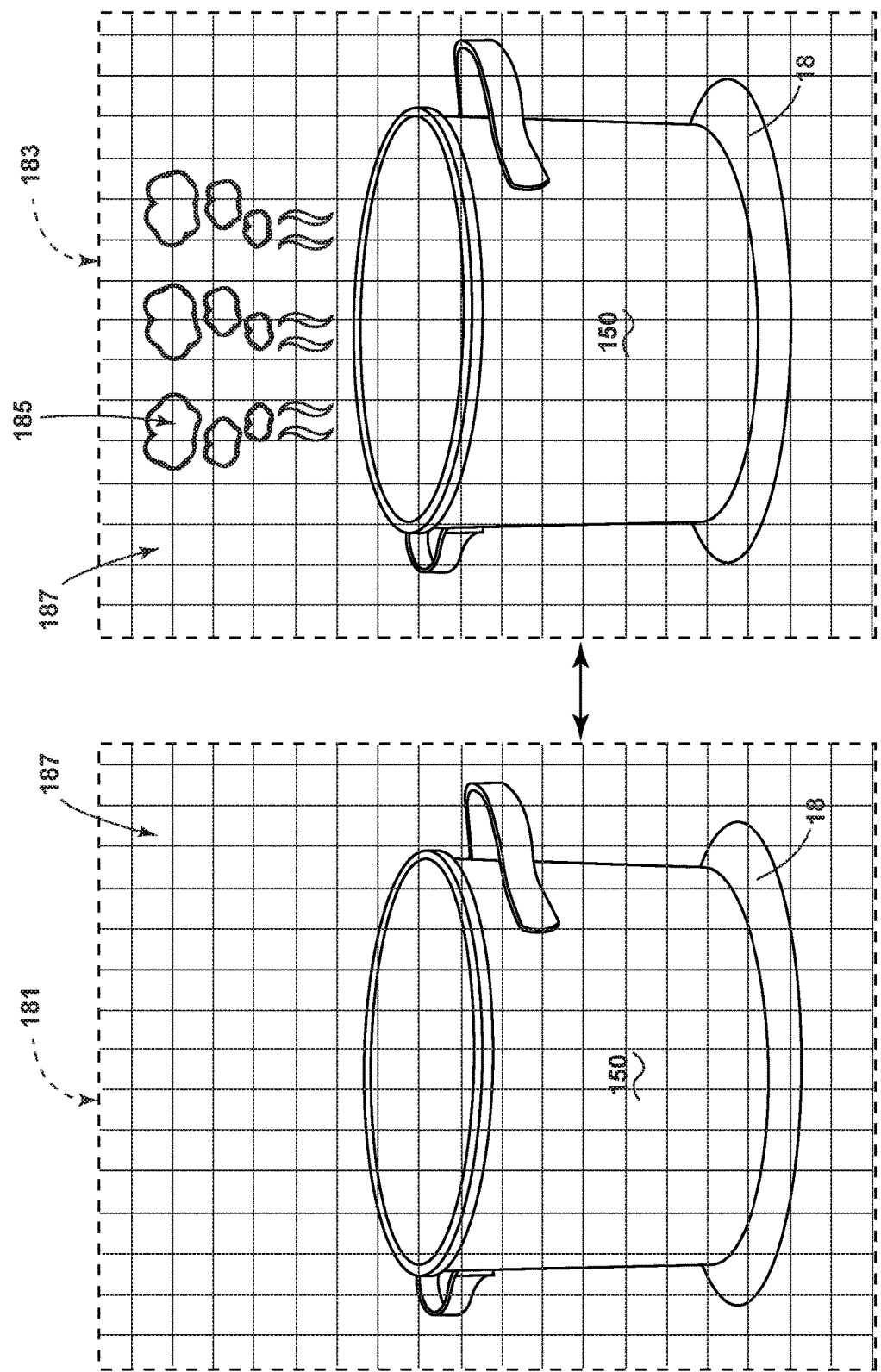
FIG. 9 is another side-by-side view of pixelated images utilized to determine the mess in the comparison of FIG. 7 for a smoke mess condition.

Referring to FIG. 9, another initial image 181 and a second image 183 can be recorded in the same manner as discussed in FIG. 8 above. In addition to being able utilize the visible light camera 74, the infrared camera 78 can be used to record the images 181, 183, or any suitable optical smoke detection sensor, such as an ultraviolet sensor. The infrared camera 78 can be used to determine the existence of smoke 185 in the recorded second image 183 in one or more pixels 187 utilizing the principle of light obscuration. The recorded image 183 can detect light variances such as through light absorbance, reflection, or light scattering resultant of the light obscuration, which can be determined by the amount of light absorbance or light scattering in a single pixel 187 or group of pixels 187 to determine if a smoke mess condition is occurring.

Once a smoke mess condition is determined, action can be taken, such as informing the user, audibly or visually, that a smoke mess condition is occurring, such as with an alarm. Alternatively, it is contemplated that the cooking assistance appliance 50 can lower the temperature of the heater 18 on the stovetop 16 to reduce the smoke or burning that is occurring on the stovetop 16.

Figure 10:
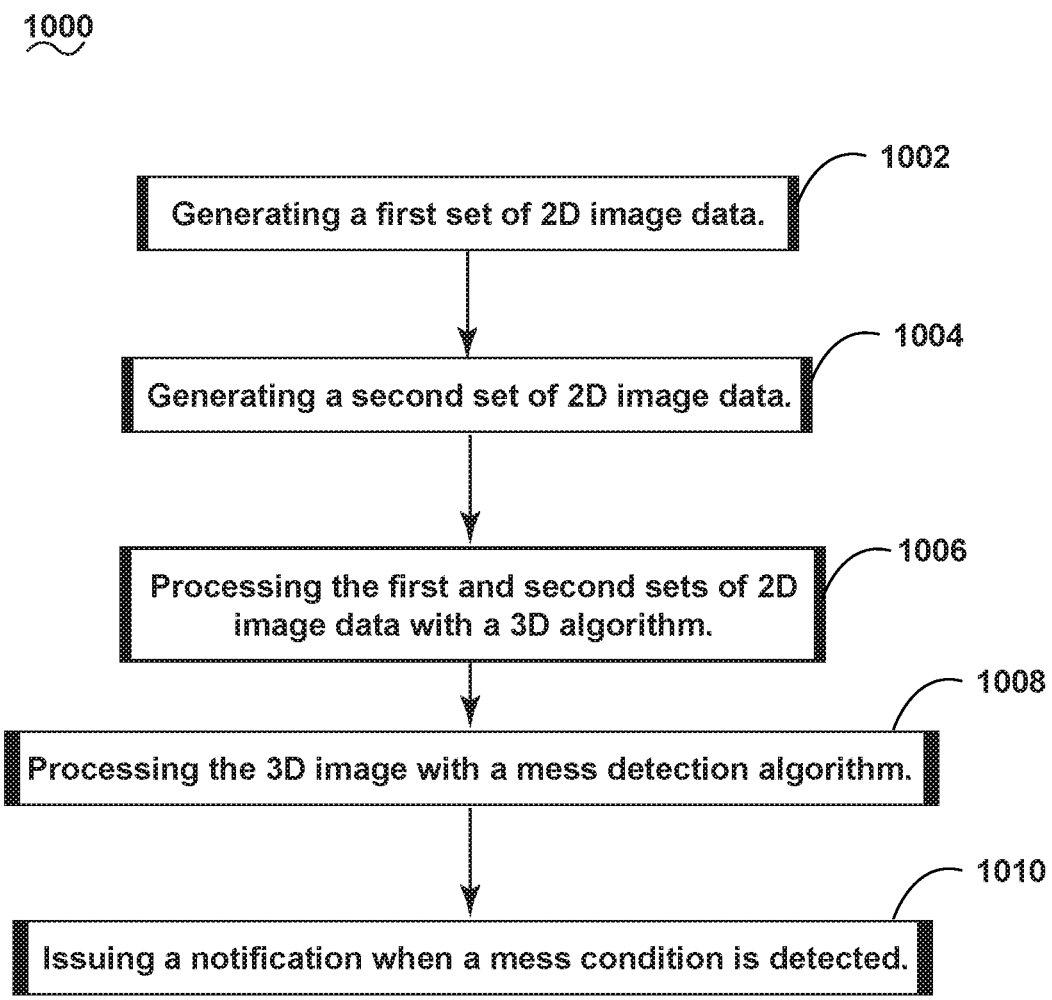
FIG. 10 is a flow chart showing a method of sensing a mess condition associated with a cooking vessel on a cook surface.

Referring to FIG. 10, another algorithm can be described as a method 1000 of sensing a mess condition associated with a cooking vessel within a heating zone of a cook surface of a cooking appliance can include: at 1002, generating a first set of 2D image data. The first set of 2D image data can be from a first 2D image sensor having a first field of view encompassing at least one heating zone of the cook surface, while the first field of view can be larger or smaller, such as encompassing the entire cook surface.

At 1004, the method 1000 can further include generating a second set of 2D image data. The second set of 2D image data can be from a second 2D image sensor having a second field of view, different from that of the first 2D image sensor, with the second field of view being viewed at an angle different than that of the first field of view, while at least a portion of the first field of view and the second field of view overlapping. The different field of view can be from a different angle, perspective, or height, in non-limiting examples.

At 1006, the method 1000 can further include processing a 3D image from the first and second 2D images of 1002, 1004. The 3D image can be generated by the processor compiling the first and second 2D images from the different fields of view in order to create a virtual 3D environment, such as with image point triangulation, autocalibration with Kruppa's equations or with Mendonça and Cipolla functions, or stratification, in non-limiting examples.

At 1008, the method 1000 can include processing the 3D image with a processor programmed with a mess detection algorithm. The 3D image can be processed and analyzed to determine a mess condition based on the 3D image. While a 2D image can be used for mess detection, the 3D image provides more accurate information about the mess, which is difficult to consistently identify with a mere 2D image. The mess detection algorithm can be a overfill algorithm, a boil over algorithm, a splatter algorithm, or a smoke algorithm, such as that described in FIGS. 8, 9, and 13. The overfill algorithm can detect the amount of liquid in the cooking vessel, which can be relative to total capacity of the cooking vessel. Additionally, the overfill algorithm detects the volume of liquid in the cooking vessel, which can be compared to the total capacity. The boil over algorithm can include generating multiple 3D images to determine a rate of increase of liquid level or liquid height in the cooking vessel. The rate can be used to anticipate or predict a boil over event.

At 1010, the method 1000 can include issuing a notification when a mess condition is detected. The notification can be specific to the mess condition. For example, when the mess condition is an overfill condition, the notification can be relative to the volume of liquid and the total volume of the cooking vessel. Furthermore, the notification can include projecting a human readable image onto the cooking surface, which can be indicative of the relative volumes of the liquid and the cooking vessel, for example. Alternatively, the human readable form of the projected image can be at least one of a graphic or text. Such a projection can be with a projector, and can be provided near the cooking vessel, or even onto or into the cooking vessel. Alternatively, issuing the notification can include transmitting the notification wirelessly to the cooking appliance or a remote device, such as a mobile device. In the case where a boil over mess condition or other mess condition is anticipated, predicted, or imminent, but has not yet occurred, the notification can be issued of the impending mess condition.

Figure 11:
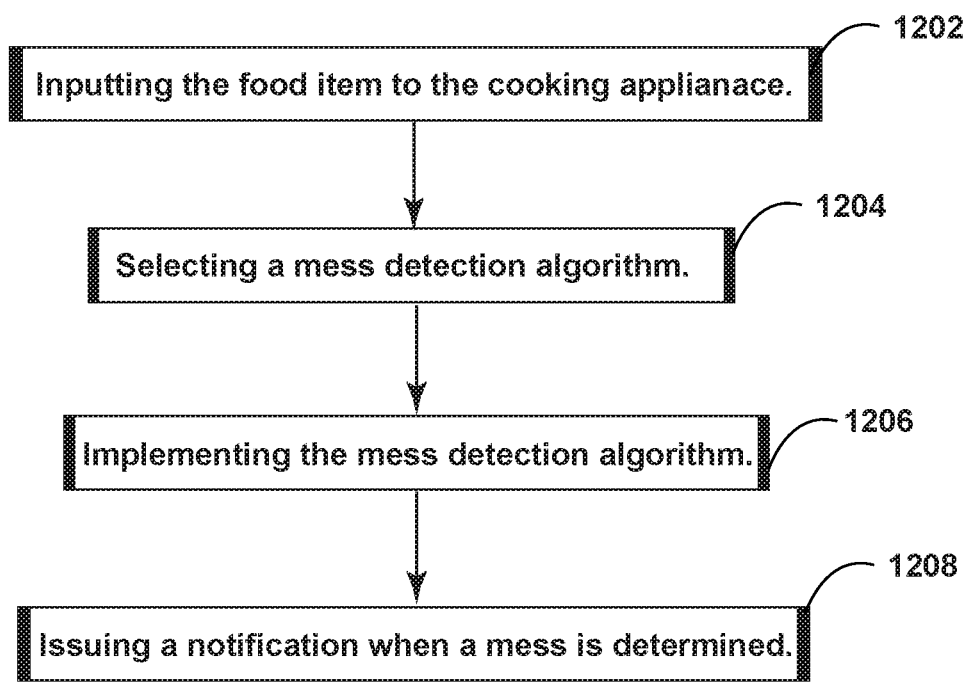
FIG. 11 is a flow chart showing a method of implementing a mess detection algorithm for a cooking appliance with a cooking vessel containing a food item.

Referring to FIG. 11, another algorithm can be described as a method 1200 of implementing a mess detection algorithm for a cooking appliance having a cook surface with at least one heating zone with a heater and a cooking vessel containing a food item located in the heating zone can include: at 1202, inputting the food item to the cooking appliance. The food item can be provided in a cooking vessel on the cooking appliance, and it is contemplated that inputting the food item can include the user inputting the particular food item. Alternatively, it is contemplated that a sensor can detect the type of food, without requiring the user to identify the food item. Additionally, the user can input a specific food classification, which can encompass a type or category of food item, as opposed to inputting the particular food item.

At 1204, the method 1200 can include selecting a mess detection algorithm. Selecting a mess detection algorithm can be based upon the input food item, which can be retrieved from a dataset related to mess detection algorithms, which are tailored to, or specific to corresponding food items of food classifications. For example, a cooking vessel of water for boiling can retrieve a boil over mess detection algorithm.

At 1206, the method 1200 can include implementing the selected mess detection algorithm. Such implementation can include taking an image, such as visual light image with an image sensor, of a field of view of the heating zone, the food item, or the cooking vessel to generate image data. The image data can be processed according to the selected mess detection algorithm to determine if a mess has occurred. The selected mess detection algorithm can be a boil over algorithm, a splatter algorithm, or a smoke algorithm, in non-limiting examples.

At 1208, the method 1200 can include issuing a notification when a mess is determined. Issuing the notification can include projecting the notification, from a projector, into an area bounded by the cooking surface, including into or adjacent the cooking zone. Alternatively, it is contemplated that the notification be projected to other local areas, such as a wall, countertop, or area near the cooking appliance. The projected notification can be a human readable indicia, such as an image or text. Alternatively, issuing the notification can include wirelessly sending the notification to a user, such as to a user's mobile device or other remote device. The notification can be human readable indicia, such as a graphic or text.

The method 1200 can further include automatically adjusting the heat output of the heater in response to a detected mess. For example, if a boil over mess is detected, the cooking appliance can automatically adjust the heat output of the heater to be reduced, to prevent or mitigate the boil over mess.

Figure 12:
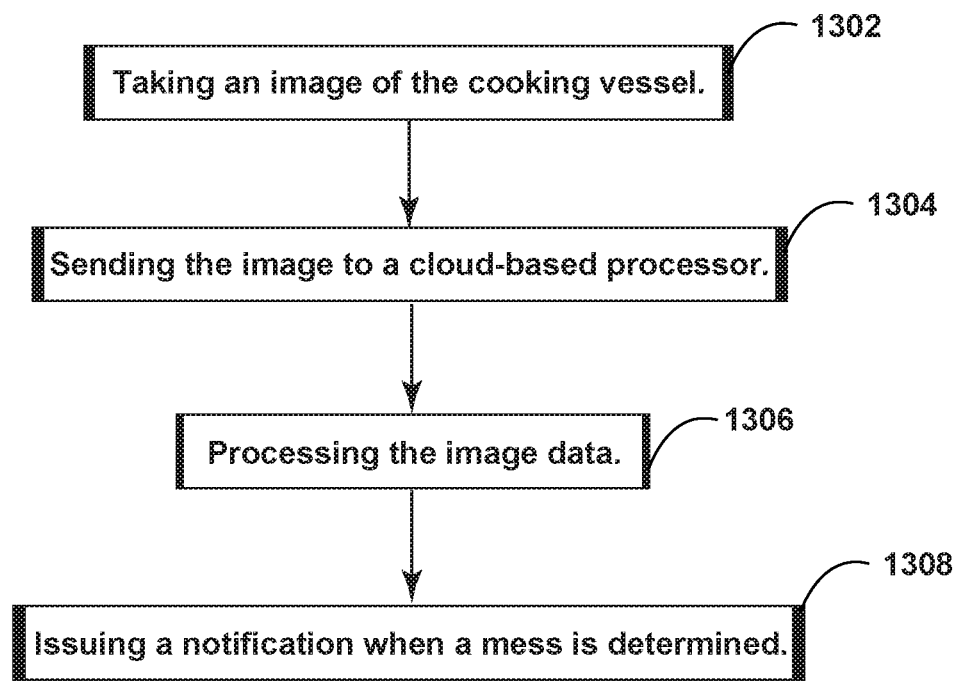
FIG. 12 is a flow chart showing another method of implementing a mess detection algorithm for a cooking appliance having a cooking vessel containing a food item.

Referring to FIG. 12, another algorithm can be described as a method 1300 for implementing a mess detection algorithm for a cooking appliance having a cook surface with at least one heating zone with a heater and a cooking vessel containing a food item located in the heating zone can include: at 1302, taking an image of the cooking vessel. The image can be a visible light image of the cooking vessel, taking with an imaging sensor having a field of view encompassing the cooking vessel to generate image data.

At 1304, the method 1300 can include sending the image to a cloud-based processor. The cloud-based processor can be remotely located from the cooking appliance and the imaging sensor, and can be in wireless communication with the cooking appliance, such as over the internet.

At 1306, the method 1300 can include processing the image data. The image data can be processed with a mess detection algorithm programmed to determine the presence of a mess. In one example, processing the image data can be done at the cloud-based processor and input to the mess detection algorithm at the cloud-based processor. Alternatively, the cloud-based processor can process the image, and send the processed image data back to the cooking appliance where the mess detection algorithm can process the image data to determine the presence of the mess. The mess detection algorithm can be an overfill algorithm, a boil over algorithm, a splatter algorithm, or a smoke algorithm in non-limiting examples. It is further contemplated that the mess detection algorithm can predict a mess, such as anticipating when or if a boil over condition will occur with a boil over algorithm. Furthermore, the processor, being either the cloud-based processor or a local processor for the cooking appliance, can determine a temperature of a heater for the heating zone as a temperature control signal, which can be used to reduce the heat in response to a detected or predicted mess detection. The temperature control can be initiated by the cloud-based processor to the cooking appliance, for example.

At 1308, the method 1300 can include issuing a notification when a mess is determined. Issuing the notification can include projecting the notification, from a projector, into an area bounded by the cooking surface, including into or adjacent the cooking zone. Alternatively, it is contemplated that the notification be projected to other local areas, such as a wall, countertop, or area near the cooking appliance. The projected notification can be a human readable indicia, such as an image or text. Alternatively, issuing the notification can include wirelessly sending the notification to a user, such as to a user's mobile device or other remote device. The notification can be human readable indicia, such as a graphic or text.

It should be appreciated that the algorithms or methods as described herein can also be used to determine a mess condition with a 3D image generated from a set of 2D images recorded by the sensors. The 3D image can be generated by the processor compiling the first and second 2D images from the different fields of view in order to create a virtual 3D environment, such as with image point triangulation, autocalibration with Kruppa's equations or with Mendonça and Cipolla functions, or stratification.

Figure 13:
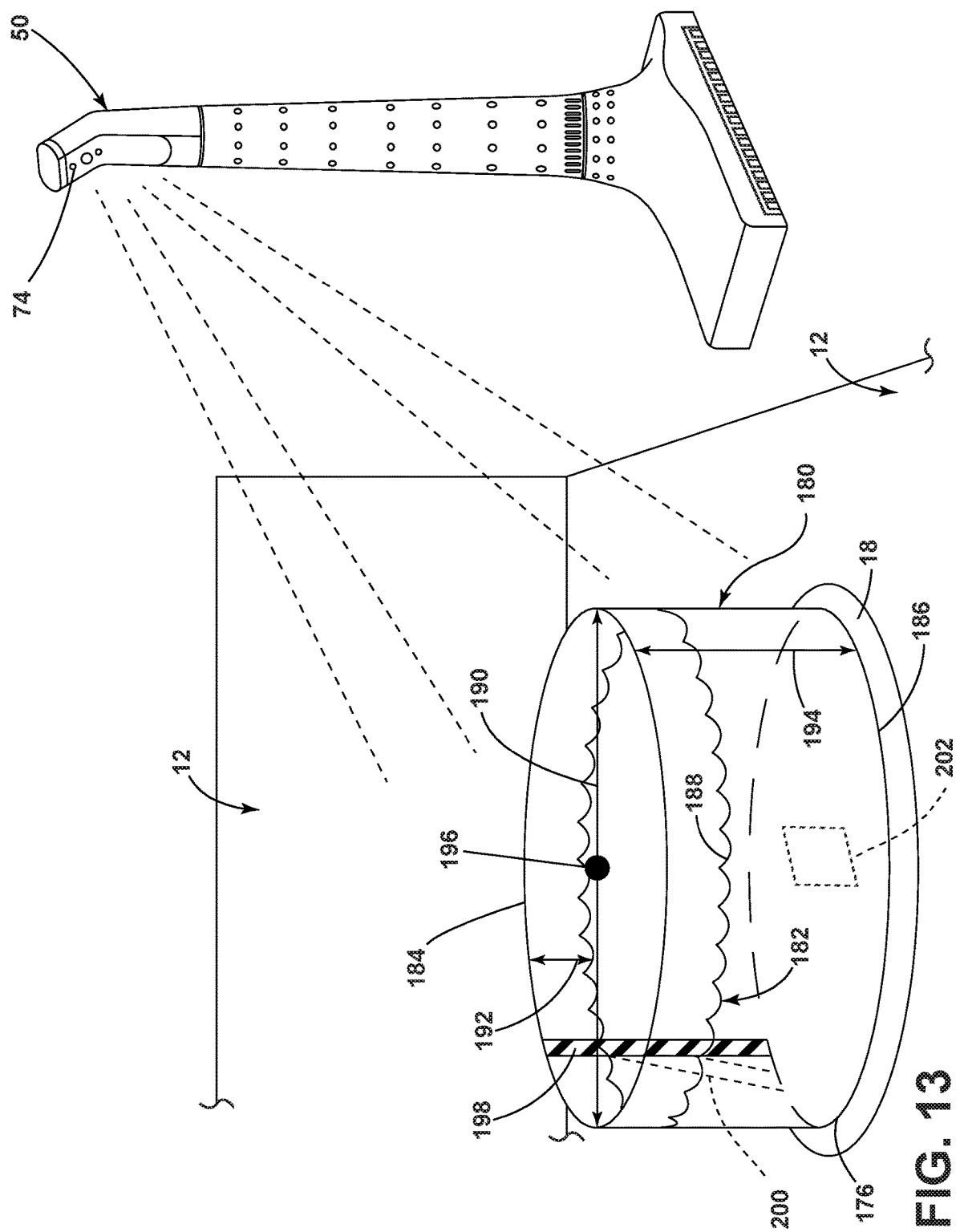
FIG. 13 is a schematic view of the cooking assistance appliance of FIG. 5 measuring a liquid level in a cooking vessel on the cooking appliance of FIG. 1.
Figure 14:
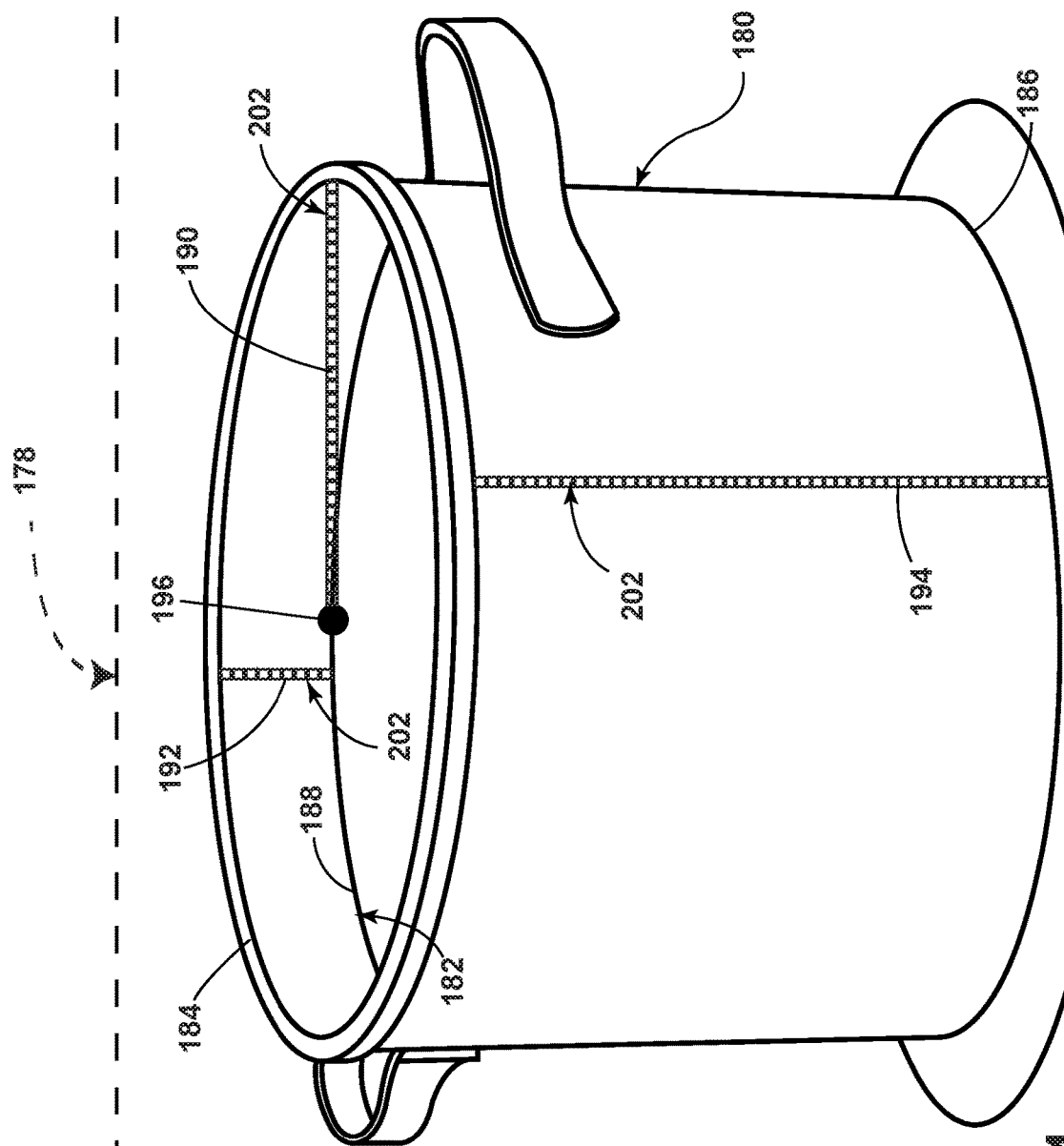
FIG. 14 is a view of an image of the cooking vessel having illustrated pixels used in measuring the liquid level of FIG. 13.

Referring to FIGS. 13 and 14, another cooking vessel is shown as a pot 180 (or an image 178 thereof in FIG. 16) provided on the heater 18 and including a volume of liquid 182, such as water for boiling. The cooking assistance appliance 50 can be used to determine an amount of liquid in the pot 180. Utilizing the camera 74, the cooking assistance appliance 50 can identify an edge 184, or proximal outer wall, of the pot 180 as well as a bottom 186 of the pot 180. The edge 184 and the bottom 186 can be identified with edge detection algorithm by processing an image, for example, which can utilize image processing through contrast changes to determine where the pot 180 begins and ends. Furthermore, the cooking assistance appliance can store historic information about the user's cookware to facilitate cooking vessel identification.

With this information, the cooking assistance appliance 50 can determine the number of pixels 202 between the edge 184 and the bottom 186 to determine a height 194 for the pot 180. The pixels 202 are represented by schematic squares in FIG. 14, while the actual pixels in the image 178 may be significantly smaller, and the pixels 202 are represented as the larger schematic squares to facilitate understanding of the identification and analysis process. Similarly, the cooking assistance appliance 50 can utilize the image 178 to determine an edge 188 of the liquid 182 in the pot 180 with a contrast processing software, or otherwise. The cooking assistance appliance 50 can determine the number of pixels between the edge 184 of the pot 180 and the edge 188 of the liquid 182 to determine a height of the empty volume 192 in the pot 180. Additionally, the camera 74 can determine a diameter or radius 190 of the pot 180, finding a center point 196 of the pot 180 and measuring the radius 190 of the pot 180, or determining a radius based on the centerpoint 196, by determining the number of pixels 202 between the center point 196 and the edge 184. Such an image 178 can include a visual light image, for example, while other images such as an infrared image are contemplated. When measuring the pixels 202 to determine distances, the cooking assistance appliance 50 can count the rows of pixels of the image along an intersection of the wall of the pot 180 and an optical plane which passes through the center of the camera plane, where the camera plane is defined as the 2D surface based upon the 2D images taken by the camera 74. The measurement can be along an intersection distal to or proximal to the outer wall of the pot 180. Counting the rows can also include counting the rows along a distal inner wall 176 of the pot 180 or cooking vessel.

The cooking assistance appliance 50 can then determine a volume of the liquid 182 in the pot 180 based upon the measured distances of the pixels 202. The size of the pixels can be used based upon a reference size, such as the physical size of the burner. Once the size is known, a reference value can be provided to pixels, which can be used to measure the distances based upon the number of pixels for the given sizes of the pixels from the reference values. Specifically, the cooking assistance appliance 50 can determine a height of the liquid 182, by subtracting the height of the empty volume 192 from the total height 194 of the pot 180. Then, utilizing the diameter or radius 190, the cooking assistance appliance 50 can use the formula as equation (1) below for the volume of a cylinder to determine how much liquid is in the pot 180.

$$\text{Volume} = \pi * (\text{radius}^2) * \text{height} \tag{1}$$

where Volume is the volume of liquid 182 in the pot 180, radius 190 is determined as distance from the centerpoint 196 to the edge 184 of the pot 180 or as half of a diameter, and height is determined as the height of the liquid determined as height of the empty volume 192 subtracted from the height of the pot 180. In this way, the cooking assistance appliance 50 can determine the volume of liquid 182 in the pot 180.

Looking at FIG. 13 specifically, the pot 180 can include an indicia as an identifying line 198. The pot 180 can be tailored for use with the cooking assistance appliance 50, and the identifying line 198 can be used to measure the volume within the pot, based upon a water level as determined by refraction 200 of the line 198 as measured by the camera 74. The particular color or line pattern provided on the line 198 can be used by the cooking assistance appliance 50 to identify the type of cookware. For example, the diagonal-lined line 198 can represent a 4-quart pot 180. The identifying mark need not be a line 198, but can be any type of mark for identifying the water level or the type of cookware, such as a dot or a pattern of dots, in another non-limiting example. Alternative indicia can include an optical code such as a bar code or a QR code.

Utilizing the volume of liquid 182 within the pot 180, the cooking assistance appliance 50 can determine how long it is expected for the liquid to boil or to reach a particular temperature, as well as how long it is expected to cook a certain food item, such as boiling noodles. In this way, the cooking assistance appliance 50 can anticipate how long stages of a recipe should cook and take, facilitating use by a user. Additionally, calculating the volume of liquid in the pot 180 can be used to inform the user of the amount of liquid in the pot, in order to improve recipe accuracy. This can be done in real-time. For example, a recipe may call for 4 quarts of vegetable stock. As the user fills the pot 180 with vegetable stock, the cooking assistance appliance 50 can continuously measure the volume of liquid in the pot 180 and provide real-time feedback to the user informing the user of the volume until the 4-quart total is reached. Such feedback can be audible or visual, such as a projected percentage image, for example.

Further, the volume of liquid in the pot 180 can be utilized by the cooking assistance appliance 50 to automate a cooking cycle for proper boiling time or simmer time for the amount and/or type of liquid provided in the pot 180. More specifically, the user can fill the pot 180 with water and the cooking appliance 12 can begin a boil cycle based upon identification and instruction from the cooking assistance appliance 50. Cooking times can be communicated to a user, such as with an audible or visual notification. Additionally, the infrared sensor 78 can be used to track temperature increases to update the boiling time, as output temperatures from the cooking appliance 12 can vary, while it is contemplated that British Thermal Units (BTUs) or other thermal output rates of the heater 18 can be provided or calculated by the cooking assistance appliance 50, which can also be used to estimate heating and boiling times. Further still, different liquids have different boiling points. The type of liquid can be determined by the camera 74 or the infrared sensor 78, or can be input by the user. In one example, the default liquid can be water.

Furthermore, the cooking assistance appliance 50 can also utilize such information for anticipating messes and to prevent them. For example, a 4-quart volume of water may take ten minutes to come to a boil. After ten minutes, the cooking assistance appliance 50 can instruct the user or directly instruct the cooking appliance 12 to reduce heat to a simmer, to prevent boiling over while maintaining the cooking temperature. Furthermore, the cooking assistance appliance 50 can emit a warning when the detected amount of liquid is with a predetermined amount of a full capacity of the pot 180. For example, when the volume is 90% or greater relative to a 100% capacity of the pot 180, the cooking assistance appliance 50 can emit a warning, such as an audible or visual warning to a user, to prevent overfilling.

Further yet, the cooking assistance appliance 50 can provide for sous vide cooking, without requiring a separate add on. Sous vide cooking is a cooking style involving sealing, such as vacuum sealing, one or more food items in a container 202, such as a plastic bag or sleeve. The sealed food items in the container 202 are then put into heated water and are cooked at a specific and accurately maintained temperature for a specific amount of time, to ensure perfect cooking of the food on a repeatable, consistent basis. The cooking assistance appliance 50 can provide for sous vide cooking or a sous vide status by monitoring the temperature of the volume of liquid 182 in the pot with the infrared sensor 78, and can increase or decrease the heat applied to the pot 180 from the heater 18 via communication and control of the cooking appliance 12 by the cooking assistance appliance 50. Additionally, the cooking assistance appliance 50 can instruct a user when the exact time to add the container 202 and remove the container 202 to ensure proper sous vide cooking. In an example where the cooking assistance appliance 50 and the cooking appliance 12 are not in communication and the cooking assistance appliance 50 cannot control operation of the cooking appliance 12, the cooking assistance appliance 50 can communicate with the user to increase or decrease the heat to maintain a proper sous vide cooking temperature as measured by the infrared sensor 78. The cooking assistance appliance 50 can record cooking temperatures over time to ensure that a proper sous vide cook time is achieved, and can update cook times based upon measured temperature fluctuations from the ideal cooking temperature of the liquid 182 in the pot 180. Additionally, it should be appreciated that the cooking assistance appliance 50 provides for cooking multiple sous vide food items in different pots at different temperatures, simultaneously, while current sous vide solutions require an apparatus for each individual pot.

Figure 15:
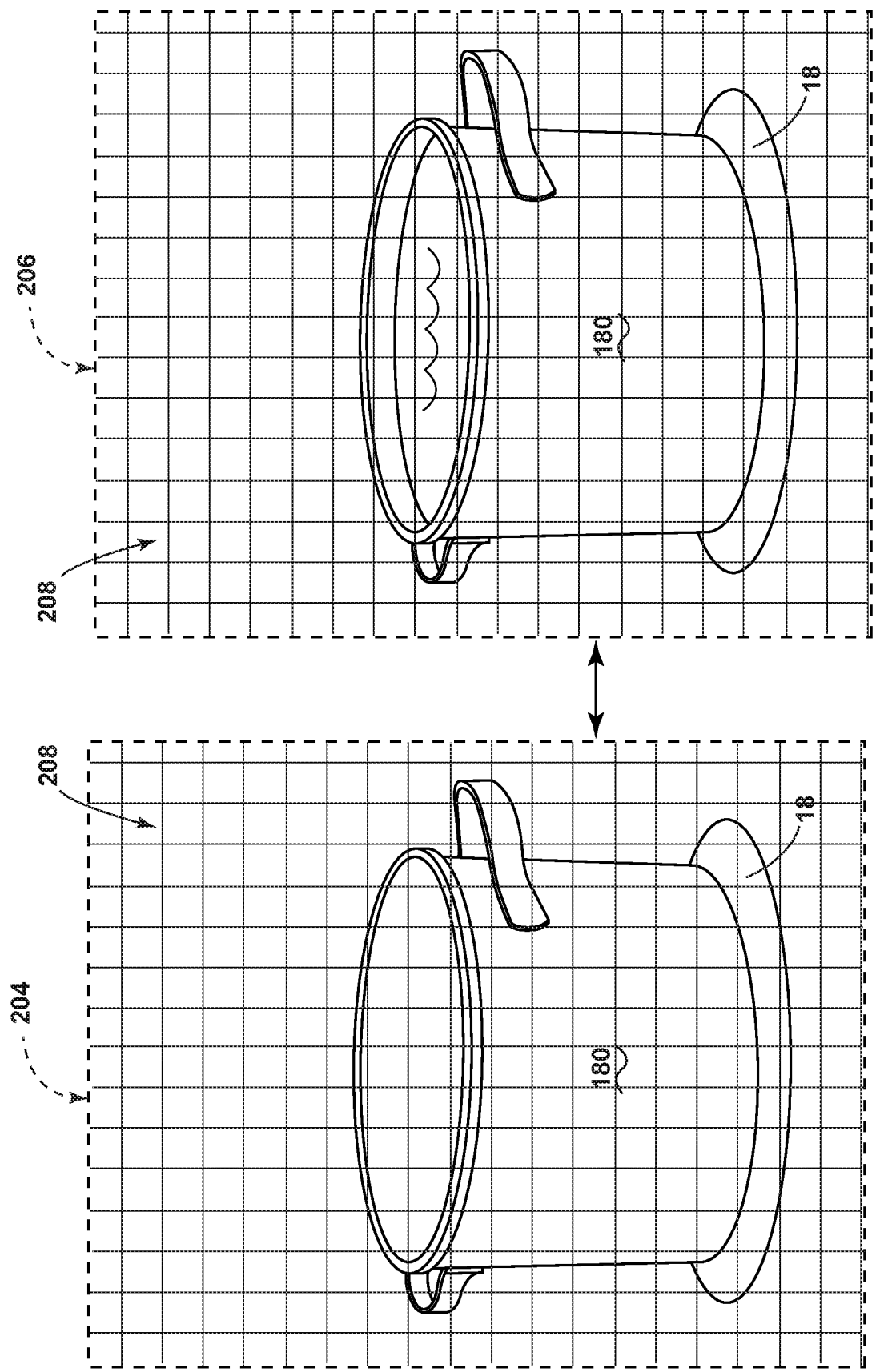
FIG. 15 is a side-by-side view of pixelated images to determine a liquid level or an overfill mess condition using the measuring algorithm of FIG. 14.

Referring to FIG. 15, an initial image 204 and a second image 206 can be compared by the cooking assistance appliance 50 to determine an over fill mess condition. The initial image 204 can be recorded at the beginning of a cooking process, and the second image 206 can be recorded as a series of images as the cooking process is occurring. As a user fills the pot 180, the water level rises. The rise of the water level can be monitored or communicated to the user as the pot 180 is filled in the manner described in FIGS. 13 and 14, utilizing a pixel-by-pixel 208 comparison. As the water reaches a threshold level in the second image 206, such as 90% full or greater, the cooking assistance appliance 50 can inform the user that an over fill condition is imminent or has occurred. In this way, as the user fills a pot 180, the cooking assistance appliance 50 can monitor the filling to ensure that an over fill mess condition does not occur, or warn the user that an over fill is occurring or is imminent. This can improve user experience and minimize the occurrence of messes on the stovetop 16. It is contemplated that in an environment where liquid fill is automatic, the cooking assistance appliance 50 can automatically terminate the automatic fill to prevent over filling or spilling.

Figure 16:
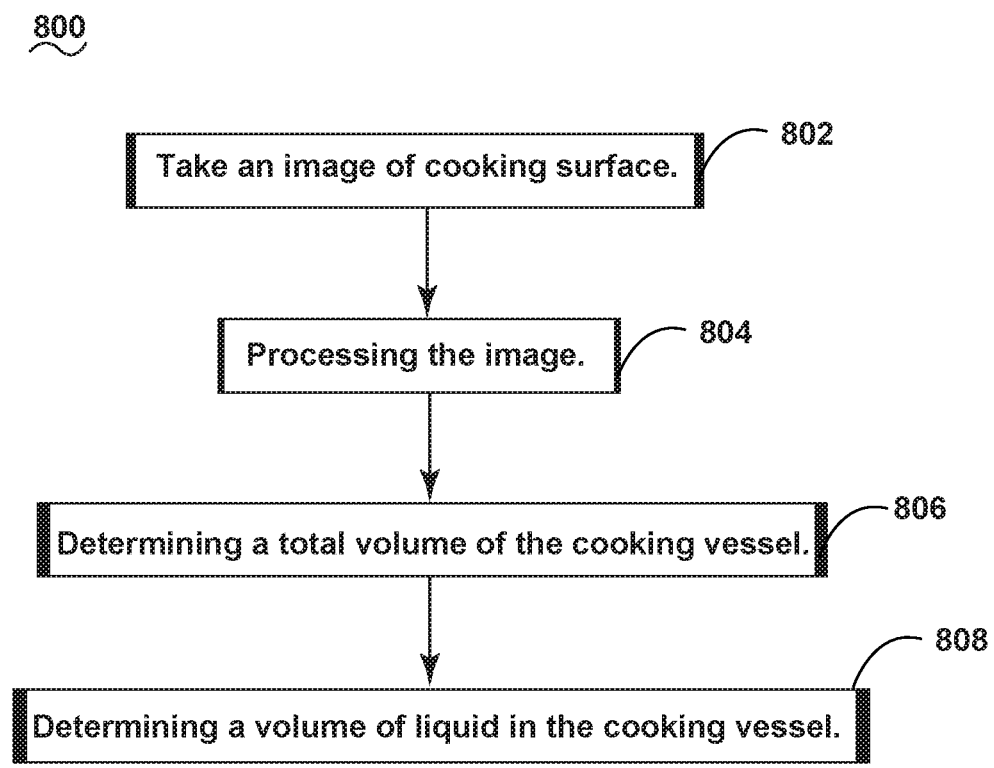
FIG. 16 is a flow chart showing a method of determining a liquid level within a cooking vessel.

Referring now to FIG. 16, an algorithm can be described as a method 800 for determining a liquid level within a cooking vessel with an open top positioned on a heater of a cooking surface can comprise: at 802, taking an image of a cooking surface. Taking the image can include capturing or recording an image with a sensor, such as a camera, proximity sensor, or infrared sensor as described herein, in non-limiting examples. Taking the image can further include taking the image with a camera from a vantage point at an acute angle relative to a general plane defined on the cooking surface. The acute angle provides for looking at least partially into the interior of a cooking vessel on the cooking surface. The image can be a visual light image, for example, while other images such as infrared, ultraviolet, or otherwise are contemplated.

At 804, the method 800 can include processing the image that was taken at 802. Processing the image can include determining a volume of a cooking vessel without liquid or content to define an empty volume value. Processing the image can further include determining a height of the cooking vessel above the upper surface of a liquid in the cooking vessel in order to define an empty vessel height. The empty vessel height can be used to determine the empty volume, such as with equation (1) as discussed above. Further, the empty vessel height can be determined by counting pixels in the image taken at 802. More specifically, the processor, which processes the image, can determine a rim or top edge of the cooking vessel and an upper surface of the liquid in the vessel. The processor can count the pixels between the top edge and the upper surface of the liquid to determine a height for the cooking vessel unoccupied by the liquid; determining the empty volume of the vessel. Counting the pixels can further include counting rows of pixels along an intersection of an inner wall of the cooking wall and an optical plane passing through a center of the camera plane. In this way, the processor can provide a value for each pixel to determine a distance based upon the number or rows consistent through each image based upon the camera plane.

At 806, the method 800 can include determining a total volume of the cooking vessel. Determining the total volume can include counting the rows of pixels along an intersection proximal the outer wall with the optical plane of the image taken by the camera. The total volume can also be determined utilizing a radius or diameter of an open top of the cooking vessel. Furthermore, the total volume can include utilizing the formula for volume of a cylinder, described in equation (1) above. Determining the total volume can further include processing the taken image of 802 for an indicia indicative of the total volume of the cooking vessel. For example, the cooking vessel can be marked with an indicia that is recognizable by the cooking assistance appliance to immediately determine the volume. The indicia can be an optical code, such as a bar code or a QR code, while other indicia, such as colors or patterns, are contemplated.

At 808, the method can include determining a volume of liquid in the cooking vessel. This is done by subtracting the empty volume in the cooking vessel from the total volume, leaving a volume of the liquid. This can be utilized by the cooking assistance appliance, for example, for use with a particular recipe, to estimate cook time, or to monitor potential mess conditions.

Figure 17:
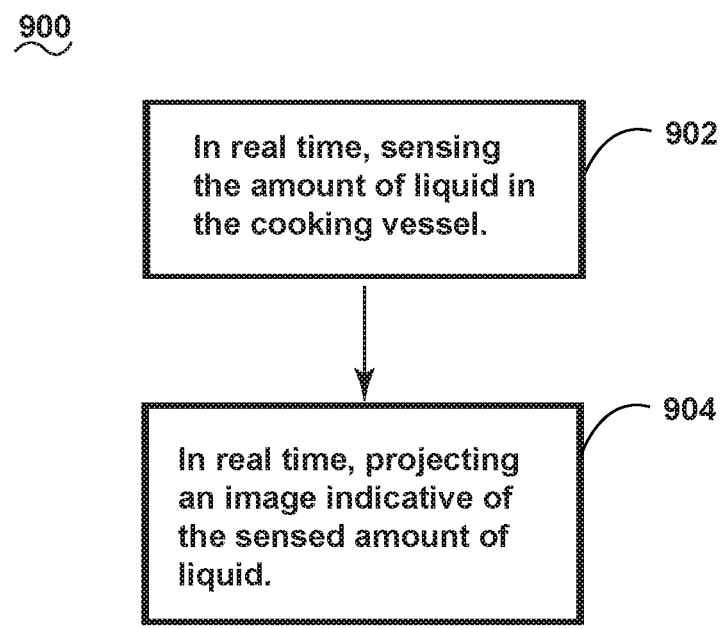
FIG. 17 is a flow chart showing a method of determining a liquid amount in a cooking vessel.

Referring now to FIG. 17, another algorithm can be described as a method 900 for determining an amount of a liquid in a cooking vessel on a cook surface of a cooking appliance can include: at 902, in real time, sensing the amount of liquid in the cooking vessel. This can be sensed with a sensor having a sensing field encompassing the cooking vessel, or even the cook surface of the cooking appliance. Sensing the amount of liquid can include sensing a volume of liquid in the cooking vessel or determining a volume of liquid in the cooking vessel.

At 904, the method 900 can include, in real-time, projecting an image indicative of a sensed amount of liquid onto the cook surface in human readable form. Projecting the image indicative of the sensed amount of liquid can further include projecting the sensed volume. As the sensing and projection is real-time, the projected sensed volume can increase in real-time as the user fills the cooking vessel with liquid or otherwise. The method 900 can further include sensing the volume of the cooking vessel, and as the image is projected, a ratio of empty volume to liquid volume can be the projected image indicative of the sensed amount of liquid. The cooking assistance appliance can also provide or emit a warning or alert when the amount of liquid is within a predetermined amount of a full capacity, such as 90% full or greater, informing the user that an over fill or a boil-over mess condition is likely or imminent. Such a warning or alert can be a visual or audible communication, for example, such as flashing the projected image. Projecting the image can also include projecting the image onto the cooking vessel, into the cooking vessel, or a side of the cooking vessel, while it is contemplated that the projected image can be onto a food item or liquid within the cooking vessel, as is reasonable based upon the food item.

Figure 18:
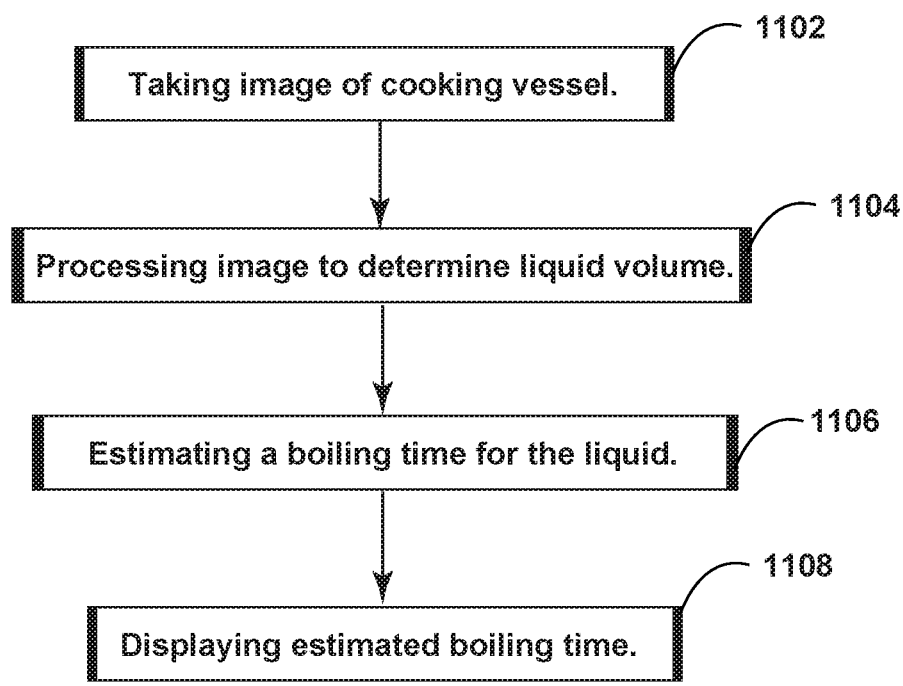
FIG. 18 is a flow chart showing a method of estimating a boil time for a liquid within a cooking vessel.

Referring to FIG. 18, another algorithm can be described as a method 1100 of estimating a boiling time for a liquid within a cooking vessel sitting in a heating zone on a cook surface for a cooking appliance can include: at 1102, taking an image of a cooking vessel. A camera or other sensor can be used to take the image. The image can be a visible light image of the cooking vessel, taken by an imaging sensor having a field of view encompassing the cooking vessel, or an area containing the cooking vessel.

At 1104, the method 1100 can include processing the image to determine a volume of liquid within the cooking vessel. A processor can determine, such as by a pixel-by-pixel analysis, the volume of liquid within the cooking vessel based upon the image taken at 1102. Processing the image can also include determining a type of liquid, such as based upon color, contrast, or opacity from the visible light image, or determined by historical data or user input, to utilize in determining the boiling time at 1106. A default liquid type can be water, while it is contemplated that the default liquid can be changed or updated.

At 1106, the method 1100 can include estimating a boiling time for the volume of liquid. The temperature or thermal output of a heater or heating zone heating the cooking vessel and liquid therein can be used to assist in estimating the boiling time. In one example, the temperature can be measured by a temperature sensor, such as an infrared sensor. In another example, the temperature can be determined by the cooking appliance and provided for use with the volume of liquid to determine the boiling time.

At 1108, the method 1100 can include displaying the estimated boiling time on the cooking surface. The method can further include reducing a heat output of the heating zone when the time that is displayed satisfies a predetermined threshold, such as a timer countdown. When the timer has completed, the imaging sensor can verify that boiling has been achieved. If verified, then the heat from the heating zone can be reduced to prevent a boil over mess. Such a reduction in heat can be resultant of sending a control signal to the cooking appliance, such as via a wireless network.

Additionally, the method 1100 can include sensing a temperature of the liquid within the cooking vessel. Sensing can include using a sensor, such as an infrared sensor or a temperature probe provided in the cooking vessel to determine and monitor the temperature of the liquid. Utilizing the temperature, the estimated boiling time can be more accurately predicted, as well as real-time updated as the liquid heats within the cooking vessel. Such a sensing can include taking a thermal image of the liquid and determining the temperature from the thermal image.

Figure 19:
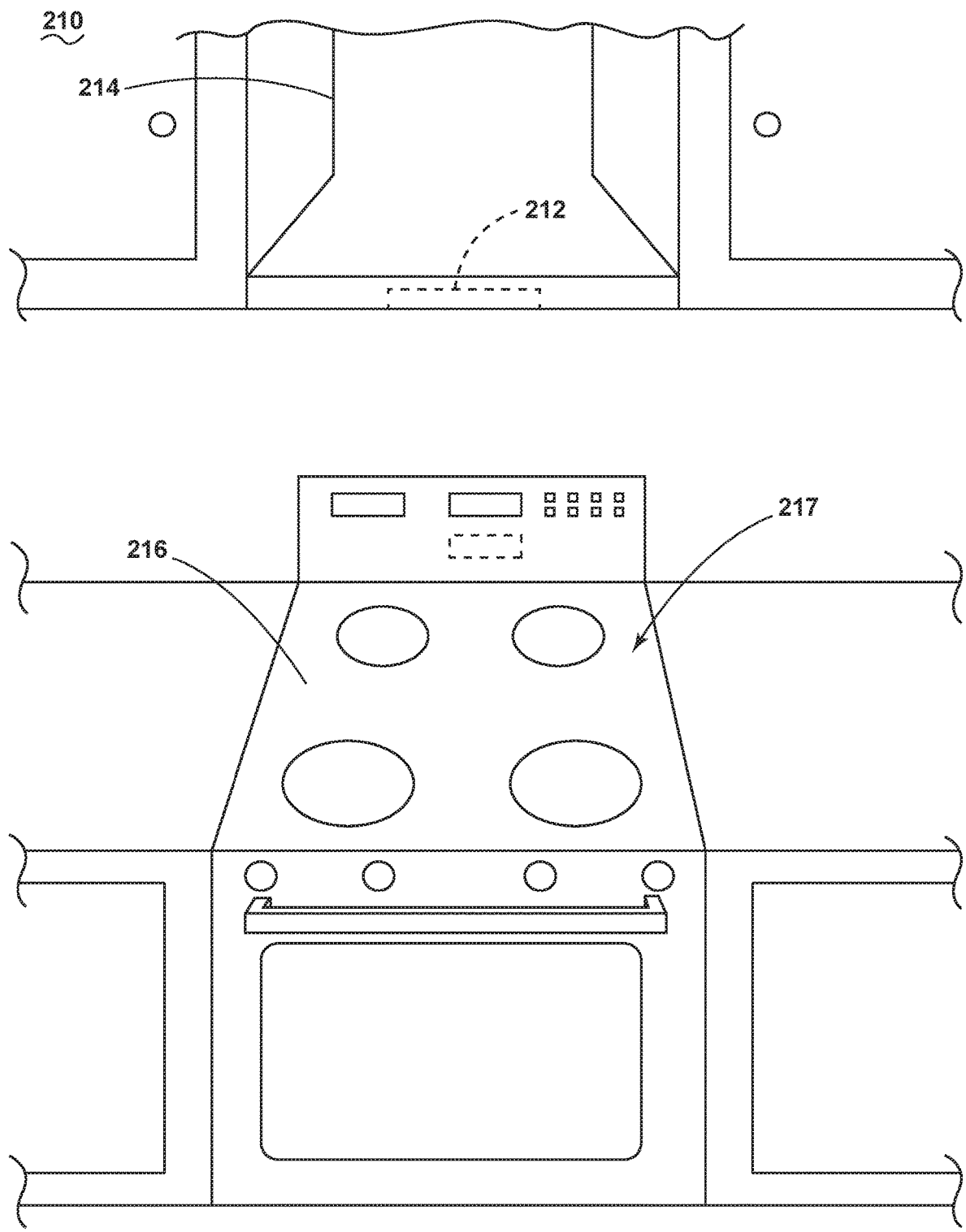
FIG. 19 is a perspective view of a cooking area having a cooking assistance appliance integrated into a hood above a cooking appliance.

Referring to FIG. 19, an alternative cooking area 210 includes a cooking assistance appliance 212 integrated into an exhaust hood or a ventilation hood 214 positioned above a cooking appliance 217. The cooking area 210 can be substantially similar to that of the cooking area 10 of FIG. 1, and the discussion will be limited to differences between the two. The ventilation hood 214 can provide for ventilating a stovetop 216 while cooking on the stovetop 216. The cooking assistance appliance 212 is integrated into the ventilation hood 214, such that the ventilation hood 214 and the cooking assistance appliance 212 can be considered as a single, unitary appliance, while it is contemplated that the two can be separate, best described in FIGS. 21-22.

Figure 20:
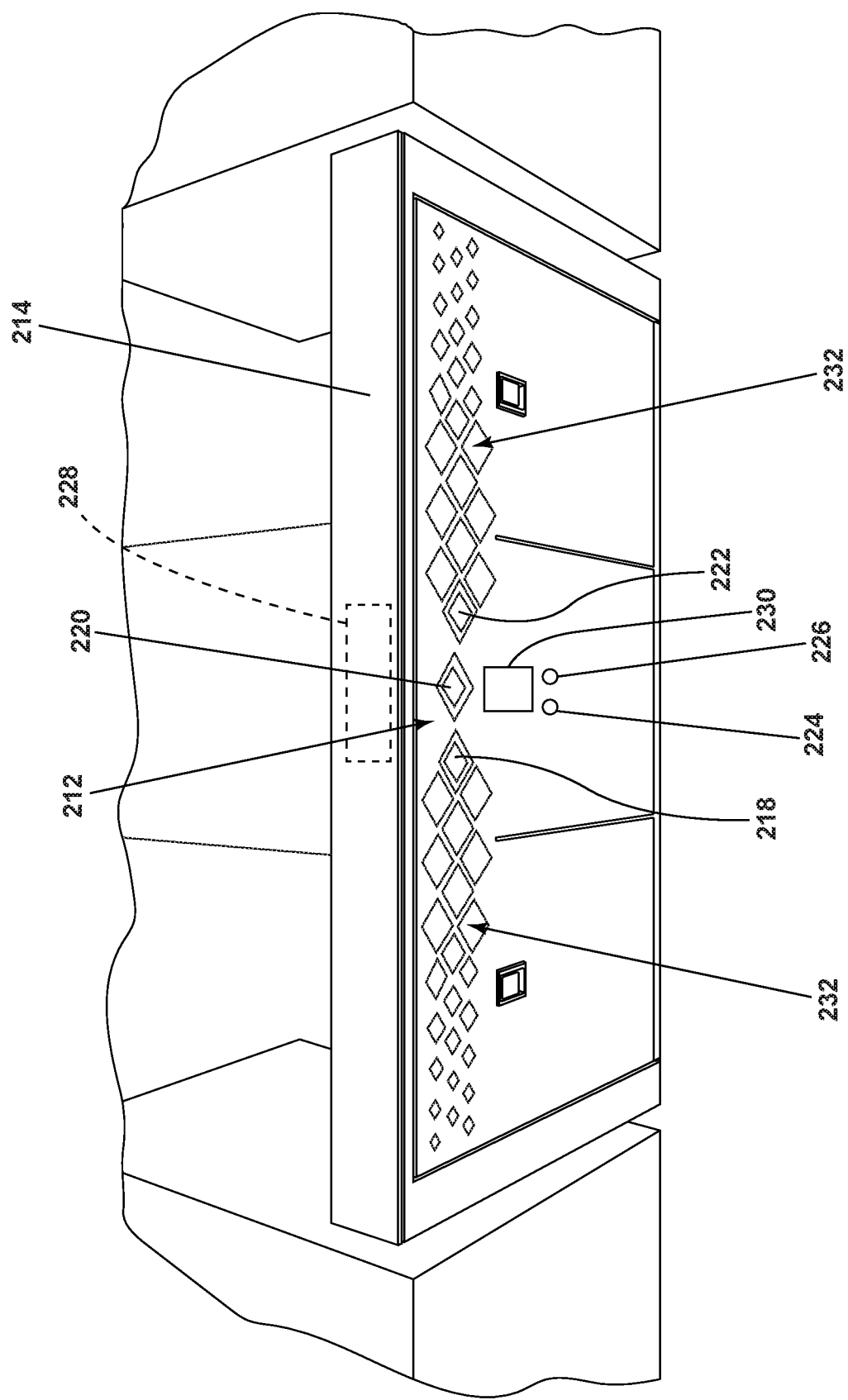
FIG. 20 is a bottom view of the hood including the integrated cooking assistance appliance of FIG. 19.

Referring to FIG. 20, the cooking assistance appliance 212 can include the same features as that of the cooking assistance appliance 50 of FIG. 2, including a camera 218, an infrared sensor 220, and a proximity sensor 222, as well as a microphone 224 and a speaker 226. A controller 228 can be included as well and can include a CPU and a memory, as well as a power source connected to the controller 228 and a wireless communication module, similar to that of FIGS. 2 and 3.

In addition, the cooking assistance appliance 212 can include a projector 230. The projector 230 can be provided above the stovetop 216 to project images or a virtual interface onto the stovetop 216 and surrounding area. The virtual interface can include information provided to the user using the stovetop 216, such as but not limited to a timer, cooking instructions, cooking temperature, images of food items or cookware, recipes, media, applications, or a virtual screen such as that of a mobile device or an operating system. More specifically, when a mess is detected, such as that of FIGS. 6 and 7, the projector 230 can project a projected image indicative of the sensed mess. The projected image can include human readable information, such as text, and can include instructions to stop, mitigate, or even clean the mess. Additionally, where the occurrence of a mess is anticipated, the projected image can include instructions to avoid an imminent mess. It is further contemplated that the user can interact with the virtual interface, such as with the cooking assistance appliance 212 detecting user movements, indications, or gestures via the camera 218, for example.

The ventilation hood 214 can include a light array 232 as a series of lights. The light array 232 can be operably coupled to the controller 228 such that the cooking assistance appliance 212 can turn the light array 232 on and off, or control the illumination of the light array 232. Control of illumination can further include light patterns, such as different colors, shades, intensities, or otherwise, which can be used to indicate information or a status to a user. In this way, the light array 232 can provide contextual lighting, where an illumination pattern for the cooktop is related to an operation or action being performed by the user or the state of the cooktop or cooking process.

Figure 21:
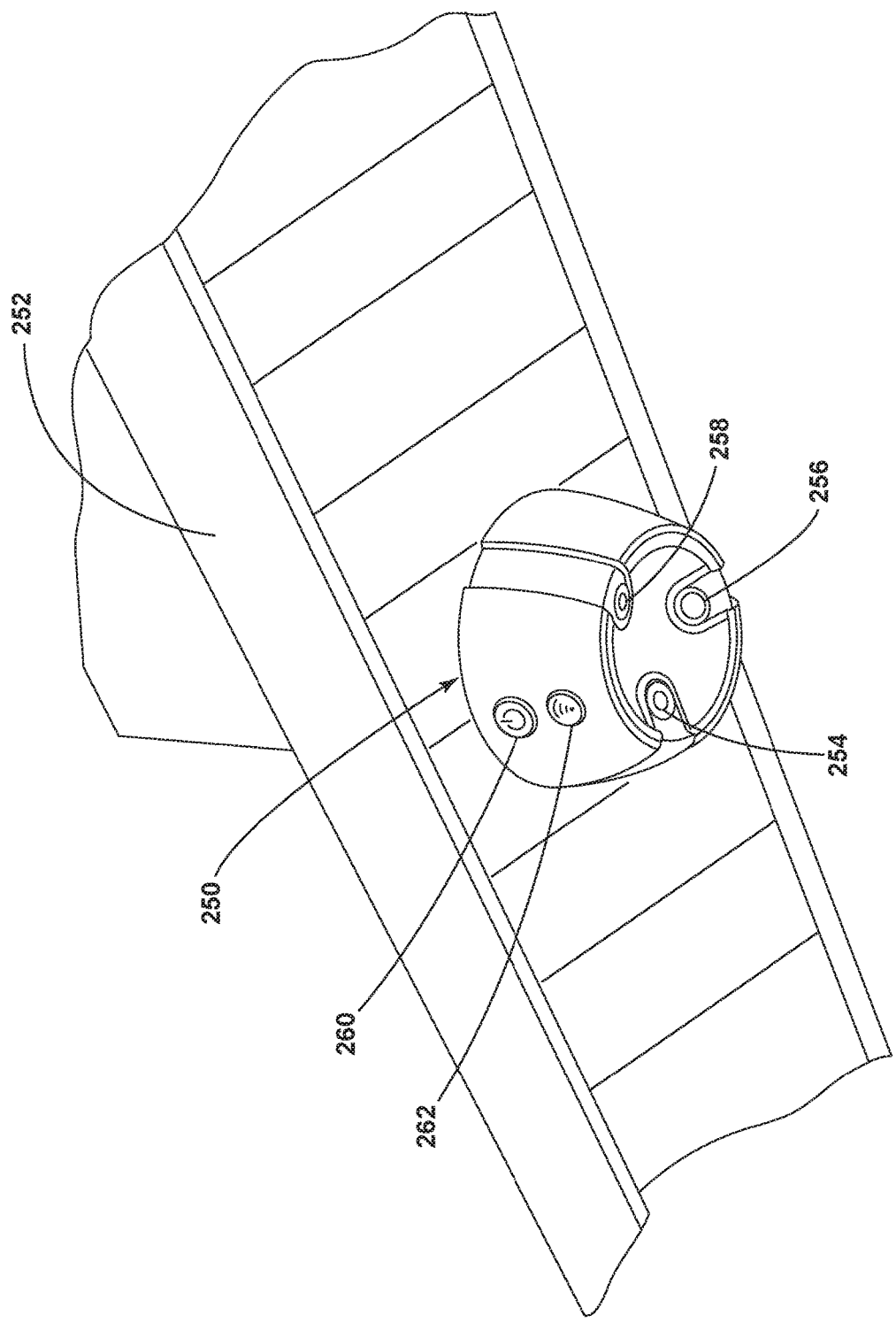
FIG. 21 is a bottom perspective view of a stand-alone cooking assistance appliance that can be mounted to a hood above a cooking appliance.
Figure 22:
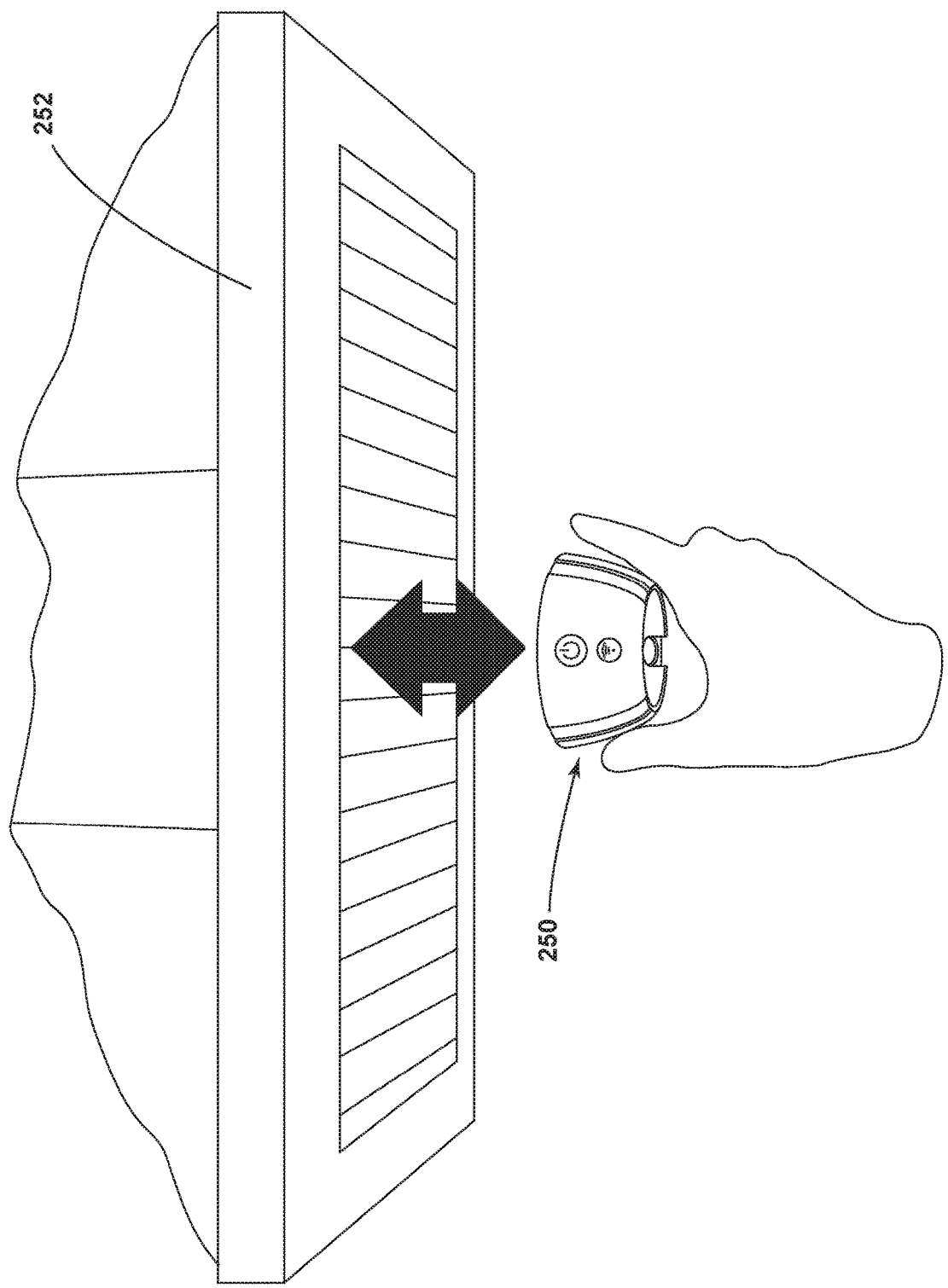
FIG. 22 is a bottom view of the stand-alone cooking assistance appliance of FIG. 21 being mounted to the hood.

Referring to FIGS. 21 and 22, another alternate cooking assistance appliance 250 as a stand-alone appliance. The cooking assistance appliance 250 can be mounted above a stovetop, such as to a ventilation hood 252 or a cabinet mounted above or above and adjacent to a stovetop. The cooking assistance appliance 250 can include features similar to that of the cooking assistance appliances 50, 212 described in FIG. 2 and FIG. 20, such as a controller, a wireless communication module, a camera 254, an infrared sensor 256, a proximity sensor, a projector 258, a microphone, a speaker, and a power source. Additionally, the cooking assistance appliance 250 can include a power button 260 for turning the cooking assistance appliance 250 on and off, as well as a pairing button or sync button 262 for pairing the cooking assistance appliance 250 with a wireless network or another appliance, such as the ventilation hood 252 or a cooking appliance such as a stovetop, range, oven, or stove-oven combination. Pairing the cooking assistance appliance 250 with another appliance can provide for syncing the cooking assistance appliance 250 with the sync button 262 to a remote database or other information, as well as syncing multiple appliances together to provide for interaction and common operation between the appliances. For example, if a sensor such as the camera 254 detects a mess condition, the cooking assistance appliance 250 can instruct a stovetop to reduce heat to prevent or minimize a mess when in communication with the stovetop. Referring to FIG. 22 specifically, the cooking assistance appliance 250 can be mountable to an existing hood 252 or other element positioned above a stovetop. In one example, the cooking assistance appliance 250 can be magnetic to mount to a metal hood, or can include an adhesive. Battery power can be used to power the cooking assistance appliance 250, while a dedicated power source is contemplated like a plug-in power connection.

Figure 23:
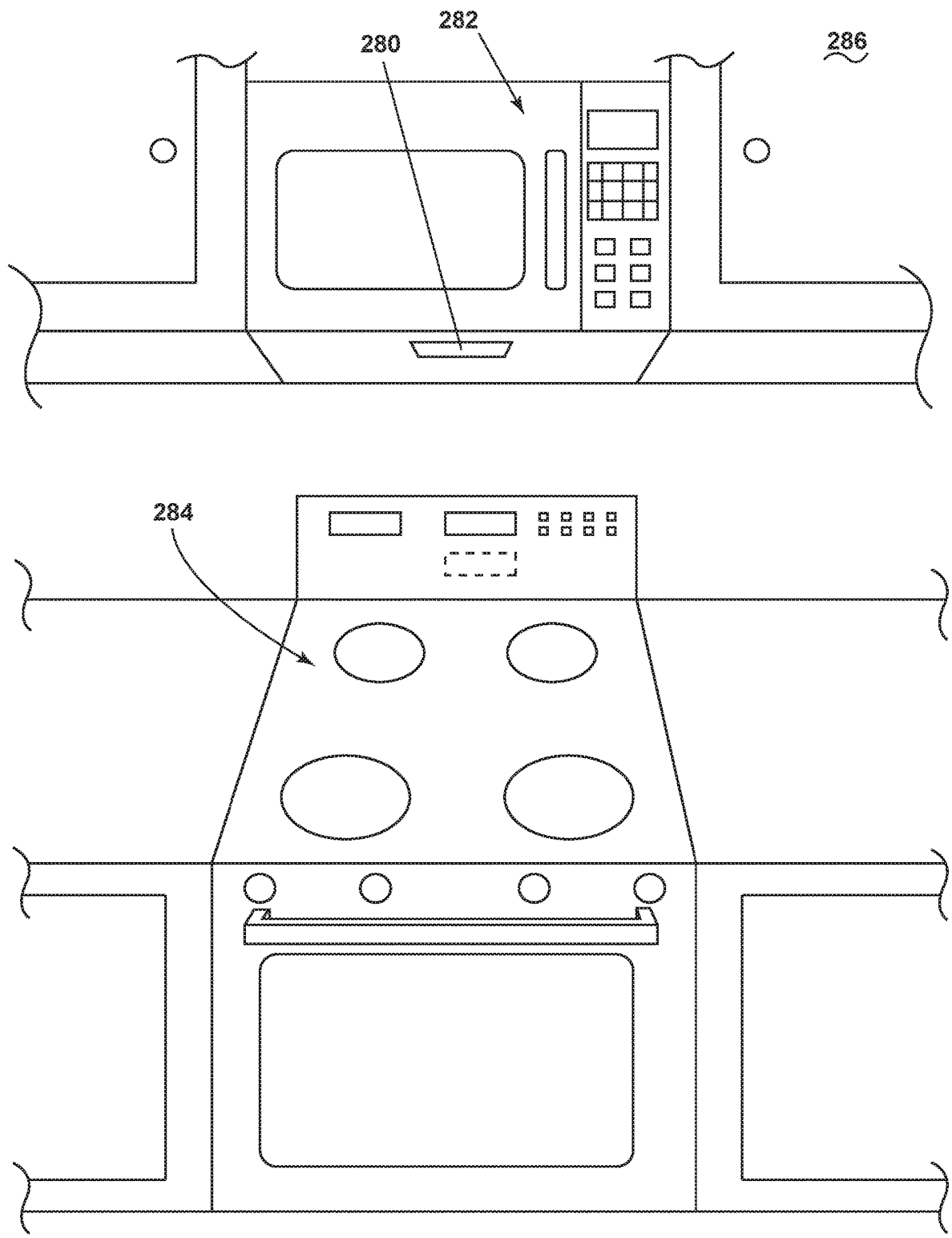
FIG. 23 is a perspective view of a cooking assistance appliance integrated into a microwave-cooking appliance mounted above a stove-cooking appliance.

Referring to FIG. 23, another cooking assistance appliance 280 can be integrated as part of a microwave-cooking appliance 282 mounted above a stovetop 284 or range, as part of a cooking area 286. The cooking area 286 can be substantially similar to that of FIG. 1, except that the cooking assistance appliance 280 is integrated as part of the microwave-cooking appliance 282. The cooking assistance appliance 280 can include similar features as that of the cooking assistance appliance 212 integrated into the ventilation hood 214 of FIG. 19, except that cooking assistance appliance 280 is integrated into a microwave overhanging the stovetop 284 as opposed to a hood. Such similar features can include, for example a camera, an infrared sensor, a proximity sensor, a probe, a microphone, a speaker, a controller, a wireless communication module, projector, or any other feature as discussed in relation to the cooking assistance appliance.

Figure 24:
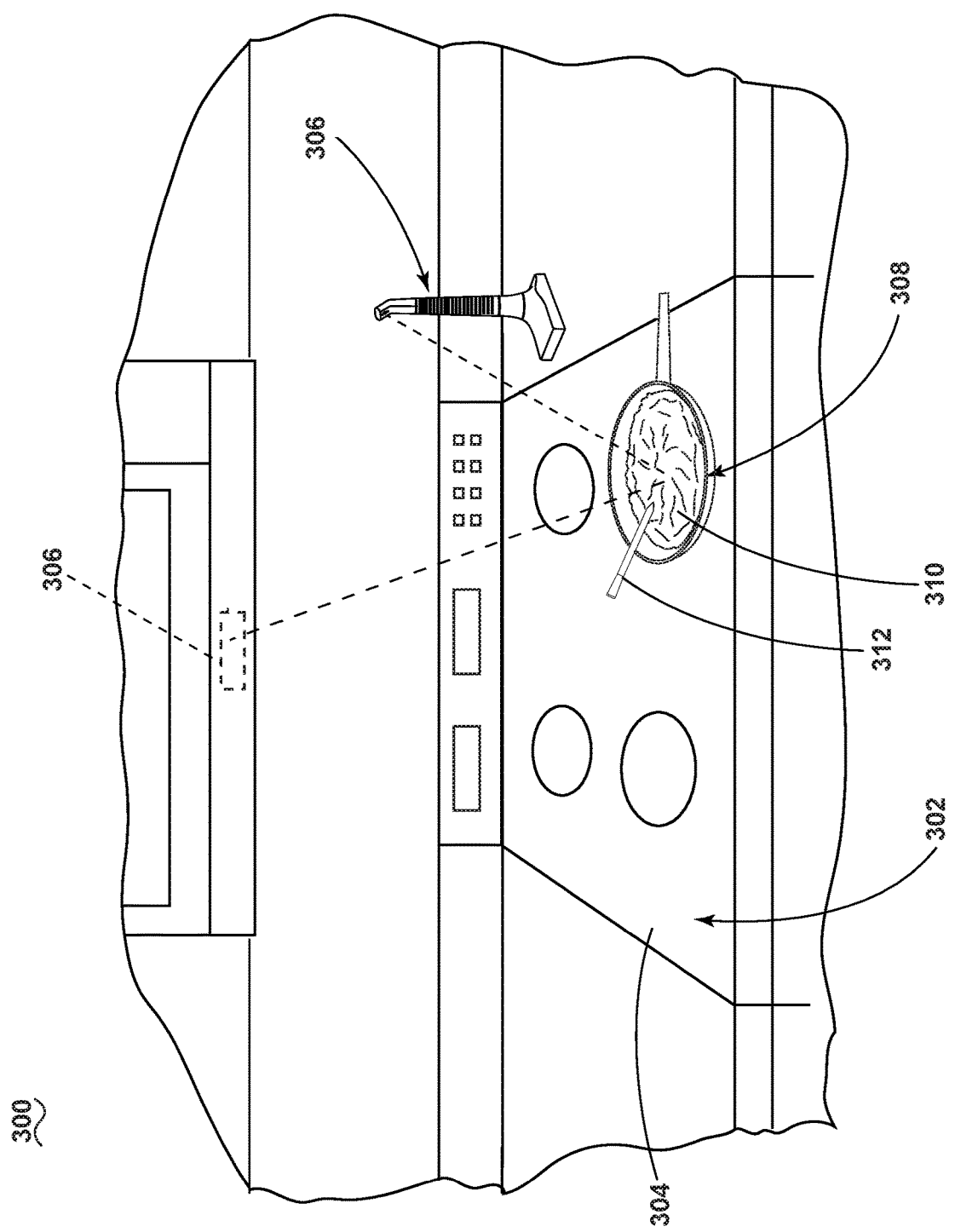
FIG. 24 is a perspective view of a cooking assistance appliance monitoring a doneness of a food item.

Referring to FIG. 24, another cooking area 300 includes a cooking appliance 302 including a stovetop 304 and a cooking assistance appliance 306. It should be appreciated that while two cooking assistance appliances 306 are shown (that of FIG. 2 and FIG. 23), only one cooking assistance appliance 306 is needed and two are shown to clarify that any version of the cooking assistance appliance as described herein can be utilized.

The cooking assistance appliance 306 can be used to detect a temperature of the stovetop 304, or a cookware item 308 or a food item 310 placed thereon. In a first example, the cooking assistance appliance 306 can determine an external 'doneness' of the food item 310. A doneness as used herein can include a temperature on the exterior surface of the food item indicative of the food item being fully cooked, or less than fully cooked. For example, where a food item reaches an external temperature of 185° F., it may be indicative of an internal temperature of 165° F., and a determination that the food item 310 has been fully cooked.

In another example, a surface temperature of the stovetop 304 or that of the cookware 308 can be used to determine if a proper pre-heat has been achieved. Some food items are to be cooked on a skillet that has already been heated, such as steak, and the cooking assistance appliance 306 can utilize an infrared sensor, such as the infrared sensor 256, to determine if the proper temperature has been reached. Additionally, in this way, a use case tailored to a particular recipe preparation, such as that described in regard to FIG. 3, can be created or utilized based upon a selected recipe or food item 310, where the cooking assistance appliance 306 instructs the stovetop 304 to automatically preheat the cookware 308.

In yet another example, a probe 312 can be utilized to determine an internal temperature of the food item 310. This can be done alone, or in addition to a determination of the surface temperature of the food item 310. The probe 312 can be in communication with the cooking assistance appliance 306, and can be used to determine when the food item 310 is fully cooked, as well as create an accurate timer to determine when cooking will be finished. Such information can be communicated to the user from the cooking assistance appliance 306. Furthermore, this permits the user to leave the vicinity of the stovetop 304, and still be alerted when the food item 310 has been or will be fully cooked, regardless of the physical location or local presence of the user.

Figure 25:
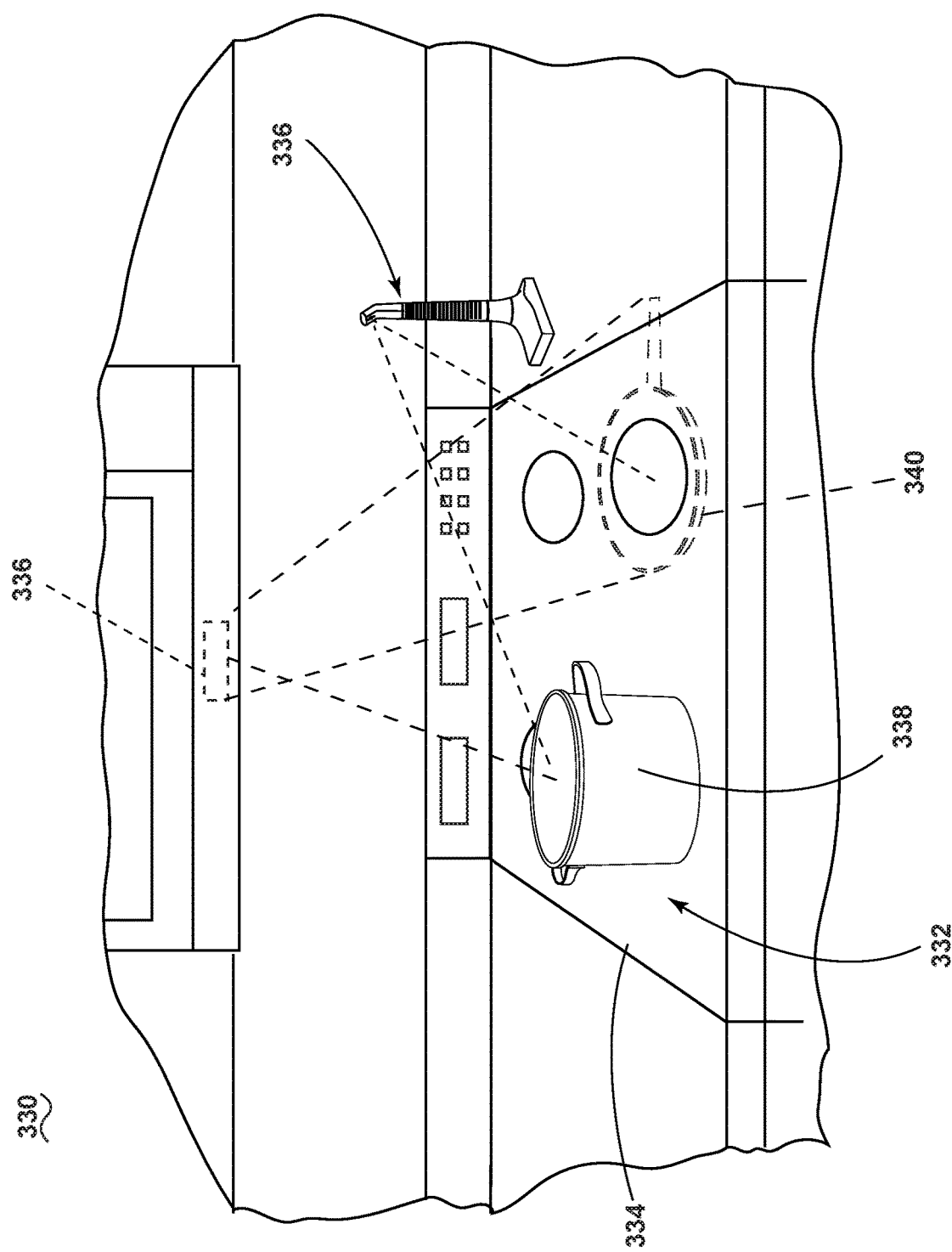
FIG. 25 is a perspective view of a cooking assistance appliance providing an automated cooktop setup with cookware indication and detection.

Referring to FIG. 25, another cooking area 330 includes a cooking appliance 332 including a stovetop 334 and a cooking assistance appliance 336. It should be appreciated that while two cooking assistance appliances 336 are shown (that of FIG. 2 and FIG. 23), only one cooking assistance appliance 336 is needed and two are shown to clarify that any version of the cooking assistance appliance 336 as described herein can be utilized.

A cookware item 338 is provided on the stovetop 334, and a suggested cookware item 340 can be indicated on the stovetop 334 by a cooking assistance appliance 336 that includes a projector, such as that of FIG. 19, 21, or 23. The cooking assistance appliance 336 can determine and set up a virtual cooktop based upon the food to be cooked, or the placement of one or more cookware items 338. For example, the recipe may call for spaghetti with a meat sauce, requiring the user to both boil noodles and cook meat for the meat sauce. The user can input the recipe to the cooking assistance appliance 336, or input the recipe at a user interface where the recipe can be communicated to the cooking assistance appliance 336. The user can also place the pot cookware item 338 on the stovetop 334. The cooking assistance appliance 336 can display or otherwise suggest, such as audibly, the pan-type cookware as the suggested cookware 340, instructing the user to prepare a pan for cooking the meat.

The cooking assistance appliance 336 can be in communication with the stovetop 334, and configured to operate the stovetop 334. The cooking assistance appliance 336 can then heat the pot cookware item 338 to boil water for cooking noodles, as well as heating oil in a pan after the user has placed a pan as the suggested cookware item 340. In this way, the cooking assistance appliance 336 can automate at least a portion of the cooking process for the user. The cooking assistance appliance 336 can identify a deviation from the suggested actions, and can update its instruction or use based upon deviations from a use case or more closely aligning with another use case.

Figure 26:
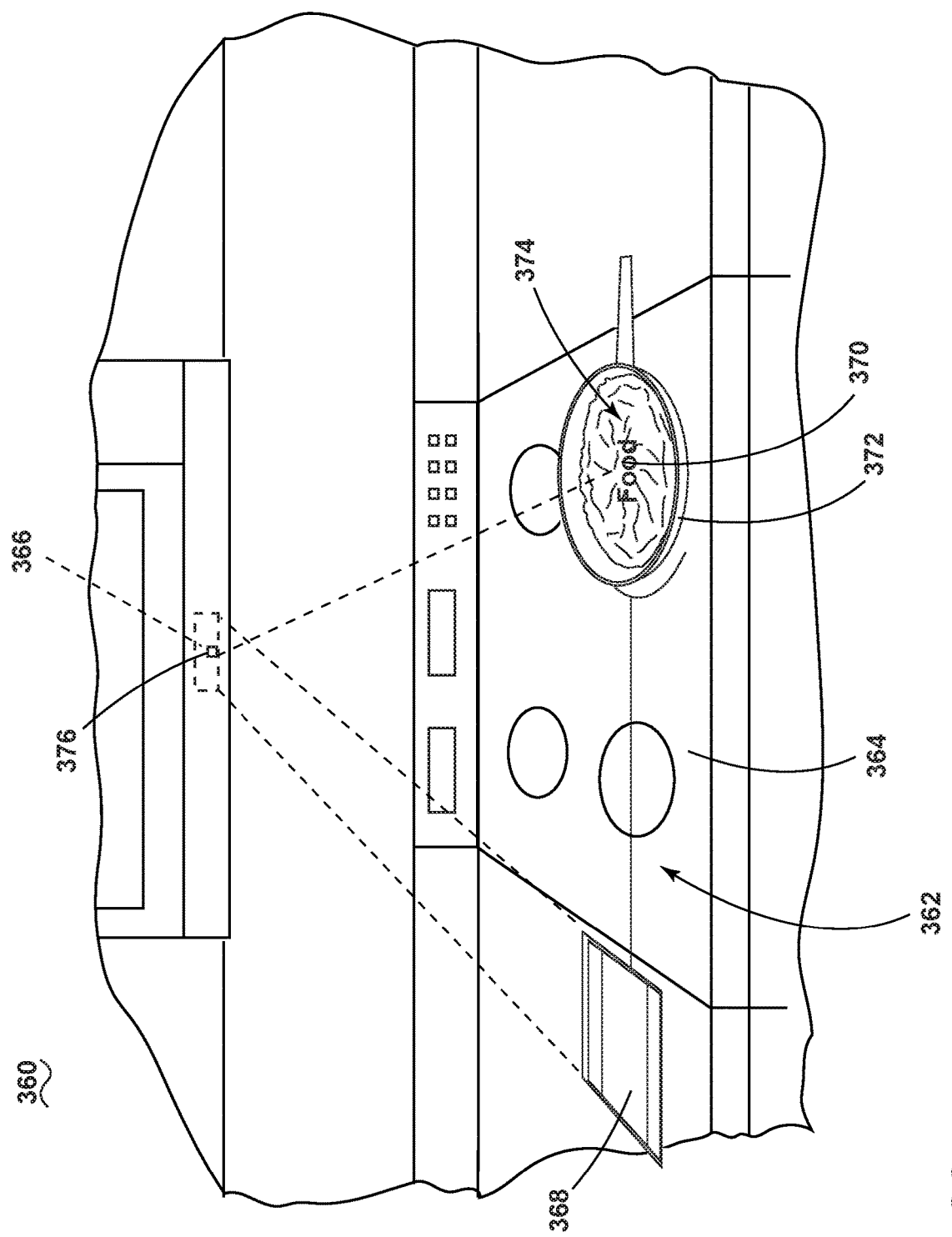
FIG. 26 is a perspective view of a user interface projected from a cooking assistance appliance adjacent to a cooking appliance.

Referring to FIG. 26, another exemplary cooking area 360 includes a cooking appliance 362 with a stovetop 364 and a cooking assistance appliance 366. The cooking assistance appliance 366 can include a projector 376 to project a virtual image 368 adjacent to the stovetop 364, on the stovetop 364, or a virtual image 370 on cookware 372 or a food item 374. The projections can provide for guidance and education of the user, or assistance to the user cooking the food item(s) 374. For example, the cooking assistance appliance 366 can provide step-by-step instruction as well as feedback during the cooking process. More specifically, the cooking assistance appliance 366 can provide detailed instructions for the steps of preparing the recipe, such as preparing initial ingredients to cooking the ingredients on the stovetop 364. The virtual image 368 can include more detailed instruction, images, images of the food item during cooking stages, videos on food preparation, nutritional information, a timer, or other videos, images or information that can be useful in assisting the user how to prepare portions of the recipe. Examples include preparing ingredients, such as seasoning, chopping, or cleaning, in non-limiting examples.

Furthermore, the cooking assistance appliance 366 can assist in informing the user of the status of the recipe or portions thereof. For example, the virtual image 368 can provide a current temperature for the cookware 372, or the time left until cooking that portion will be completed. The virtual image 368 can provide images of completed portions of the cooking process so the user can determine if their preparation is comparable with that of a properly cooked food item 374.

It is further contemplated that feedback can be provided to the user during the cooking process, such as adding ingredients in a certain order at certain times, or updating or changing the recipe based upon identified variations.

Additional information that can be displayed as the virtual image 368 can include nutritional values, proper substitutes, images, videos, recipes, a user interface, a control panel for controlling the cooking assistance appliance 366 or the stovetop 364, recipe suggestions, interactive recipe navigation, ingredient detection or input, or any other display, such as that of a mobile device, social media or networking, an operating system, or other entertainment. Such visual feedback can provide for educating and assisting the user in the cooking process. Furthermore, such a process can provide for mistake avoidance, by providing detailed, step-by-step actions to the user, as well is images or videos the user can use to ensure that a proper cooking step or process is being performed and completed. Additionally, the infrared sensor can ensure that proper temperatures are being achieved.

Furthermore, it is contemplated that the cooking assistance appliance 366 can identify the food items 374 or ingredients, and the cooking assistance appliance 366 can indicate recipes suggestions at the virtual image 368, or even begin an automated cooking process based upon prior use cases, which can be identified or provided to the user as the virtual image 368. The user can then input any variations therefrom, or the cooking assistance appliance 366 can determine any variations therefrom based upon imaging of the stovetop 364 or the user.

Figure 27:
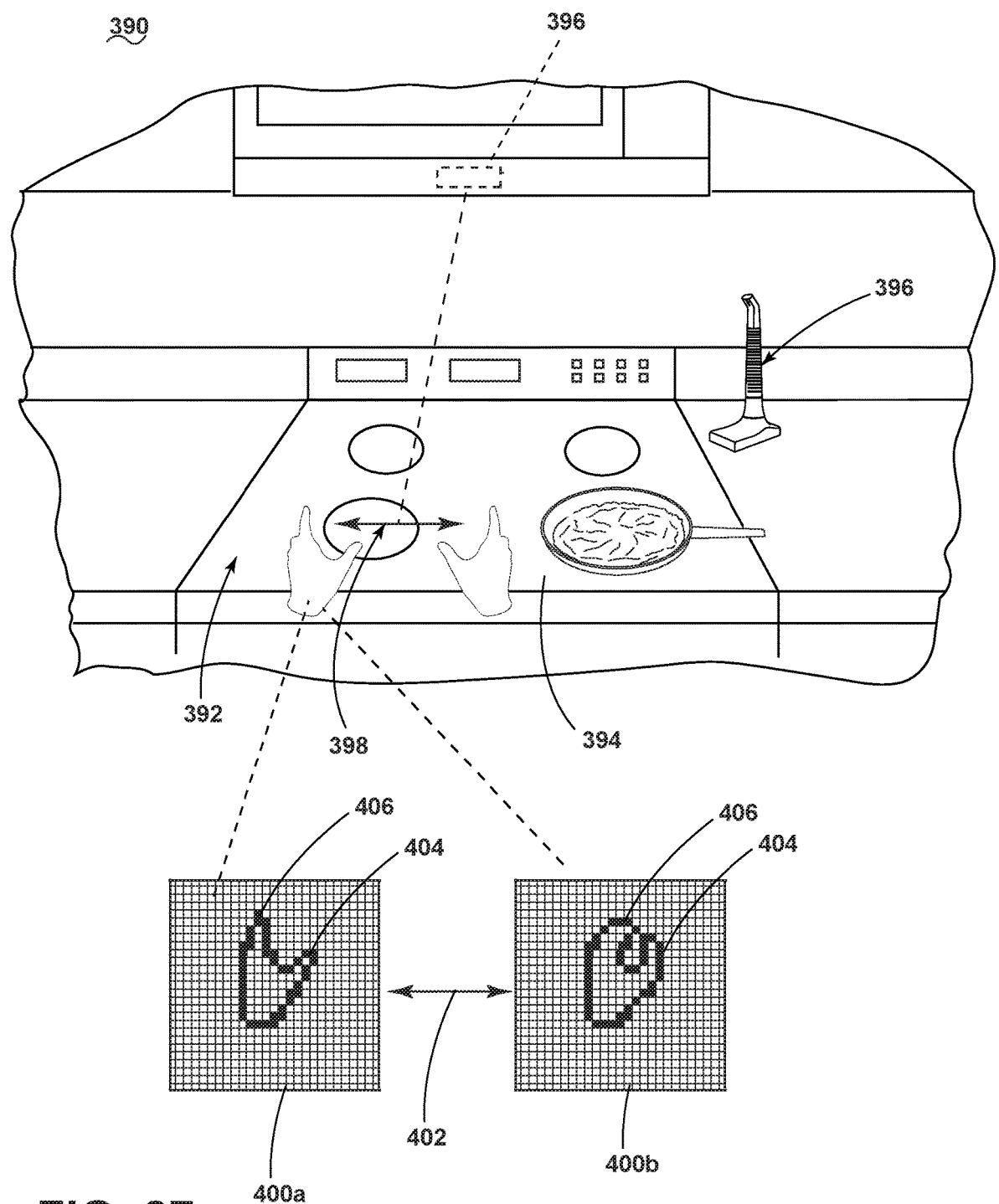
FIG. 27 is a perspective view of a user making gestures to operate or interact with a cooking assistance appliance.

Referring to FIG. 27, another cooking area 390 includes a cooking appliance 392 including a stovetop 394 and a cooking assistance appliance 396, and can be substantially similar to that of FIG. 25, except that the cooking assistance appliance 396 can include gesture controls.

The cooking assistance appliance 396 can provide for assisted user interaction. For example, the user can interact with the cooking assistance appliance 396 using specific gestures 398 to control the operation of cooking assistance appliance 396, the stovetop 394, or both. Such gestures 398 can be used in concert with voice or audible instruction. Utilizing the gestures of the voice control provides for interacting with the cooking assistance appliance 396 or the stovetop 394 in a hands-free manner. During cooking or food preparation, hands-free use is often required, as food preparation can be messy. Such gesture recognition can be beneficial in hands-free operation of the cooking appliance 392. Additionally, it is contemplated that the user can identify certain recipes, foods, or other actions with a particular gesture, and store such a gesture within the cooking assistance appliance 396.

Additionally, the cooking assistance appliance 396 can be configured to detect movements of the user or the user's hands as performing or completing portions of a recipe or food preparation, which can be considered as gestures and utilized to proceed with portions of the recipes along with the user. For example, gestures such as cutting, stirring, pouring, flipping, or other similar common cooking motions can be recognized and utilized by the cooking assistance appliance 396 to progress through recipe completion. Such progression can be confirmed with the cooking assistance appliance 396 via voice, for example.

Furthermore, the cooking assistance appliance 396 can record and store gestures from the user to learn common food preparation styles or habits. In this way, the learning can be used to update system parameters based upon use preferences, suggestions, or commonalities, and can be used to develop particular use cases.

The gestures 398 can be recorded as a series of images 400a, 400b, and the cooking assistance appliance 396 can utilize a pixel-by-pixel comparison 402 against a database to identify the gesture 398. The cameras incorporated into the cooking assistance appliance 396 can be configured to record and analyze such images on a regular basis. As shown, a first image 400a can be representative of a standard user hand, similar to that shown as the gesture 398, with a thumb 404 spaced from a fore-finger or pointer-finger 406. As the user gestures, the hand changes position to the second image 400b, with the pointer-finger 406 touching the thumb 404, which may indicate 'OK', for example. In this way, the cooking assistance appliance 396 can continuously monitor the actions of the user to determine if the user has provided a gesture communication or instruction.

In addition to the pixel-by-pixel comparison 402, it is contemplated that user features can be utilized to determine gestures, or even train the system to more-readily recognize the gestures. Features can include, but are not limited to, skin color or markings, hand shape, user temperature information, time-dependent movement of the user, hand joints, nails, or other features which may be unique to a user, even including fingerprints or tattoos, for example. Such identifying features can be used to construct a virtual hand or skeleton, which can be used to both identify a user as well as identify current gestures or action.

Figure 28:
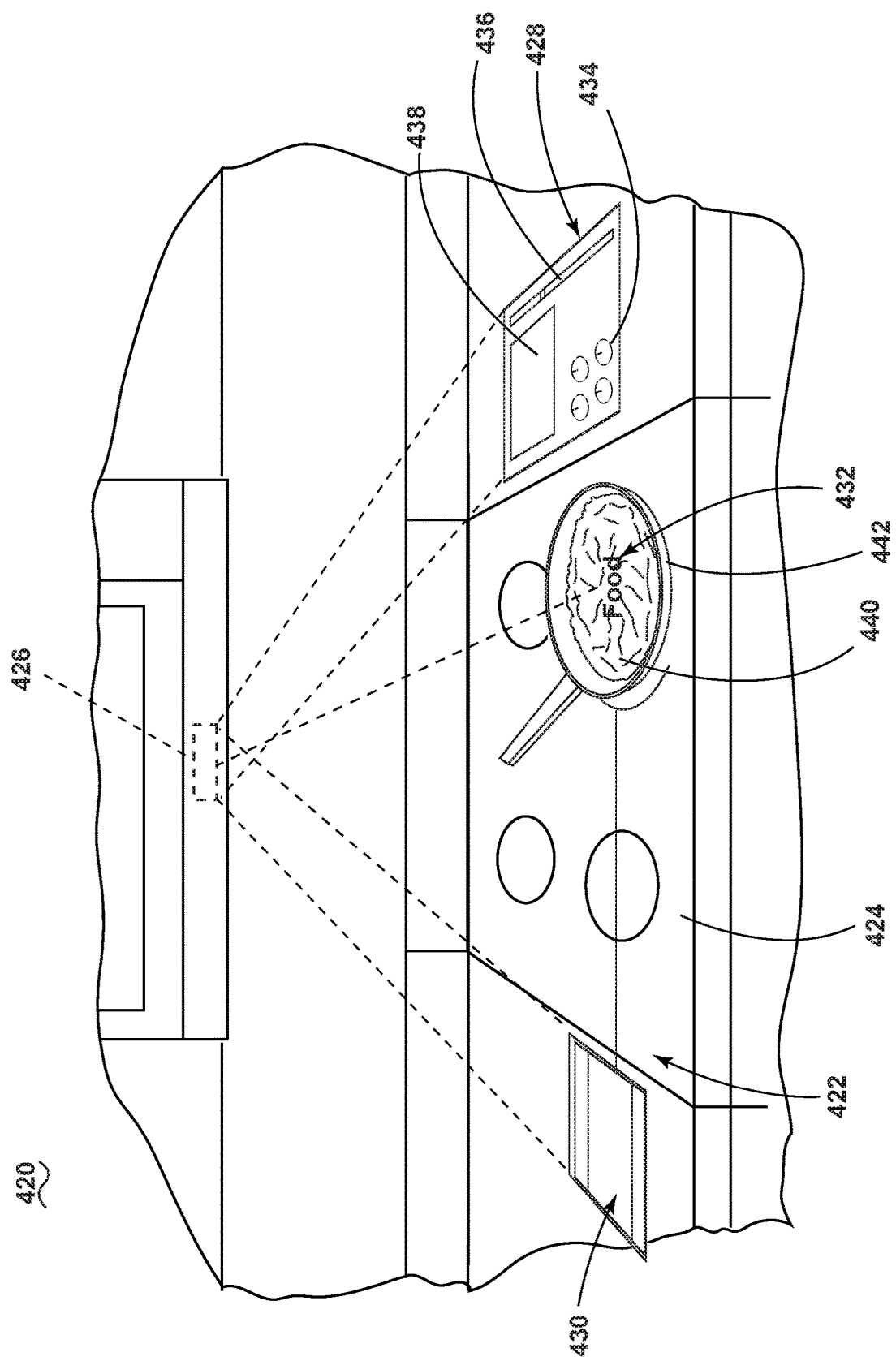
FIG. 28 is a perspective view of a virtual user interface projected onto a surface for operating a cooking appliance and a cooking assistance appliance.

Referring to FIG. 28, another cooking area 420 includes a cooking appliance 422 having a stovetop 424, and includes a cooking assistance appliance 426 above and operably coupled to the stovetop 424. The cooking assistance appliance 426 can include a projector for projecting a virtual surface on to the stovetop 424 and surrounding area. The cooking assistance appliance 426 can project a virtual user interface 428, as well as related images, videos or displays 430, 432, in addition to the virtual user interface 428. The virtual user interface 428 can include virtual controls for operating the stovetop 424 or cooking appliance 422, such as but not limited to knobs 434, a scroll bar 436, or a button interface 438. The user can then interact with the virtual user interface 428, such as attempting to turn a knob 434 or move the scroll bar 436 on the surface. The cooking assistance appliance 426 can use the camera or other sensor to measure the movements of the user to operate the cooking appliance 422 or the cooking assistance appliance 426 based upon the user movements intended to interact with the virtual user interface 428. Specifically, the cooking assistance appliance 426 can make a pixel-by-pixel comparison or other more sophisticated analysis of images taken by the camera to determine the actions taken by the user on the virtual user interface 428. In this way, an actual user interface need not be required. Furthermore, the virtual user interface 428 can include information related to the cooking appliance 422, such as warnings where local temperatures are hot. The user can control or confirm such messages by interacting with the virtual user interface 428.

Additionally, a projection on the stovetop 424 or a food item 440 can be interacted with by a user. As the user places a cookware item 442 or interacts with the food item 440, the cooking assistance appliance 426 can interpret such actions as an interaction with the virtual user interface 428 in order to inform the cooking assistance appliance 426 of progression through a recipe or cooking process.

Figure 29:
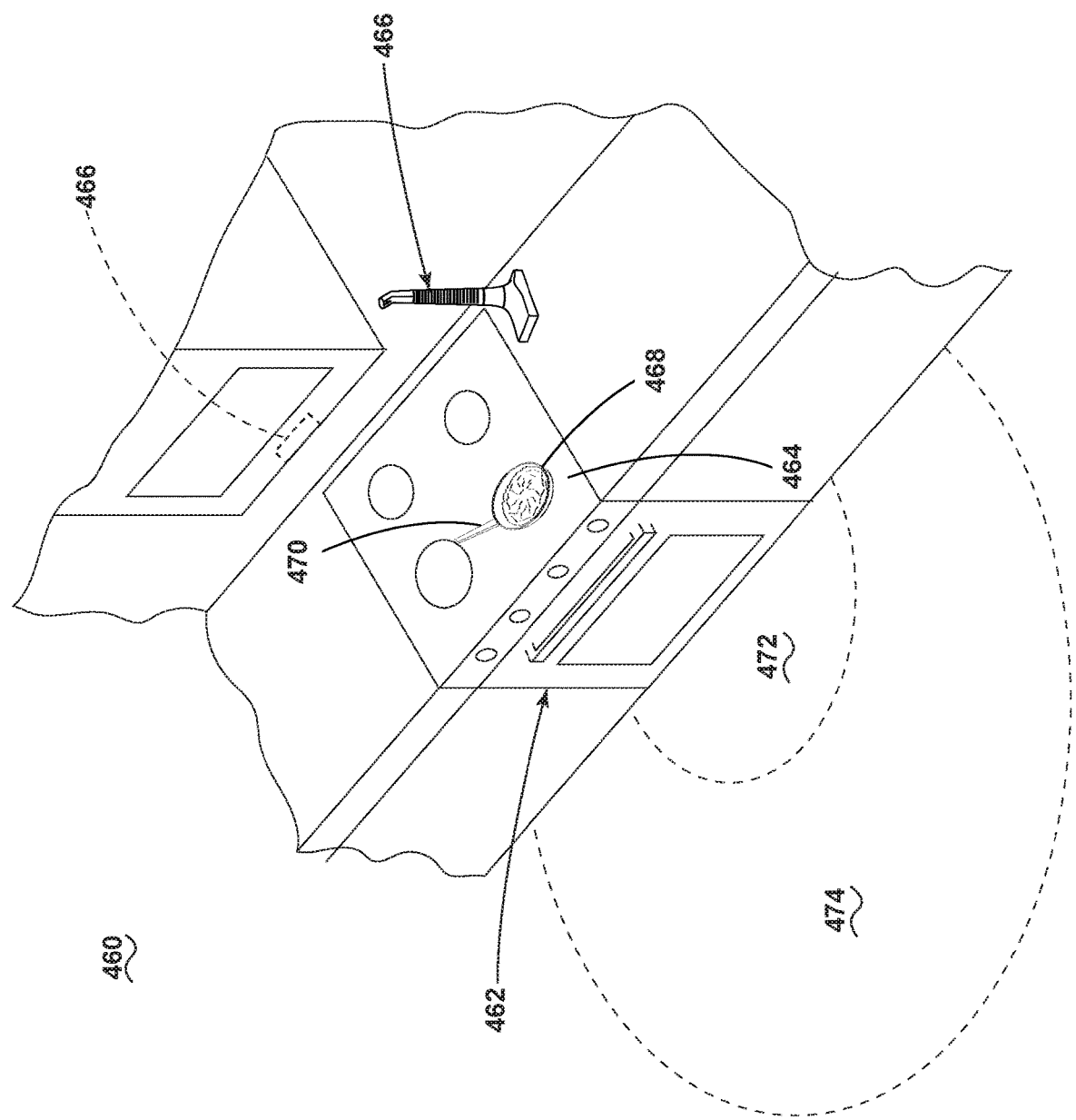
FIG. 29 is a perspective view of a peace of mind monitoring system provided from a cooking assistance appliance.

Referring to FIG. 29, another cooking area 460 includes a cooking appliance 462 including a stovetop 464 and a cooking assistance appliance 466. It should be appreciated that while two cooking assistance appliances 466 are shown, only one cooking assistance appliance need be used, and can provide peace of mind assistance to a user.

Peace of mind can include identifying alert conditions such as improper handle placement, a child alert, a pet alert, or a monitor mode in non-limiting examples. Improper handle placement can include cookware 468 with the handle 470 provided over another burner or heated portion of the stovetop 464 where the handle 470 may become heated and too hot to handle.

A child alert or a pet alert can provide for alerting a user, either audibly, visually, or with a remote notification, that a child or a pet has entered a zone 472, 474 near to or adjacent the cooking appliance 462. Such zones can be similar to those discussed in FIG. 4, and a proximity sensor can detect a child or pet within the zones. Additionally, a fire or oil flash alert can be utilized to alert a user of a fire on the cooking appliance 462.

A monitor mode can provide for monitoring operation of the cooking appliance 462 while the user has left the area or is no longer actively monitoring the cooking appliance 462. Monitor mode can include actively monitoring for mess conditions, burning or overcooking, or whether the food is done or will be done. Monitor mode can also provide for the user to view the cooking area via the camera within the cooking assistance appliance 466, providing a live look at the cooking appliance 462. Additionally, if the user needs to take an action, the monitor mode can instruct the user when the action is ready to be taken. In this way, the user need not monitor the cooking appliance 462 themselves, but can rely on the cooking assistance appliance 466 to monitor the cooking appliance 462 for them. Furthermore, it is contemplated that the cooking assistance appliance 466 can provide for monitoring the cooking appliance 462 and taking action as needed. Such action can include reducing temperature to avoid a mess, such as boiling over or splatter prevention as discussed in FIGS. 6 and 7. It is further contemplated that a control lock can be used in monitor mode, to prevent a child or other from inappropriately interacting with the cooking appliance 462.

Figure 30:
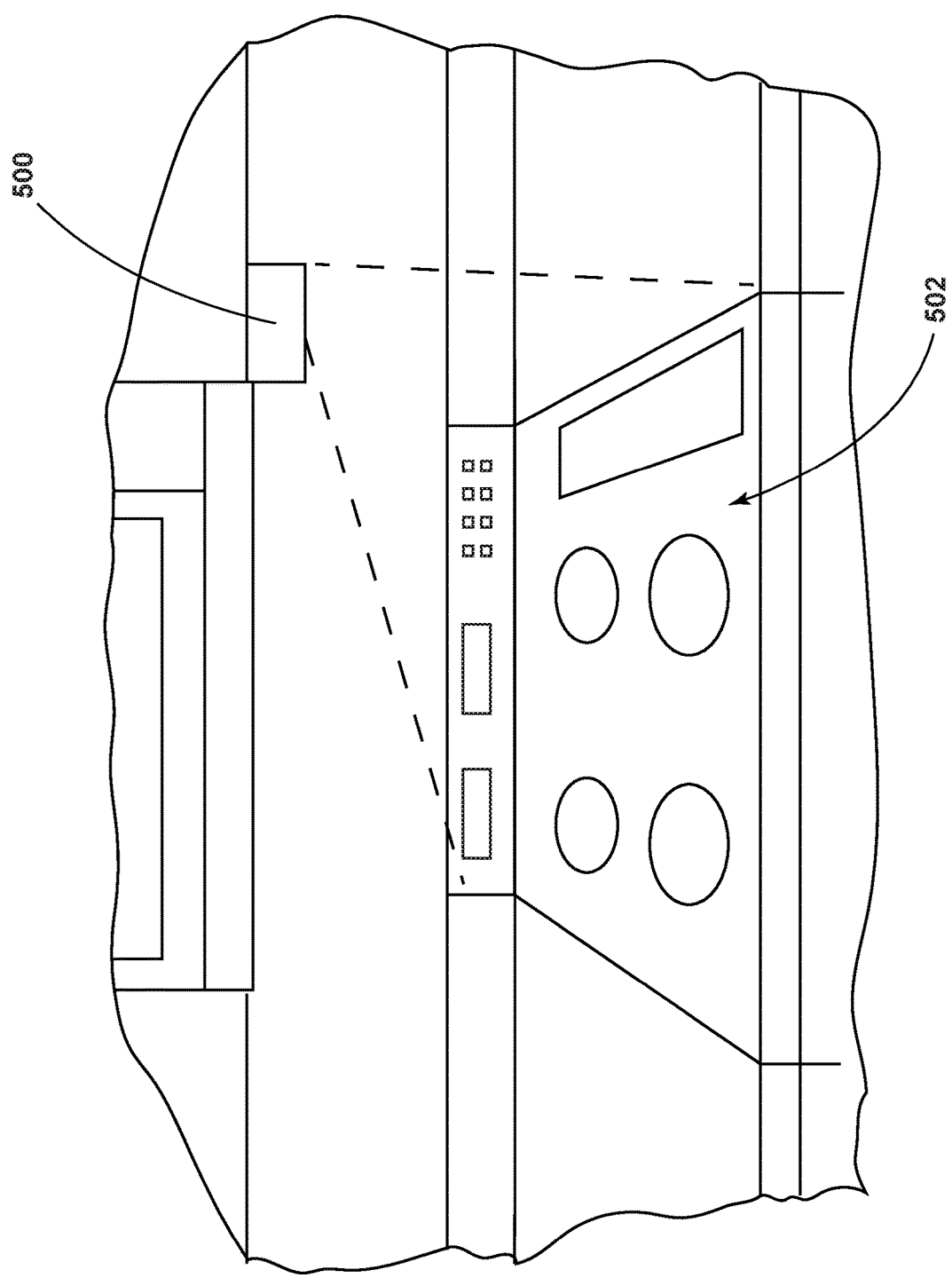
FIG. 30 is a perspective view of a cooking assistance appliance positioned beneath a cabinet above and adjacent to a cooking appliance.

FIGS. 30-38 show alternative positions or implementations for a cooking assistance appliance, while such implementations can include any of the features as described herein in any combination, module assembly, organization, or otherwise including any of the features as described herein. Referring to FIG. 30, an alternate position or implementation for a cooking assistance appliance 500 is shown, provided beneath a cabinet above, but not directly overhanging a stovetop 502. Such a position can provide for a superior angle for measuring fluid or liquid levels within the cookware, as well as being spaced from the heat, steam, and smoke emitting from use of the stovetop 502, which can provide for longer operational life of the cooking assistance appliance 500 and less potential damage or repair costs.

Figure 31:
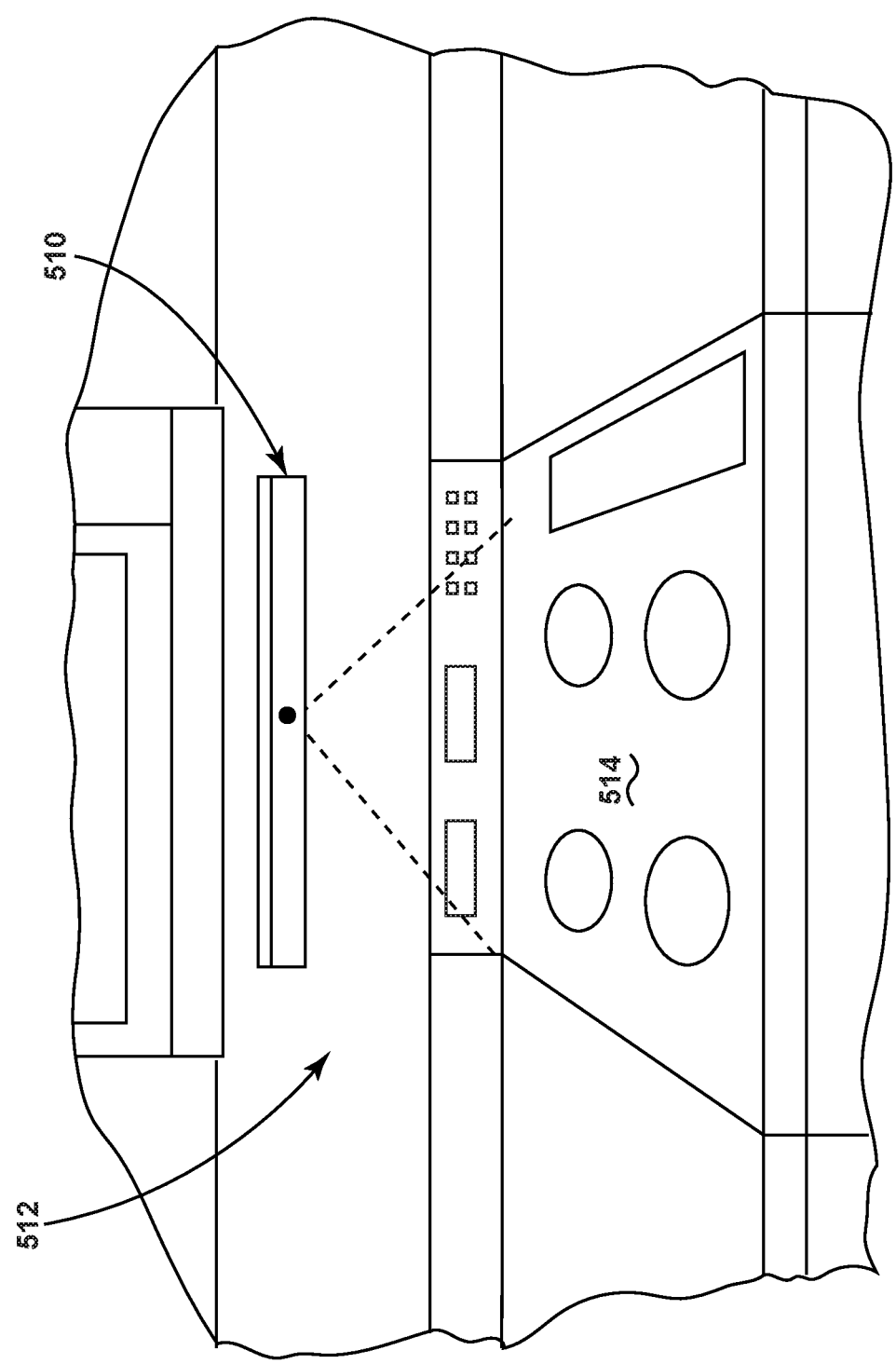
FIG. 31 is a perspective view of a cooking assistance appliance mounted to a backsplash behind and above a cooking appliance.

Referring to FIG. 31, another alternative position or implementation for a cooking assistance appliance 510 is shown, provided as an element mounted on a backsplash 512 behind and above a stovetop 514. It should be appreciated that the cooking assistance appliance 510 can mount in a horizontal orientation, while it is contemplated that the cooking assistance appliance 510 is mounted in a vertical or diagonal orientation. Such a position can provide for an aesthetically pleasing implementation, with high visibility of the position of a user local to the stovetop 514. Additionally, such a position is spaced from the heat, steam, and smoke from the stovetop 514, as opposed to being mounted directly above the stovetop 514, which can provide for longer operational life of the cooking assistance appliance 510 and less potential damage or repair costs.

Figure 32:
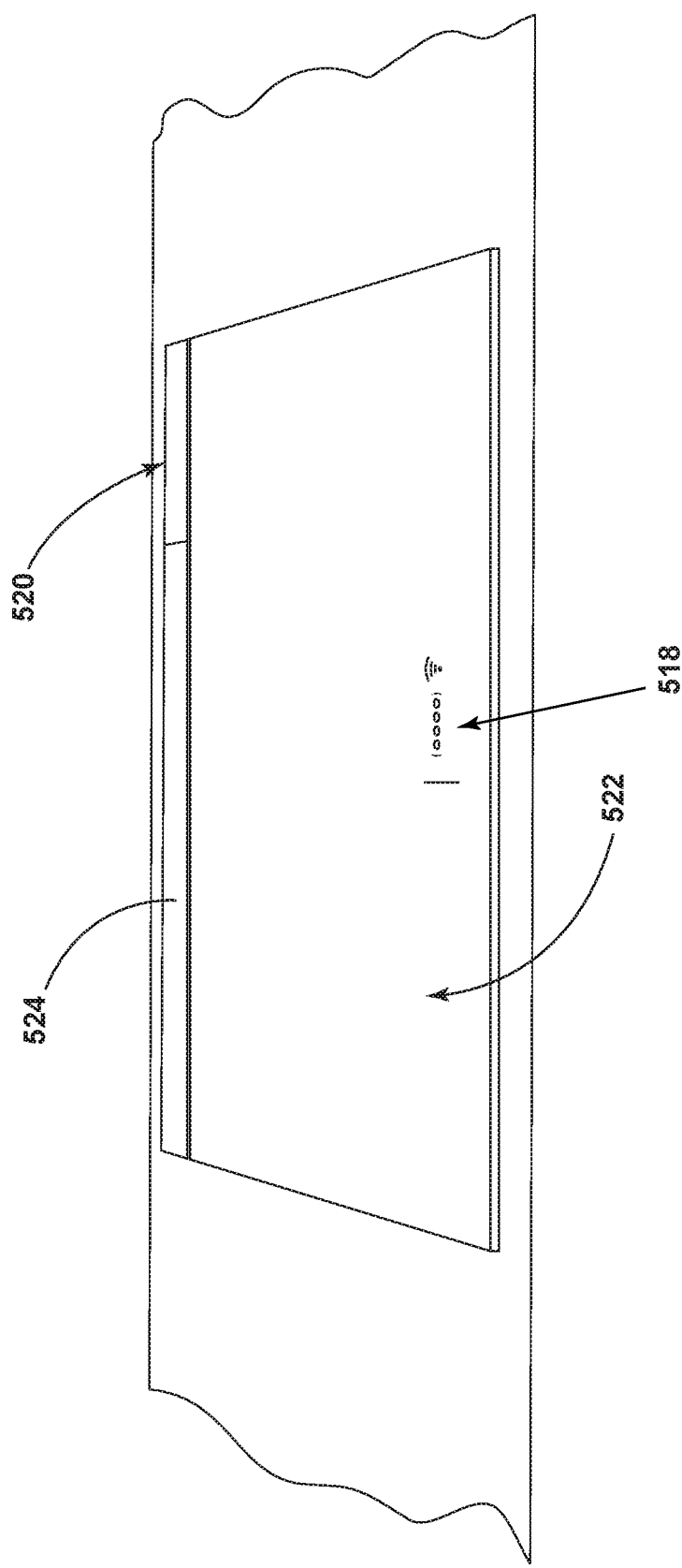
FIG. 32 is a perspective view of a cooking assistance appliance integrated into a rear frame of a cooking appliance, shown in a closed position.

Referring to FIG. 32, another exemplary cooking assistance appliance 520 is shown integrated into a stovetop 522. The stovetop 522 is shown as a flat surface cooking area, while any suitable stovetop 522 or range is contemplated. In one example, the stovetop 522 can have a touch control system 518 integrated into the stovetop 522, utilizing induction heating locally to heat food items on the stovetop 522. A rear frame element 524 is provided at the rear of the stovetop 522 in a closed position. The rear frame element 524 can be made of a steel frame or other heat and stain resistant material, while any suitable material is contemplated.

Figure 33:
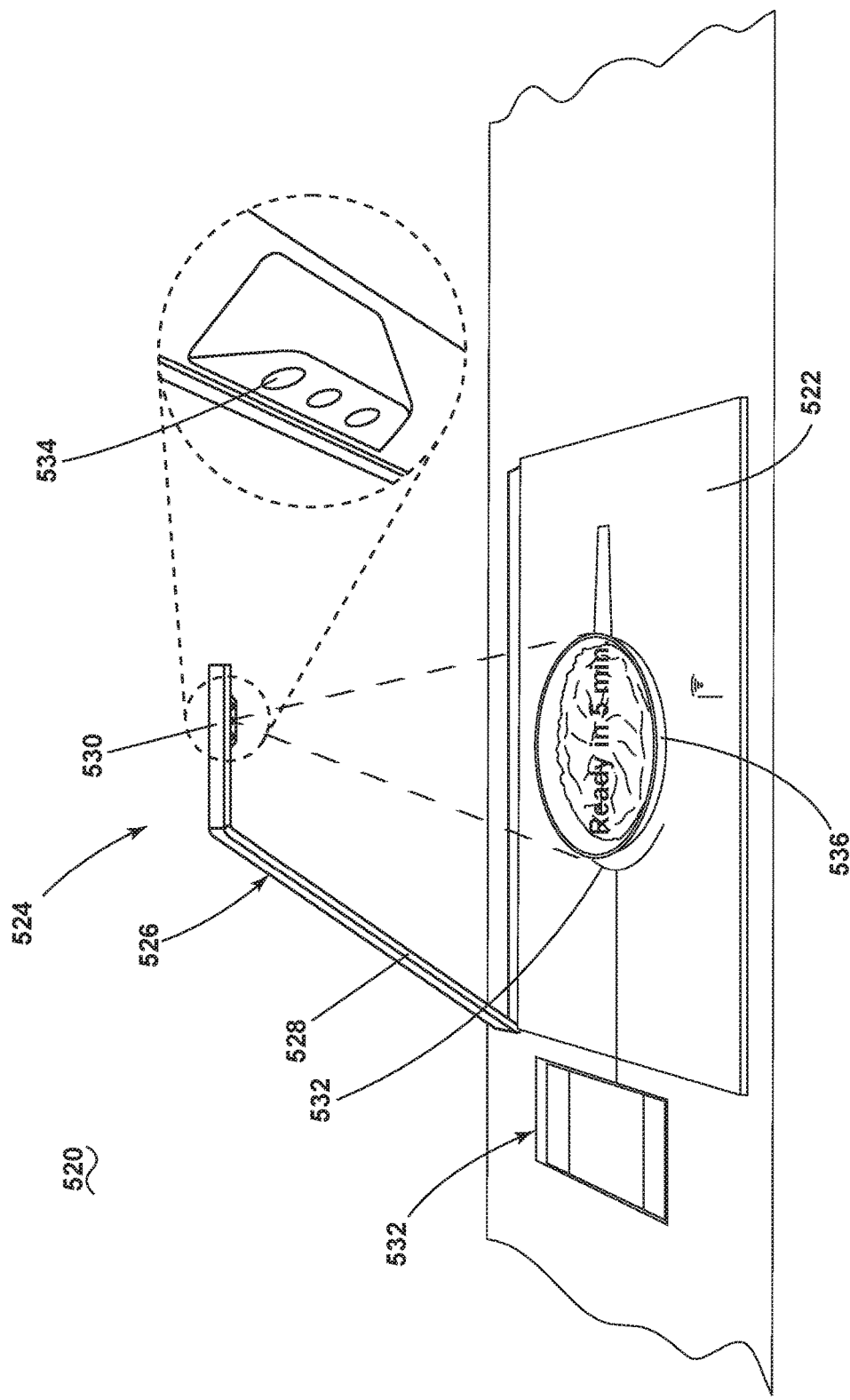
FIG. 33 is a perspective view of the cooking assistance appliance of FIG. 32 in an opened position.

Referring to FIG. 33, the rear frame element 524 has been moved to an opened position, including a two-part arm 526 having a pivot portion 528 and a sensor portion 530. The two-part arm 526 can articulate with a pneumatic or actuator-driven mechanism into the opened position. Alternatively, the two-part arm 526 can be manually positioned. The two-part arm 526 also conceals all electrical connections, as well as the cooking assistance appliance 520 in the closed position, exposing the cooking assistance appliance 520 in the opened position.

The pivot portion 528 provides for pivoting the two-part arm 526 into the opened position and overhanging or overlooking the stovetop 522. The sensor portion 530 can include the cooking assistance appliance 520, and can include features similar to those of the previously discussed cooking assistance appliances, such as a camera, infrared sensor, proximity sensor, microphone, speaker, projector, or otherwise. The cooking assistance appliance 520 can project displayed images 532 with a projector 534 onto the stovetop 522 or other surrounding area. As shown, the displayed images 532 include a recipe positioned next to the stovetop 522, as well as a line connecting the recipe to cookware 536 provided on the stovetop 522. Additionally, a timer or instructions can be projected directly onto the food. For example, as shown, a timer that five minutes is remaining is projected onto the food. Alternatively, cooking instructions can be projected onto the food, such as add onions in two minutes, preparing the user for the next cooking step. In this way, the displayed images 532 can be used to facilitate cooking a food item or recipe by providing the user visual instructions and assistance, even directly onto the food, which can help distinguish between multiple dishes.

Figure 34:
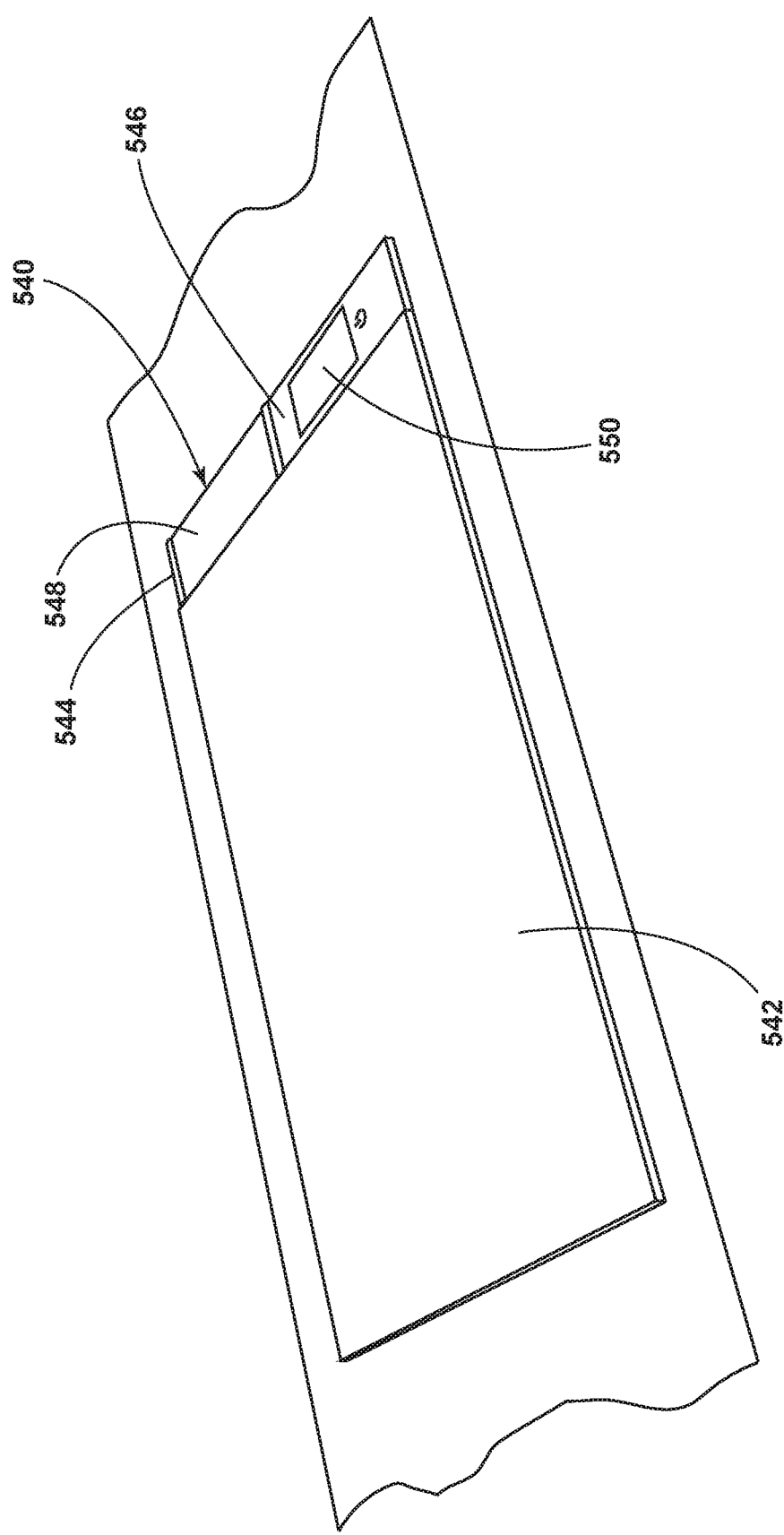
FIG. 34 is a perspective view of a cooking assistance appliance integrated into a side frame of a cooking appliance, shown in a closed position.

Referring to FIG. 34, another exemplary cooking assistance appliance 540 is shown integrated into a stovetop 542 as a side frame element 544 in a closed position. The stovetop 542 can be similar to that of FIG. 33, for example. The side frame element 544 can be two-part, including an interface portion 546 and a pivot portion 548. The interface portion 546 can include a user interface 550, for example, permitting the user to interact with the cooking assistance appliance 540. Alternatively, the interface portion 546 can include a connection element, permitting the physical connection of a mobile device, such as a smartphone, such that the user can plug in the mobile device and utilize the mobile device as the user interface to interact with the cooking assistance appliance 540 and the stovetop 542.

Figure 35:
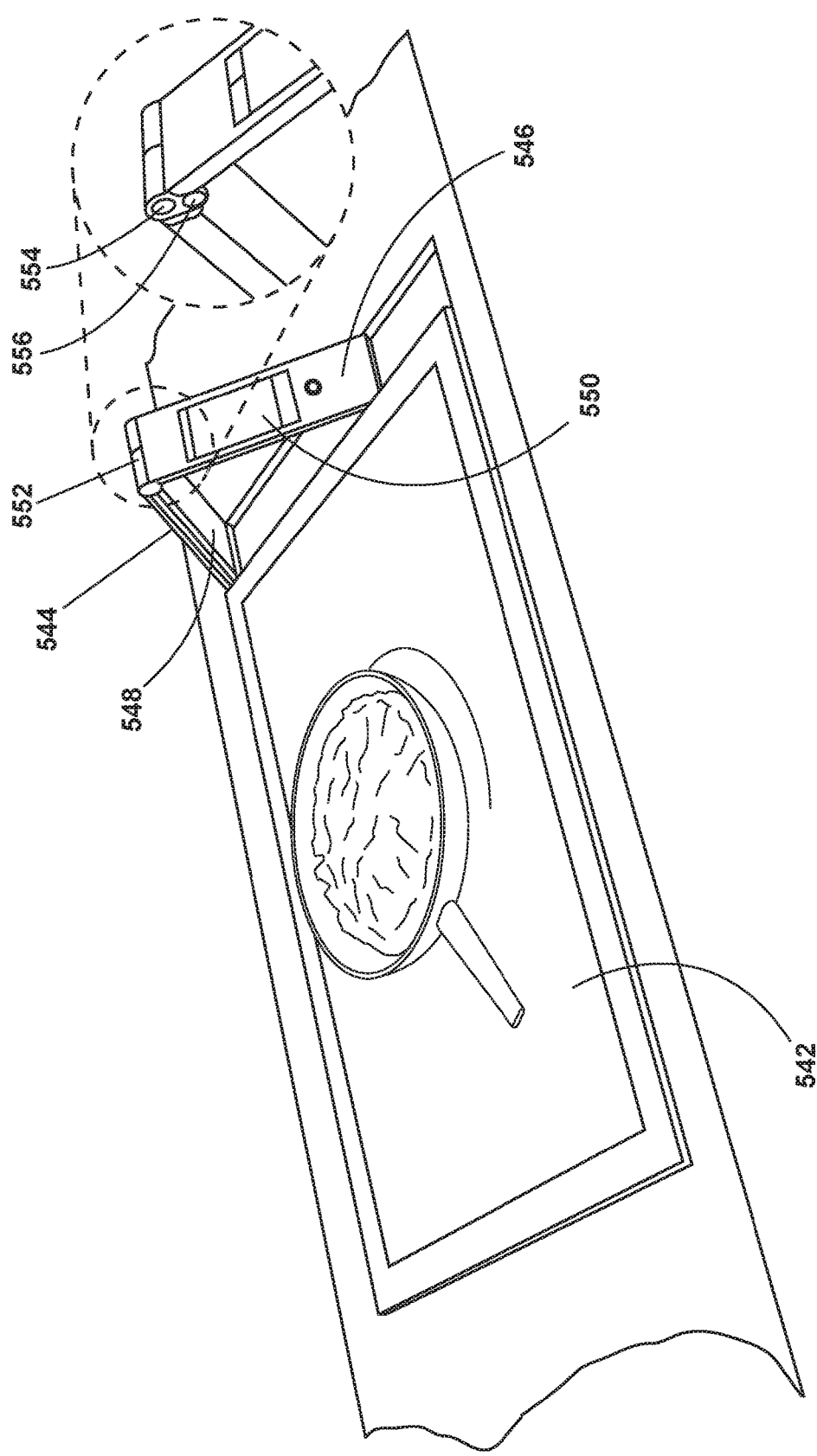
FIG. 35 is a perspective view of the cooking assistance appliance of FIG. 34 in an opened position.

Referring to FIG. 35, the side frame element 544 is provided in the opened position, having the pivot portion 548 pivoted backward and up. The pivot portion 548 connects to the interface portion 546 at a hinge joint 552 to permit an angled orientation for the interface portion 546 in the opened position facilitating interaction by a user. One or more elements or sensors can be provided on the side frame element 544 for sensing the stovetop 542. As shown, a camera 554 and an infrared sensor 556 are provided at the hinge joint 552 to view the stovetop 542 when in the opened position, as this provides the best viewing angle of the stovetop 542, while it is contemplated that one or more elements or sensors can be provided on either the pivot portion 548, the interface portion 546, or both. Additionally, information related to cooking can be provided on the user interface 550 or the stovetop 542, or both, which can relate to operation and control of the stovetop 542.

Figure 36:
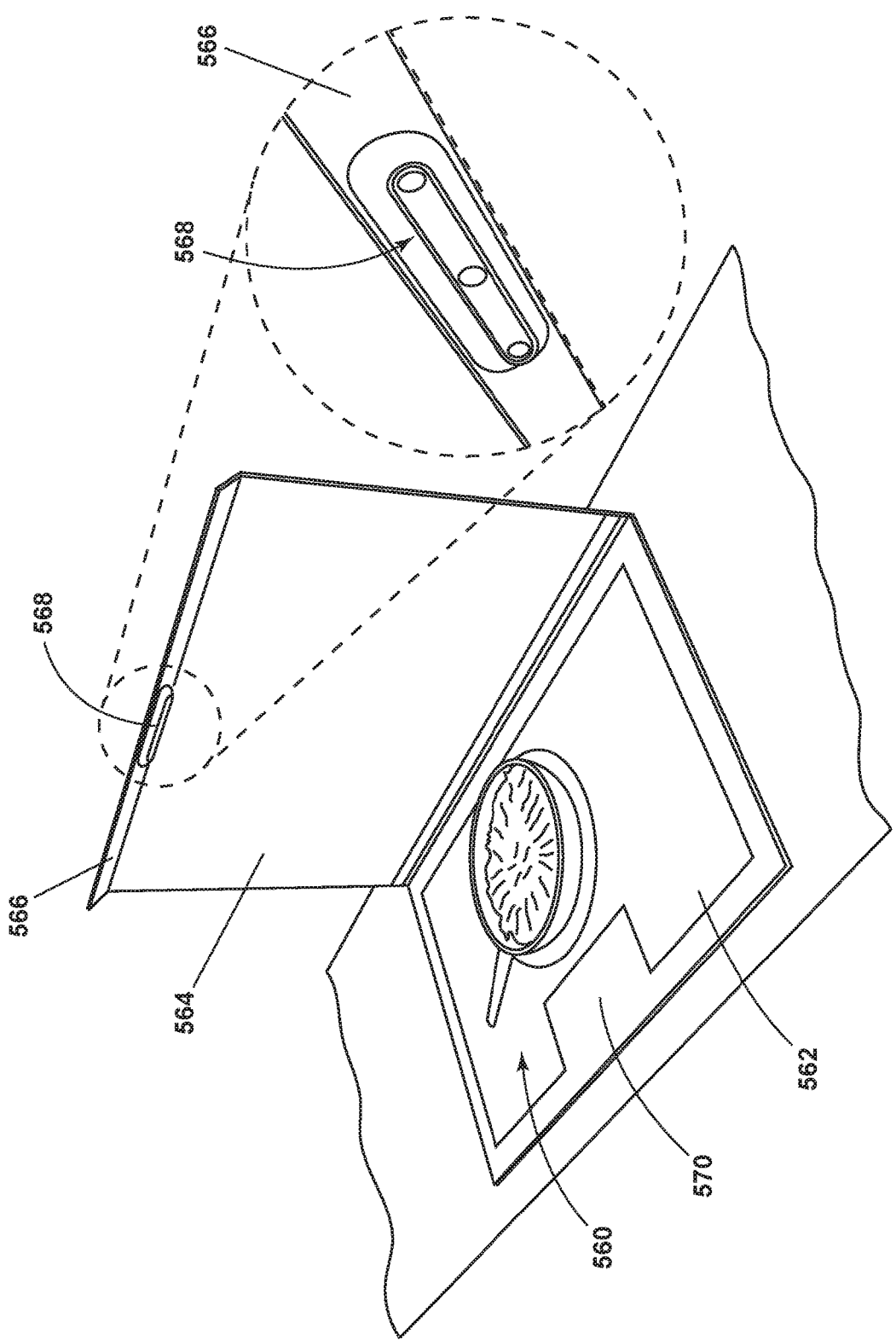
FIG. 36 is a perspective view of another cooking assistance appliance integrated into a lid of a cooking appliance.

Referring to FIG. 36, a stovetop 560 can include a cooking surface 562 and a lid 564 provided in an opened position and closable to a closed position covering the stovetop 560. In one example, the lid 564 can be made of glass, while any suitable material is contemplated. The lid 564 can include a lip 566 provided at an angle relative to the remainder of the lid 564. A cooking assistance appliance 568 can be integrated as part of the lid 564, and provided on the lip 566. The cooking assistance appliance 568 can include elements and features similar to the other cooking assistance appliance included herein, such as a camera, infrared sensor, proximity sensor, speaker, microphone, projector, and controller with wireless communication module. A user interface 570 can be integrated into the stovetop 560 for interacting with the cooking assistance appliance 568, for example, while other means of interacting with the stovetop 560 is contemplated. For example, the user can utilize a smartphone to communicate with or control the stovetop 560 or the cooking assistance appliance 568.

Figure 37:
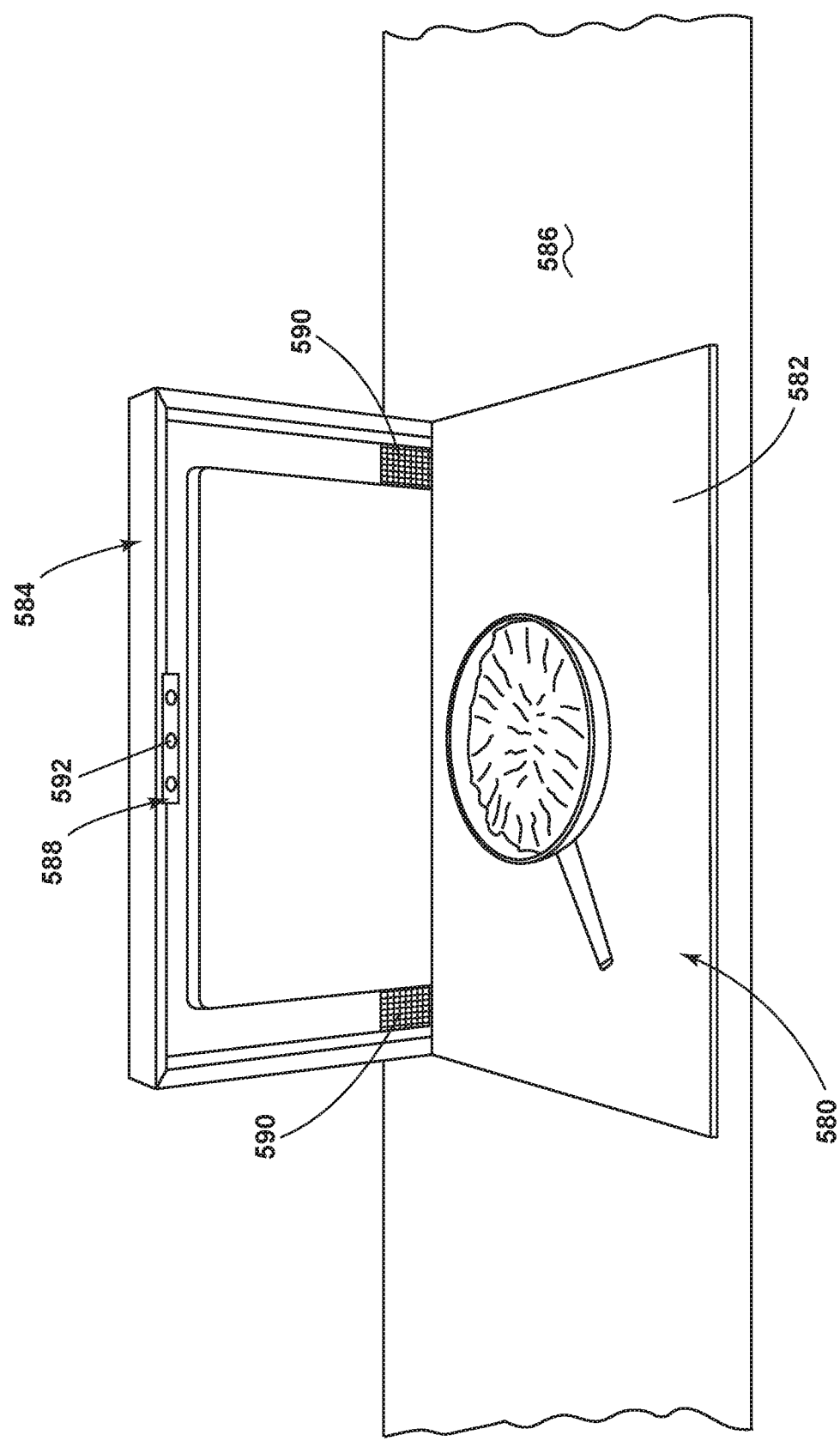
FIG. 37 is a perspective view of another cooking assistance appliance integrated into a downdraft vent system of a cooking appliance.

Referring to FIG. 37, a cooking appliance 580 can include a stovetop 582 and a downdraft hood 584. In one non-limiting example, the downdraft hood 584 can be movable between an opened position, as shown, extending from a countertop 586 and the stovetop 582, and a closed position, where the downdraft hood 584 is hidden within the countertop 586. The downdraft hood 584 can include one or more open vents 590, providing for exhausting heat, air, smoke, or other airborne material generated by cooking on the stovetop 582.

A cooking assistance appliance 588 can be mounted on the downdraft hood 584. The cooking assistance appliance 588 can be similar to the other cooking assistance appliances as described herein, including similar features or elements, including but not limited to a projector 592. The projector 592 can provide for projecting a user interface directly onto the stovetop 582 or a food item or cookware. Such a projection can provide for detailed instructions for cooking food or following a recipe, for example.

Figure 38:
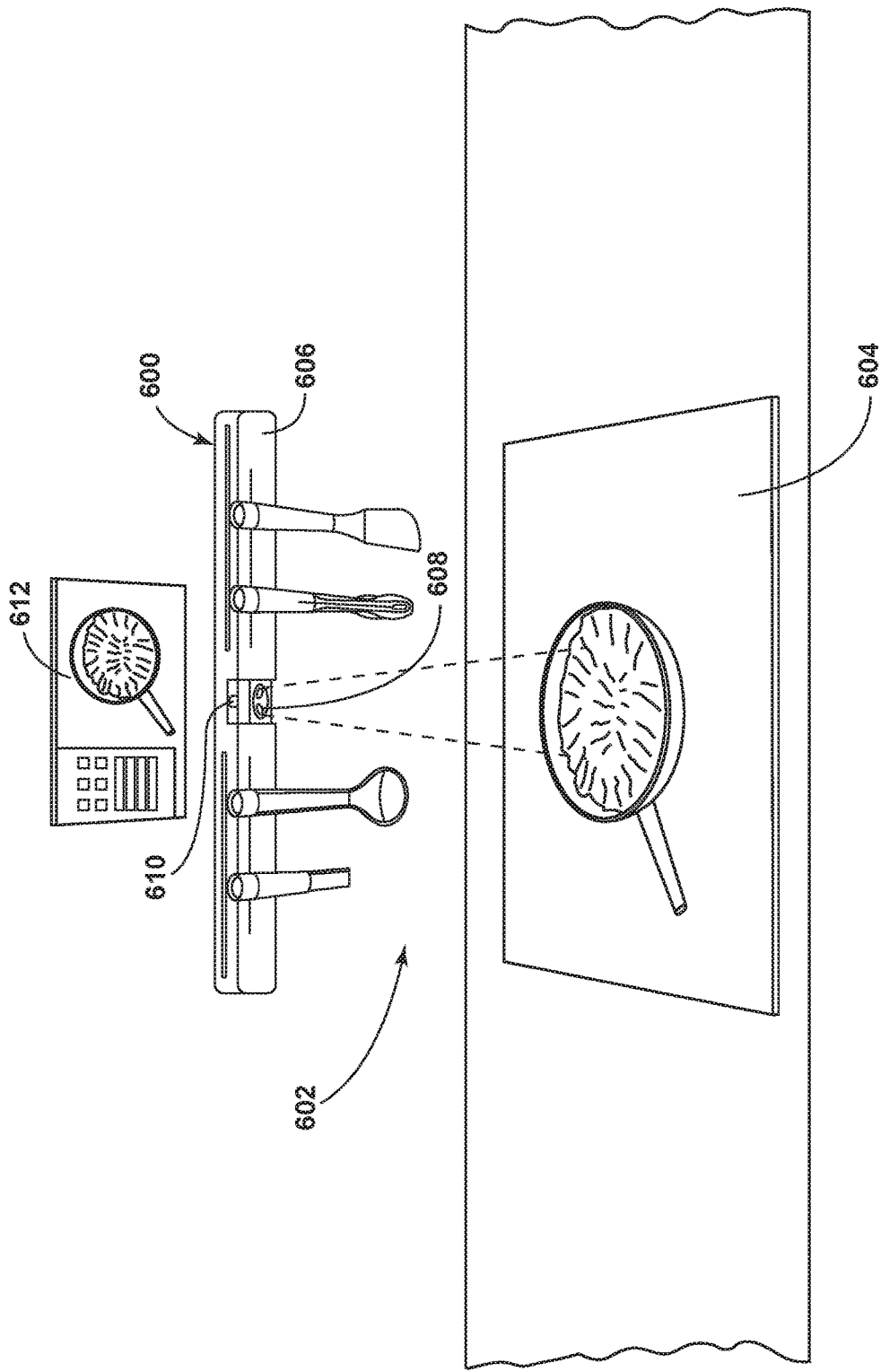
FIG. 38 is a perspective view of another cooking assistance appliance positioned on a back wall and integrated into a kitchen tool appliance.

Referring to FIG. 38, another cooking assistance appliance 600 can be mounted to a rear wall 602, such as a backsplash, provided behind a stovetop 604. The cooking assistance appliance 600 can be integrated as part of a tool or utensil holder 606. The utensil holder 606, for example, can be magnetic, or can be rechargeable for holding electronic utensils, such as a probe or hand mixer in non-limiting examples. The cooking assistance appliance 600 can include elements and features similar to the other cooking assistance appliances as described herein, except that it is contemplated that the cooking assistance appliance 600 can include more than one projector as a first projector 608 and a second projector 610. The first projector 608 can project an image or user interface onto the stovetop 604, such as for providing instructions for cooking or preparing the food. The second projector 610 can project an image or virtual screen 612 onto the rear wall 602 above the stovetop 604, such as for displaying a recipe, a timer, or other information related to cooking or use of the stovetop 604 or other cooking appliances. Furthermore, operation of the first and second projectors 608, 610 can be coordinated, such as identifying a cooking step in the recipe on the display of the second projector 610, and providing detailed instructions related to that step onto the stovetop 604.

Figure 39:
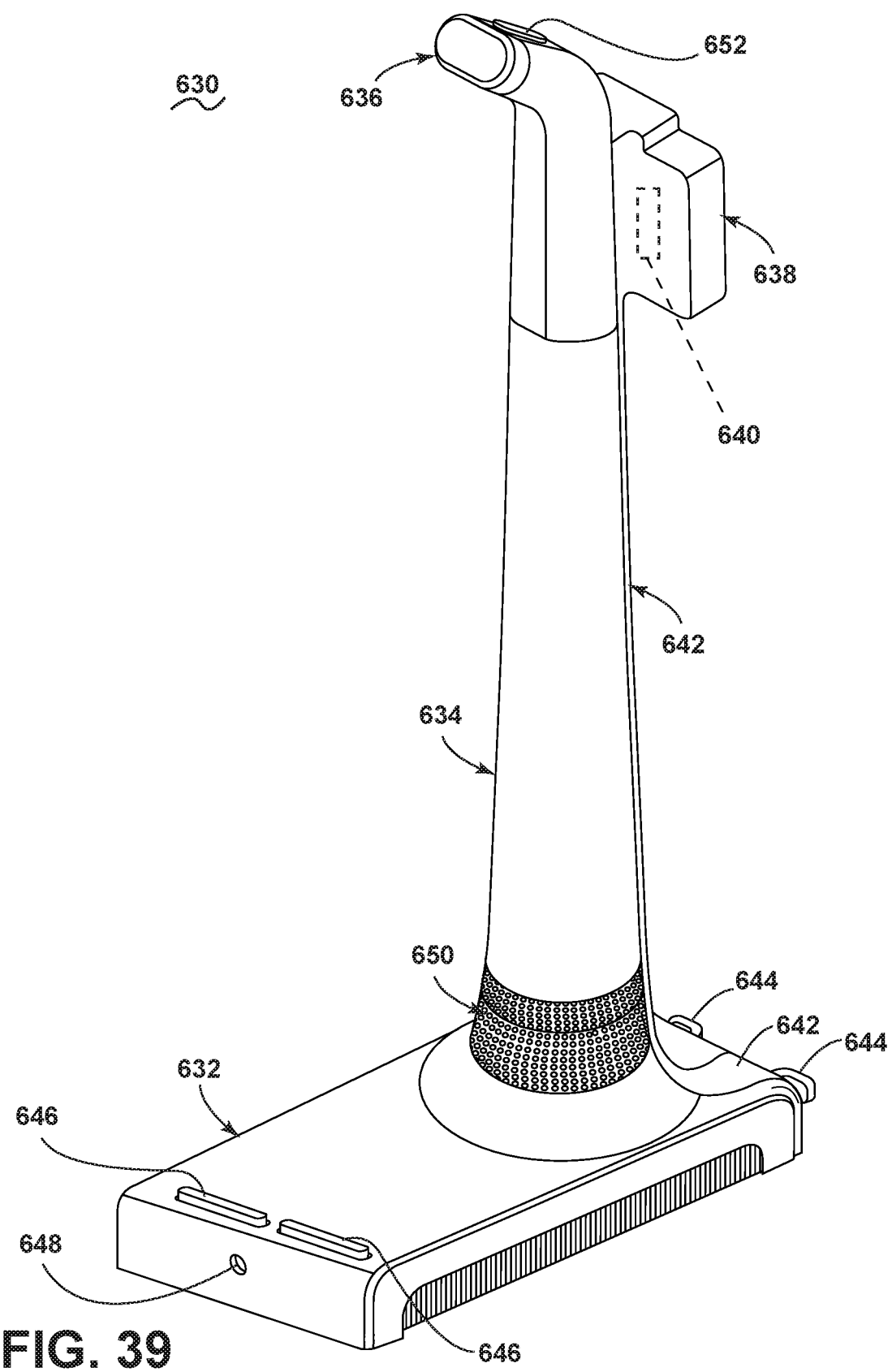
FIG. 39 is a perspective view of another cooking assistance appliance having a proximity sensor housing and a privacy shutter.

Referring now to FIG. 39, another cooking assistance appliance 630 can be substantially similar to the cooking assistance appliance 50 of FIG. 2, and the discussion will be limited to differences between the two. The cooking assistance appliance 630 can include a base 632, a neck 634, and a head 636. A proximity sensor housing 638 can be mounted at the neck 634, just below the head 636. The proximity sensor housing 638 can house a proximity sensor 640, just as for determining the existence of a user, distance or position of a user, or a distance, position, or condition of a cooking appliance or item thereon, such as a cooking vessel or food item. The proximity sensor housing 638 can include a housing extension 642, extending downwardly along a rear of the neck 634 to the base 632 and terminating at a rear of the base 632. A pair of wire hooks 644 are provided on the base 632 at the rear along the housing extension 642 at the base 632 for wrapping an electrical cord for the cooking assistance appliance 630, for example.

A pair of buttons 646 can be provided on the base 632, which can permit the user to physically interact with or operate the cooking assistance appliance 630. An input 648 is provided on the base 632 in front of the buttons 646. The input 648 can be a wire jack input, such as a 2.5 millimeter or 3.5 millimeter female receptacle, for example, while other inputs or receptacles are contemplated. The input 648 can be for connecting a wired food temperature probe to the cooking assistance appliance 630, for example. A speaker grill 650 can be arranged about the neck 634 where the neck adjoins to the base 632. The speaker grill 650 can encase a speaker (not shown) and a microphone (not shown) for audible or vocal communication between the cooking assistance appliance 630 and a user or other audible or sound output local to the cooking assistance appliance 630.

A privacy shutter 652 is provided on the head 636. The privacy shutter 652 can be a slidable or actuable member, such as a slider, which can be used to move a portion of the privacy shutter 652 to cover a camera or other imaging sensor (not shown), in order to provide privacy to a user from the cooking assistance appliance 630 as may be desirable.

Figure 40:
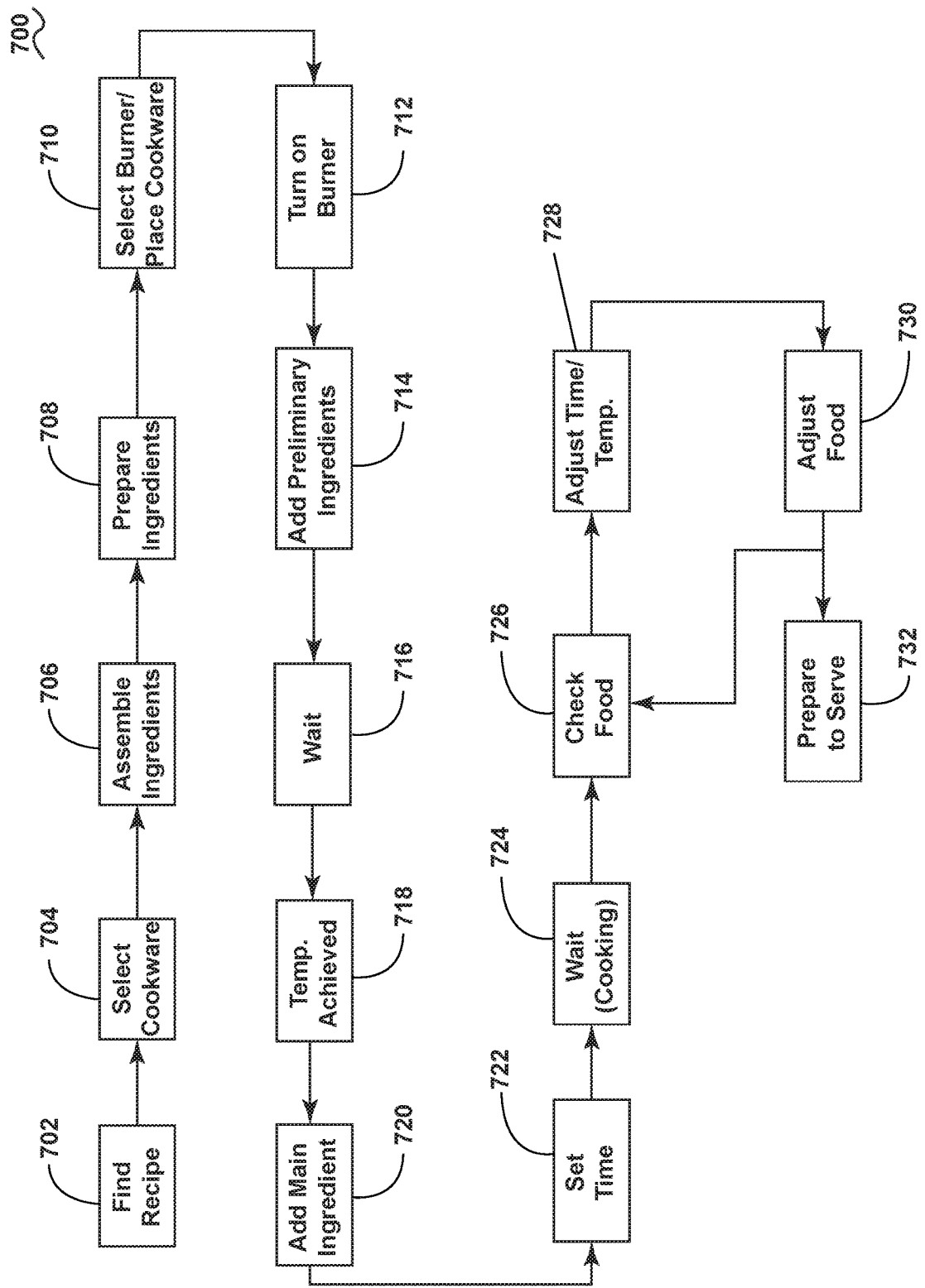
FIG. 40 is a flow chart of a user experience with a cooking assistance appliance and a cooking appliance.

Referring to FIG. 40, a flow chart 700 detailing an exemplary user experience using and interacting with one of the cooking assistance appliances 50, 212, 250, 280, 306, 336, 366, 396, 426, 466, 500, 510, 520, 540, 568, 588, or 600. Initially, at 702 a recipe can be selected. The recipe can be selected by a user, such as merely mentally choosing a recipe, or by selecting a recipe and communicating the recipe to the cooking assistance appliance. For example, the recipe can be selected on a mobile device or other device and communicated to the cooking assistance appliance wirelessly. Alternatively, where the cooking appliance is connected to or includes a user interface, the user can input information to the user interface to find and select a recipe to be prepared at a cooking appliance, such as the stovetops as discussed herein.

At 704, cookware can be selected by the user. In one example, the user can merely select their preferred cookware based upon the selected recipe. However, it is contemplated that the cooking assistance appliance can assist in recommending or selecting cookware for the user, or even the recipe can suggest the preferred cookware via the cooking assistance appliance. In one specific example, the cooking assistance appliance can indicate to use a 6-quart pot for boiling water for preparing noodles for a recipe. In another example, the cooking assistance appliance can recommend or identify a pan for sautéing or pan-frying a food item. It is contemplated that such recommendations or selections can be communicated to the user via the speaker using sound, or on a display if the particular cooking assistance appliance has a projector or display, or sending a recommendation to a user's mobile device, while any suitable means for communicating a recommended cookware item is contemplated.

At 706, the user can assemble the ingredients for preparing the food item or particular recipe. For example, the user can gather and ensure that all required ingredients are present. In one example, the user can check off the ingredients with the cooking assistance appliance, such as through verbal communication or via a user interface. At 708, the user can prepare the ingredients assembled at 706. Preparation can include preparing for cooking the food items, such as chopping, cutting, washing, trimming, or any other food preparation measure. Gathering and preparing the food ingredients prior to cooking ensures ease of cooking the ingredients by the user, without requiring the user to attempt to balance, assembly, preparation, and cooking simultaneously, which may be difficult for the less experienced cook. Such preparation of the ingredients can be guided by the cooking assistance appliance, such as through audio communication from the speakers, or even showing images or video examples of preparation via a projector or other user interface having a visual output.

At 710, the user can select a burner or place the cookware on the stovetop. In the case where a user selects a burner, the user can communicate such a selection to the cooking assistance appliance, such as via voice or input to a user interface. Alternatively, the user can simply place the cookware on the particular burner or position on the stovetop, and the cooking assistance appliance can utilize a sensor, such as the camera, the proximity sensor, or the infrared sensor, or communication with the stovetop, to determine the placement of the cookware. At 712, the burner or stovetop can be turned on. This can be done manually by the user, for example. Alternatively, this can be done by the cooking assistance appliance via communication with the cooking appliance. More specifically, the cooking assistance appliance can be in communication with the stovetop to operate the stovetop. After the user places the cookware on the stovetop at 710, the cooking assistance appliance can operate the stovetop to turn the burner on to begin heating the cookware. The applied heat and intensity of the burner can be particularly tailored to the chosen recipe from 702, communicated to or entered at the cooking assistance appliance.

At 714, preliminary ingredients can be added, such as initial ingredients that are cooked prior to the main ingredient, such as garlic or onions that need to be cooked first. In another example, water as a preliminary ingredient can be added to a pot and brought to a boil on the burner for boiling a later main ingredient within the boiling water. The cooking assistance appliance can instruct the user where and when to add the preliminary ingredients. For example, where multiple cookware items are being used and different preliminary ingredients need to be added to the different cookware items, the cooking assistance appliance can communicate such an organization to the user. In one example, the communication can be audible. In another example where the cooking assistance appliance includes a projector, the projection can visually indicate which particular ingredients go where and when they are to be added. More specifically, the words "add onions" or an image of onions can displayed on or adjacent to the cookware, indicated to the user to add the onions to a particular cookware item.

At 716, the user can wait. Waiting can mean waiting for the cooking of the preliminary ingredients or preparation of the preliminary ingredients. For example, it may take ten minutes to bring a pot of water to boil. In this example, the user will need to wait ten minutes. Such a wait time can be communicated to the user via the cooking assistance appliance. Alternatively, the cooking assistance appliance can display a timer, such as a visual indication on the light array of LEDs 70 of FIG. 2 or FIG. 5 of a projected timer from a projector, or simply an audible alarm at the expiration of the wait time.

At 718, the temperature can be achieved after the user waits. Temperature achieved can mean that a preheating has been completed, or that water or liquid has been brought to boil. Alternatively, temperature achieved can mean that preliminary ingredients have been cooked to a suitable doneness, prior to cooking the main ingredient. Thus, it should be appreciated that a certain temperature may not need to be achieved, but rather a suitable completion of preliminary cooking of a recipe has been completed at 718, prior to or in preparation for cooking the main ingredient. Reaching a certain temperature can be measured by the infrared sensor of the cooking assistance appliance, and communicated to the user. Additionally, in the case where a certain doneness or completion of cooking a preliminary food item can be guided by the cooking assistance appliance, such as showing representative images to the user, or imaging the food and making a determination that such preliminary cooking has been completed.

At 720, the main ingredient can be added. Such an addition can be instructed by the cooking assistance appliance. For example, a position or arrangement of the main food item can be specifically instructed to the user. For example, the cooking of a certain food item may require a particular proper placement on a skillet. Such proper placement for cooking can be indicated or instructed by the cooking assistance appliance, such as through audible instruction or providing visual indications or guides. At 722, a time can be set to allow the main ingredient to cook. Such a time can be represented with a timer, such as with the light array of LEDs 70 or with a timer displayed from the projector, for example. At 724, the user can wait for the time, permitting the main ingredient to cook.

While waiting for the food to cook at 724, the user can check the food at 726. Checking the food can be indicated by the cooking assistance appliance. Such an indication can be in the form of a communication to the user, such as an audible alarm, a notification to a mobile device, a light display, or other form of indication communicable to the user. Alternatively, at 726, the food can be checked by the cooking assistance appliance, as opposed to the user. For example, the cooking assistance appliance can determine a doneness or temperature of the food item, in order to make a determination of doneness, or if any action needs to be taken. Additionally, at this time, the cooking assistance appliance can make a determination if any mess condition is occurring, and modify the cooking process accordingly to mitigate or prevent a mess.

At 728, after either the user of the cooking assistance appliance has checked the food, the user or the cooking assistance appliance may need to adjust the remaining cook time or the temperature. For example, the temperature of the main food ingredient is measured by the infrared sensor of the cooking assistance appliance is read at 100° F., while it is expected to be 120° F. at the present point in the cooking process. Thus, the cooking assistance appliance can update the timer to reflect additional cooking time to ensure that proper cooking temperatures are achieved. Alternatively, the cooking assistance appliance can instruct the user, or the cooking appliance or stovetop to adjust the temperature as necessary. For example, increasing the temperature may provide for faster cooking to maintain the current cooking time. Additionally, temperatures can be reduced to minimize or prevent a mess. The cooking assistance appliance can instruct the user to reduce the temperatures, or, if connected to the cooking appliance, can reduce the temperatures itself. Cooking times can be automatically adjusted based upon any temperature adjustments.

At 730, the food may also need adjusting during the cooking process. For example, a meat food item as the main ingredient will likely need to be flipped over. Such a food adjustment can be instructed to a user from the cooking assistance appliance. Additionally, the projector can indicate proper adjustment of the food items. Finally, proper adjustment of the food item can be measured by the camera of the cooking assistance appliance to ensure that proper adjustment has been achieved by the user. If it has not, the cooking assistance appliance can further indicate additional adjustment to the user.

Optionally, after 730, if additional cooking is needed to complete the recipe, the check food at 726, adjust time or temperature at 728, and adjust food at 730 can be repeated as necessary until completion of the recipe or cooking of the food items.

At 732, the food can be prepared to serve. Specific serving details, such as 'plating' or arranging of the food for service, can be instructed to the user from the cooking assistance appliance. Such an instruction can be communicated in the form of images or videos from a projector, while audible instruction is also contemplated.

The cooking assistance appliances as described herein provide for assisting a user in monitoring and using a cooking appliance, which provides for a more desirable user experience. More specifically, the cooking assistance appliance can provide for monitoring the status of a food item, such as the doneness of the food item to ensure optimal cooking. Additionally, the cooking assistance appliance can monitor the local environment of the cooking appliance, to alert, mitigate, or prevent messes. Additionally, the cooking assistance appliance can monitor the local environment for the presences of a user, and base interaction with the user on the proximity of the user. Similarly, presences of a pet or child can be detected to alert a user if attention is needed near the cooking appliance.

Additionally, the cooking assistance appliance can assist the user in using the cooking appliance, such as providing or displaying recipes, providing step-by-step feedback to a user, monitoring the cooking process, and measuring or determining ingredients or volume amounts. Additionally, the cooking assistance appliance can be operably coupled to the cooking appliance to automatically operate the cooking appliance in concert with a cooking process, such as preheating, mess mitigation, or temperature reduction.

Therefore, it should be appreciated that the cooking assistance appliance can facilitate cooking for a user, incorporating particular instruction, measure, and monitoring of items being cooked on a stovetop. Additionally, it is contemplated that the cooking assistance appliance can provide for facilitating preparing of recipes that do not involve use of the stovetop. For example, the cooking assistance appliance can help the user prepare a salad, which does not require any cooking on the stovetop. Such assistance can also be in the form of a recipe, video, or images projected from the projector, or even audible instructions from the speaker. Further yet, integration between the cooking assistance appliance and a cooking appliance need not be limited to just a stovetop, but can include other cooking appliances, such as a microwave oven, toaster oven, traditional oven, grill, flat top, or otherwise. For example, a user can insert a probe into a turkey and place the turkey in the oven to cook for several hours. The probe can be in communication with the cooking assistance appliance to inform a user of the current temperature of the turkey without needing to open the oven, and can even be used to estimate cook time or doneness.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cooking assistance appliance for use with a cooking appliance, the cooking assistance appliance comprising:
   a housing configured to be positioned adjacent to a cooking appliance within a line of sight of a cook surface, wherein the housing includes a head connected to a neck extending from a base;
   at least one image sensor provided in the head for generating image data of the cooking appliance;
   a controller including a processor configured to process the image data to determine a condition of a food item in a cooking vessel on the cooking appliance, said condition relating to a liquid volume or a liquid level measurement; and
   a communication interface for communicating the determined condition of the food item in human understandable form.

2. The cooking assistance appliance of claim 1 further comprising a temperature sensor in communication with the controller for generating thermal data of the food item or the cook surface, and wherein the controller is configured to process the thermal data to determine a condition of the food item in the cooking vessel on the cook surface.

3. The cooking assistance appliance of claim 1 wherein said communication interface comprises a projector.

4. The cooking assistance appliance of claim 1 wherein said communication interface comprises a speaker for audible communication with a user.

5. The cooking assistance appliance of claim 4 wherein the communication interface also comprises a microphone.

6. The cooking assistance appliance of claim 1 further comprising a proximity sensor for sensing a local position of a user.

7. The cooking assistance appliance of claim 1 further comprising a temperature probe in communication with the controller and an infrared sensor to generate temperature data for determining the condition of the food item.

8. The cooking assistance appliance of claim 7 wherein the temperature probe can generate internal temperature data for the food item and the infrared sensor can determine external temperature data for the food item, with both the temperature probe and the infrared sensor used determine a doneness of the food item.

9. The cooking assistance appliance of claim 1 wherein the controller further includes a wireless communication module for communication between the cooking assistance appliance and the cooking appliance.

10. The cooking assistance appliance of claim 9 wherein the cooking assistance appliance can operate the cooking appliance via the wireless communication module.

11. The cooking assistance appliance of claim 1 wherein the at least one image sensor comprises at least two, 2D visible light image sensors in spaced relationship, each 2D visible light image sensor outputting 2D image data, and wherein the processor is configured to process the 2D image data from both 2D visible light image sensors into a 3D image.

12. The cooking assistance appliance of claim 1 wherein the cooking assistance appliance can map a cook surface based upon a setup algorithm.

13. The cooking assistance appliance of claim 12 wherein the mapped cook surface can include the cooking vessel.

14. The cooking assistance appliance of claim 1 wherein the condition is a liquid mess condition associated with the cooking vessel on the cook surface or a sous-vide status for a food item contained within a volume of liquid within the cooking vessel, and wherein the processor is configured with a setup algorithm that uses the image data to determine a boundary of the cooking vessel and a location of one or more heating zones.

15. The cooking assistance appliance of claim 1 wherein the cooking assistance appliance is a stand-alone appliance, or an appliance mountable to an environment above or near the cooking appliance by way of a movable support, a fixed support or a pivotable support.

16. The cooking assistance appliance of claim 15 wherein the cooking assistance appliance is the stand-alone appliance and includes a body positionable adjacent to the cooking appliance for measuring a physical state of the food item being cooked in the cooking vessel, a condition of the food item, or an attribute of the food item or the cooking vessel, with the at least one image sensor.

17. The cooking assistance appliance of claim 16 wherein the head and the base are rotatable relative to each other via the neck.

18. The cooking assistance appliance of claim 17 wherein the image sensor and an infrared sensor are provided in the head for a downward view of the cooking appliance.

19. The cooking assistance appliance of claim 18 further comprising a light array arranged on the neck.

20. The cooking assistance appliance of claim 19 wherein the light array is operable by the controller to communicate a status of operation of the cooking appliance to a user through visual patterning or colors formed by the light array.

21. A cooking assistance appliance for use with a cooking appliance, the cooking assistance appliance comprising:
a housing sized to be positioned on a counter adjacent to the cooking appliance, positionable within a line of sight of a cook surface of the cooking appliance, with the housing including a head, a neck, and a base;
at least one image sensor for generating image data of a food item on the cooking appliance provided in the head to view the cook surface via the line of sight;
at least one temperature sensor for generating temperature data of the food item on the cooking appliance provided in the head to view the cook surface via the line of sight;
a controller including a processor configured to process the image data and the temperature data to determine a condition of a food item, said condition relating to a cooking status of the food item; and
a communication interface for communicating the determined condition of the food item in human understandable form.

22. A cooking assistance appliance for use with a cooking appliance, the cooking assistance appliance comprising:
a housing including a head positionable within a line of sight of a cook surface of the cooking appliance;
at least one image sensor for generating image data provided in the head;
a controller including a processor configured to process the image data to determine a condition of a food item on the cook surface, said condition relating to a liquid volume or a liquid level measurement; and
a communication interface for communicating the determined condition of the food item to a user.

* * * * *